(12) United States Patent
Tsai et al.

(10) Patent No.: US 11,902,685 B1
(45) Date of Patent: Feb. 13, 2024

(54) PIXEL SENSOR HAVING HIERARCHICAL MEMORY

(71) Applicant: Meta Platforms Technologies, LLC, Menlo Park, CA (US)

(72) Inventors: Tsung-Hsun Tsai, Redmond, WA (US); Song Chen, Redmond, WA (US); Xinqiao Liu, Medina, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/242,152

(22) Filed: Apr. 27, 2021

Related U.S. Application Data

(60) Provisional application No. 63/016,473, filed on Apr. 28, 2020.

(51) Int. Cl.
H04N 5/335 (2011.01)
H04N 25/63 (2023.01)
H04N 25/772 (2023.01)
H04N 25/75 (2023.01)

(52) U.S. Cl.
CPC ........... *H04N 25/772* (2023.01); *H04N 25/63* (2023.01); *H04N 25/75* (2023.01)

(58) Field of Classification Search
None
See application file for complete search history.

(56) References Cited

U.S. PATENT DOCUMENTS

| 4,596,977 | A | 6/1986 | Bauman et al. |
| 5,053,771 | A | 10/1991 | McDermott |
| 5,650,643 | A | 7/1997 | Konuma |
| 5,844,512 | A | 12/1998 | Gorin et al. |
| 5,963,369 | A | 10/1999 | Steinthal et al. |

(Continued)

FOREIGN PATENT DOCUMENTS

| CN | 1490878 A | 4/2004 |
| CN | 1728397 A | 2/2006 |

(Continued)

OTHER PUBLICATIONS

Corrected Notice of Allowance dated Mar. 7, 2022 for U.S. Appl. No. 17/150,925, filed Jan. 15, 2021, 2 Pages.

(Continued)

*Primary Examiner* — Mark T Monk
(74) *Attorney, Agent, or Firm* — Kilpatrick Townsend & Stockton LLP

(57) ABSTRACT

In one example, an apparatus comprises an array of pixel cells, each pixel cell including: a photodiode to generate a charge in response to incident light, a charge sensing unit configured to generate a voltage based on the charge, a quantizer configured to generate a digital output based on quantizing the voltage, and an in-pixel memory configured to store the digital output. The apparatus further includes a bus interface, an off-array frame memory, and a frame memory controller configured to: control the frame memory to receive, via the set of parallel interconnects, the digital outputs from the in-pixel memory of each pixel cell of the array of pixel cells; store the digital outputs in the frame memory; fetch the digital outputs from the frame memory; and transmit the digital outputs to a host device via the bus interface.

20 Claims, 48 Drawing Sheets

(56) References Cited

U.S. PATENT DOCUMENTS

| | | |
|---|---|---|
| 6,181,822 B1 | 1/2001 | Miller et al. |
| 6,384,905 B1 | 5/2002 | Barrows |
| 6,522,395 B1 | 2/2003 | Bamji et al. |
| 6,529,241 B1 | 3/2003 | Clark |
| 6,864,817 B1 | 3/2005 | Salvi et al. |
| 6,963,369 B1 | 11/2005 | Olding |
| 7,326,903 B2 | 2/2008 | Ackland |
| 7,362,365 B1 | 4/2008 | Reyneri et al. |
| 7,659,772 B2 | 2/2010 | Nomura et al. |
| 7,659,925 B2 | 2/2010 | Krymski |
| 7,719,589 B2 | 5/2010 | Turchetta et al. |
| 7,880,779 B2 | 2/2011 | Storm |
| 7,956,914 B2 | 6/2011 | Xu |
| 8,134,623 B2 | 3/2012 | Purcell et al. |
| 8,144,227 B2 | 3/2012 | Kobayashi |
| 8,369,458 B2 | 2/2013 | Wong et al. |
| 8,426,793 B1 | 4/2013 | Barrows |
| 8,754,798 B2 | 6/2014 | Lin |
| 8,773,562 B1 | 7/2014 | Fan |
| 8,779,346 B2 | 7/2014 | Fowler et al. |
| 8,946,610 B2 | 2/2015 | Iwabuchi et al. |
| 9,001,251 B2 | 4/2015 | Smith et al. |
| 9,094,629 B2 | 7/2015 | Ishibashi |
| 9,185,273 B2 | 11/2015 | Beck et al. |
| 9,274,151 B2 | 3/2016 | Lee et al. |
| 9,282,264 B2 | 3/2016 | Park et al. |
| 9,332,200 B1 | 5/2016 | Hseih et al. |
| 9,343,497 B2 | 5/2016 | Cho |
| 9,363,454 B2 | 6/2016 | Ito et al. |
| 9,478,579 B2 | 10/2016 | Dai et al. |
| 9,497,396 B2 | 11/2016 | Choi |
| 9,531,990 B1 | 12/2016 | Wilkins et al. |
| 9,800,260 B1 | 10/2017 | Banerjee |
| 9,819,885 B2 | 11/2017 | Furukawa et al. |
| 9,832,370 B2 | 11/2017 | Cho et al. |
| 9,909,922 B2 | 3/2018 | Schweickert et al. |
| 9,948,316 B1 | 4/2018 | Yun et al. |
| 9,955,091 B1 | 4/2018 | Dai et al. |
| 9,967,496 B2 | 5/2018 | Ayers et al. |
| 10,003,759 B2 | 6/2018 | Fan |
| 10,015,416 B2 | 7/2018 | Borthakur et al. |
| 10,090,342 B1 | 10/2018 | Gambino et al. |
| 10,096,631 B2 | 10/2018 | Ishizu |
| 10,154,221 B2 | 12/2018 | Ogino et al. |
| 10,157,951 B2 | 12/2018 | Kim et al. |
| 10,321,081 B2 | 6/2019 | Watanabe et al. |
| 10,345,447 B1 | 7/2019 | Hicks |
| 10,419,701 B2 | 9/2019 | Liu |
| 10,574,925 B2 | 2/2020 | Otaka |
| 10,594,974 B2 | 3/2020 | Ivarsson et al. |
| 10,598,546 B2 | 3/2020 | Liu |
| 10,608,101 B2 | 3/2020 | Liu |
| 10,686,996 B2 | 6/2020 | Liu |
| 10,726,627 B2 | 7/2020 | Liu |
| 10,750,097 B2 | 8/2020 | Liu |
| 10,764,526 B1 | 9/2020 | Liu et al. |
| 10,804,926 B2 | 10/2020 | Gao et al. |
| 10,812,742 B2 | 10/2020 | Chen et al. |
| 10,825,854 B2 | 11/2020 | Liu |
| 10,834,344 B2 | 11/2020 | Chen et al. |
| 10,897,586 B2 | 1/2021 | Liu et al. |
| 10,903,260 B2 | 1/2021 | Chen et al. |
| 10,917,589 B2 | 2/2021 | Liu |
| 10,951,849 B2 | 3/2021 | Liu |
| 10,969,273 B2 | 4/2021 | Berkovich et al. |
| 11,004,881 B2 | 5/2021 | Liu et al. |
| 11,057,581 B2 | 7/2021 | Liu |
| 11,089,210 B2 | 8/2021 | Berkovich et al. |
| 2002/0067303 A1 | 6/2002 | Lee et al. |
| 2002/0113886 A1 | 8/2002 | Hynecek |
| 2002/0118289 A1 | 8/2002 | Choi |
| 2003/0001080 A1 | 1/2003 | Kummaraguntla et al. |
| 2003/0020100 A1 | 1/2003 | Guidash |
| 2003/0049925 A1 | 3/2003 | Layman et al. |
| 2004/0095495 A1 | 5/2004 | Inokuma et al. |
| 2004/0118994 A1 | 6/2004 | Mizuno |
| 2004/0251483 A1 | 12/2004 | Ko et al. |
| 2005/0046715 A1 | 3/2005 | Lim et al. |
| 2005/0057389 A1 | 3/2005 | Krymski |
| 2005/0104983 A1 | 5/2005 | Raynor |
| 2005/0206414 A1 | 9/2005 | Cottin et al. |
| 2005/0237380 A1 | 10/2005 | Kakii et al. |
| 2005/0280727 A1 | 12/2005 | Sato et al. |
| 2006/0023109 A1 | 2/2006 | Mabuchi et al. |
| 2006/0146159 A1 | 7/2006 | Farrier |
| 2006/0157759 A1 | 7/2006 | Okita et al. |
| 2006/0158541 A1 | 7/2006 | Ichikawa |
| 2007/0013983 A1 | 1/2007 | Kitamura et al. |
| 2007/0076109 A1 | 4/2007 | Krymski |
| 2007/0076481 A1 | 4/2007 | Tennant |
| 2007/0092244 A1 | 4/2007 | Pertsel et al. |
| 2007/0102740 A1 | 5/2007 | Ellis-Monaghan et al. |
| 2007/0131991 A1 | 6/2007 | Sugawa |
| 2007/0208526 A1 | 9/2007 | Staudt et al. |
| 2007/0222881 A1 | 9/2007 | Mentzer |
| 2008/0001065 A1 | 1/2008 | Ackland |
| 2008/0007731 A1 | 1/2008 | Botchway et al. |
| 2008/0042888 A1 | 2/2008 | Danesh |
| 2008/0068478 A1 | 3/2008 | Watanabe |
| 2008/0088014 A1 | 4/2008 | Adkisson et al. |
| 2008/0191791 A1 | 8/2008 | Nomura et al. |
| 2008/0226170 A1 | 9/2008 | Sonoda |
| 2008/0226183 A1 | 9/2008 | Lei et al. |
| 2008/0266434 A1 | 10/2008 | Sugawa et al. |
| 2009/0002528 A1 | 1/2009 | Manabe et al. |
| 2009/0033588 A1 | 2/2009 | Kajita et al. |
| 2009/0040364 A1 | 2/2009 | Rubner |
| 2009/0091645 A1 | 4/2009 | Trimeche et al. |
| 2009/0128640 A1 | 5/2009 | Yumiki |
| 2009/0140305 A1 | 6/2009 | Sugawa |
| 2009/0219266 A1 | 9/2009 | Lim et al. |
| 2009/0224139 A1 | 9/2009 | Buettgen et al. |
| 2009/0237536 A1 | 9/2009 | Purcell et al. |
| 2009/0244346 A1 | 10/2009 | Funaki |
| 2009/0245637 A1 | 10/2009 | Barman et al. |
| 2009/0261235 A1 | 10/2009 | Lahav et al. |
| 2009/0321615 A1 | 12/2009 | Sugiyama et al. |
| 2010/0013969 A1 | 1/2010 | Ui |
| 2010/0140732 A1 | 6/2010 | Eminoglu et al. |
| 2010/0194956 A1 | 8/2010 | Yuan et al. |
| 2010/0232227 A1 | 9/2010 | Lee |
| 2010/0276572 A1 | 11/2010 | Iwabuchi et al. |
| 2011/0049589 A1 | 3/2011 | Chuang et al. |
| 2011/0122304 A1 | 5/2011 | Sedelnikov |
| 2011/0149116 A1 | 6/2011 | Kim |
| 2011/0155892 A1 | 6/2011 | Neter et al. |
| 2011/0254986 A1 | 10/2011 | Nishimura et al. |
| 2012/0016817 A1 | 1/2012 | Smith et al. |
| 2012/0039548 A1 | 2/2012 | Wang et al. |
| 2012/0068051 A1 | 3/2012 | Ahn et al. |
| 2012/0092677 A1 | 4/2012 | Suehira et al. |
| 2012/0105475 A1 | 5/2012 | Tseng |
| 2012/0105668 A1 | 5/2012 | Velarde et al. |
| 2012/0113119 A1 | 5/2012 | Massie |
| 2012/0127284 A1 | 5/2012 | Bar-Zeev et al. |
| 2012/0133807 A1 | 5/2012 | Wu et al. |
| 2012/0138775 A1 | 6/2012 | Cheon et al. |
| 2012/0153123 A1 | 6/2012 | Mao et al. |
| 2012/0188420 A1 | 7/2012 | Black et al. |
| 2012/0200499 A1 | 8/2012 | Osterhout et al. |
| 2012/0205520 A1 | 8/2012 | Hsieh et al. |
| 2012/0212465 A1 | 8/2012 | White et al. |
| 2012/0241591 A1 | 9/2012 | Wan et al. |
| 2012/0262616 A1 | 10/2012 | Sa et al. |
| 2012/0267511 A1 | 10/2012 | Kozlowski |
| 2012/0273654 A1 | 11/2012 | Hynecek et al. |
| 2012/0305751 A1 | 12/2012 | Kusuda |
| 2013/0020466 A1 | 1/2013 | Ayers et al. |
| 2013/0056809 A1 | 3/2013 | Mao et al. |
| 2013/0057742 A1 | 3/2013 | Nakamura et al. |
| 2013/0068929 A1 | 3/2013 | Solhusvik et al. |
| 2013/0069787 A1 | 3/2013 | Petrou |
| 2013/0082313 A1 | 4/2013 | Manabe |
| 2013/0113969 A1 | 5/2013 | Manabe et al. |

(56) References Cited

U.S. PATENT DOCUMENTS

| | | |
|---|---|---|
| 2013/0126710 A1 | 5/2013 | Kondo |
| 2013/0141619 A1 | 6/2013 | Lim et al. |
| 2013/0187027 A1 | 7/2013 | Qiao et al. |
| 2013/0207219 A1 | 8/2013 | Ahn |
| 2013/0214127 A1 | 8/2013 | Ohya et al. |
| 2013/0214371 A1 | 8/2013 | Asatsuma et al. |
| 2013/0218728 A1 | 8/2013 | Hashop et al. |
| 2013/0221194 A1 | 8/2013 | Manabe |
| 2013/0229543 A1 | 9/2013 | Hashimoto et al. |
| 2013/0229560 A1 | 9/2013 | Kondo |
| 2013/0234029 A1 | 9/2013 | Bikumandla |
| 2013/0293752 A1 | 11/2013 | Peng et al. |
| 2013/0299674 A1 | 11/2013 | Fowler et al. |
| 2014/0021574 A1 | 1/2014 | Egawa |
| 2014/0042299 A1 | 2/2014 | Wan et al. |
| 2014/0042582 A1 | 2/2014 | Kondo |
| 2014/0070974 A1 | 3/2014 | Park et al. |
| 2014/0078336 A1 | 3/2014 | Beck et al. |
| 2014/0085523 A1 | 3/2014 | Hynecek |
| 2014/0176770 A1 | 6/2014 | Kondo |
| 2014/0211052 A1 | 7/2014 | Choi |
| 2014/0232890 A1 | 8/2014 | Yoo et al. |
| 2014/0247382 A1 | 9/2014 | Moldovan et al. |
| 2014/0306276 A1 | 10/2014 | Yamaguchi |
| 2014/0368687 A1 | 12/2014 | Yu et al. |
| 2015/0070544 A1 | 3/2015 | Smith et al. |
| 2015/0077611 A1 | 3/2015 | Yamashita et al. |
| 2015/0083895 A1 | 3/2015 | Hashimoto et al. |
| 2015/0085134 A1 | 3/2015 | Novotny et al. |
| 2015/0090863 A1 | 4/2015 | Mansoorian et al. |
| 2015/0172574 A1 | 6/2015 | Honda et al. |
| 2015/0179696 A1 | 6/2015 | Kurokawa et al. |
| 2015/0189209 A1 | 7/2015 | Yang et al. |
| 2015/0201142 A1 | 7/2015 | Smith et al. |
| 2015/0208009 A1 | 7/2015 | Oh et al. |
| 2015/0229859 A1 | 8/2015 | Guidash et al. |
| 2015/0237274 A1 | 8/2015 | Yang et al. |
| 2015/0279884 A1 | 10/2015 | Kusumoto |
| 2015/0281613 A1 | 10/2015 | Vogelsang et al. |
| 2015/0287766 A1 | 10/2015 | Kim et al. |
| 2015/0309311 A1 | 10/2015 | Cho |
| 2015/0309316 A1 | 10/2015 | Osterhout et al. |
| 2015/0312461 A1 | 10/2015 | Kim et al. |
| 2015/0312502 A1 | 10/2015 | Borremans |
| 2015/0312557 A1 | 10/2015 | Kim |
| 2015/0350582 A1 | 12/2015 | Korobov et al. |
| 2015/0358569 A1 | 12/2015 | Egawa |
| 2015/0358571 A1 | 12/2015 | Dominguez Castro et al. |
| 2015/0358593 A1 | 12/2015 | Sato |
| 2015/0381907 A1 | 12/2015 | Boettiger et al. |
| 2015/0381911 A1 | 12/2015 | Shen et al. |
| 2016/0011422 A1 | 1/2016 | Thurber et al. |
| 2016/0018645 A1 | 1/2016 | Haddick et al. |
| 2016/0021302 A1 | 1/2016 | Cho et al. |
| 2016/0028974 A1 | 1/2016 | Guidash et al. |
| 2016/0028980 A1 | 1/2016 | Kameyama et al. |
| 2016/0037111 A1 | 2/2016 | Dai et al. |
| 2016/0078614 A1 | 3/2016 | Ryu et al. |
| 2016/0088253 A1 | 3/2016 | Tezuka |
| 2016/0100113 A1 | 4/2016 | Oh et al. |
| 2016/0100115 A1 | 4/2016 | Kusano |
| 2016/0111457 A1 | 4/2016 | Sekine |
| 2016/0112626 A1 | 4/2016 | Shimada |
| 2016/0118992 A1 | 4/2016 | Milkov |
| 2016/0165160 A1 | 6/2016 | Hseih et al. |
| 2016/0197117 A1 | 7/2016 | Nakata et al. |
| 2016/0204150 A1 | 7/2016 | Oh et al. |
| 2016/0210785 A1 | 7/2016 | Balachandreswaran et al. |
| 2016/0240570 A1 | 8/2016 | Barna et al. |
| 2016/0249004 A1 | 8/2016 | Saeki et al. |
| 2016/0255293 A1 | 9/2016 | Gesset |
| 2016/0277010 A1 | 9/2016 | Park et al. |
| 2016/0307945 A1 | 10/2016 | Madurawe |
| 2016/0307949 A1 | 10/2016 | Madurawe |
| 2016/0337605 A1 | 11/2016 | Ito |
| 2016/0353045 A1 | 12/2016 | Kawahito et al. |
| 2016/0360127 A1 | 12/2016 | Dierickx et al. |
| 2017/0013215 A1 | 1/2017 | Mccarten |
| 2017/0039906 A1 | 2/2017 | Jepsen |
| 2017/0041571 A1 | 2/2017 | Tyrrell et al. |
| 2017/0053962 A1 | 2/2017 | Oh et al. |
| 2017/0059399 A1 | 3/2017 | Suh et al. |
| 2017/0062501 A1 | 3/2017 | Velichko et al. |
| 2017/0069363 A1 | 3/2017 | Baker |
| 2017/0070691 A1 | 3/2017 | Nishikido |
| 2017/0099422 A1 | 4/2017 | Goma et al. |
| 2017/0099446 A1 | 4/2017 | Cremers et al. |
| 2017/0104021 A1 | 4/2017 | Park et al. |
| 2017/0104946 A1 | 4/2017 | Hong |
| 2017/0111600 A1 | 4/2017 | Wang et al. |
| 2017/0141147 A1 | 5/2017 | Raynor |
| 2017/0154909 A1 | 6/2017 | Ishizu |
| 2017/0170223 A1 | 6/2017 | Hynecek et al. |
| 2017/0195602 A1 | 7/2017 | Iwabuchi et al. |
| 2017/0201693 A1 | 7/2017 | Sugizaki et al. |
| 2017/0207268 A1 | 7/2017 | Kurokawa |
| 2017/0228345 A1 | 8/2017 | Gupta et al. |
| 2017/0251151 A1 | 8/2017 | Hicks |
| 2017/0270664 A1 | 9/2017 | Hoogi et al. |
| 2017/0272667 A1 | 9/2017 | Hynecek |
| 2017/0272768 A1 | 9/2017 | Tall et al. |
| 2017/0280031 A1 | 9/2017 | Price et al. |
| 2017/0293799 A1 | 10/2017 | Skogo et al. |
| 2017/0310910 A1 | 10/2017 | Smith et al. |
| 2017/0318250 A1* | 11/2017 | Sakakibara .......... H04N 5/3745 |
| 2017/0324917 A1 | 11/2017 | Mlinar et al. |
| 2017/0338262 A1 | 11/2017 | Hirata |
| 2017/0339327 A1 | 11/2017 | Koshkin et al. |
| 2017/0346579 A1 | 11/2017 | Barghi |
| 2017/0350755 A1 | 12/2017 | Geurts |
| 2017/0359497 A1 | 12/2017 | Mandelli et al. |
| 2017/0366766 A1 | 12/2017 | Geurts et al. |
| 2018/0019269 A1 | 1/2018 | Klipstein |
| 2018/0077368 A1 | 3/2018 | Suzuki |
| 2018/0115725 A1 | 4/2018 | Zhang et al. |
| 2018/0136471 A1 | 5/2018 | Miller et al. |
| 2018/0143701 A1 | 5/2018 | Suh et al. |
| 2018/0152650 A1 | 5/2018 | Sakakibara et al. |
| 2018/0167575 A1 | 6/2018 | Watanabe et al. |
| 2018/0175083 A1 | 6/2018 | Takahashi |
| 2018/0176545 A1 | 6/2018 | Aflaki Beni |
| 2018/0204867 A1 | 7/2018 | Kim et al. |
| 2018/0220093 A1 | 8/2018 | Murao et al. |
| 2018/0224658 A1 | 8/2018 | Teller |
| 2018/0227516 A1 | 8/2018 | Mo et al. |
| 2018/0241953 A1 | 8/2018 | Johnson |
| 2018/0270436 A1 | 9/2018 | Ivarsson et al. |
| 2018/0276841 A1 | 9/2018 | Krishnaswamy et al. |
| 2018/0376046 A1 | 12/2018 | Liu |
| 2018/0376090 A1 | 12/2018 | Liu |
| 2019/0035154 A1 | 1/2019 | Liu |
| 2019/0046044 A1 | 2/2019 | Tzvieli et al. |
| 2019/0052788 A1 | 2/2019 | Liu |
| 2019/0052821 A1 | 2/2019 | Berner et al. |
| 2019/0056264 A1 | 2/2019 | Liu |
| 2019/0057995 A1 | 2/2019 | Liu |
| 2019/0058058 A1 | 2/2019 | Liu |
| 2019/0098232 A1 | 3/2019 | Mori et al. |
| 2019/0104263 A1 | 4/2019 | Ochiai et al. |
| 2019/0104265 A1 | 4/2019 | Totsuka et al. |
| 2019/0110039 A1 | 4/2019 | Linde et al. |
| 2019/0123088 A1 | 4/2019 | Kwon |
| 2019/0141270 A1 | 5/2019 | Otaka et al. |
| 2019/0149751 A1 | 5/2019 | Wise |
| 2019/0157330 A1 | 5/2019 | Sato et al. |
| 2019/0172227 A1 | 6/2019 | Kasahara |
| 2019/0172868 A1 | 6/2019 | Chen et al. |
| 2019/0191116 A1 | 6/2019 | Madurawe |
| 2019/0246036 A1 | 8/2019 | Wu et al. |
| 2019/0253650 A1 | 8/2019 | Kim |
| 2019/0327439 A1 | 10/2019 | Chen et al. |
| 2019/0331914 A1 | 10/2019 | Lee et al. |
| 2019/0335151 A1 | 10/2019 | Rivard et al. |
| 2019/0348460 A1 | 11/2019 | Chen et al. |

(56) References Cited

U.S. PATENT DOCUMENTS

| | | |
|---|---|---|
| 2019/0355782 A1 | 11/2019 | Do et al. |
| 2019/0363118 A1 | 11/2019 | Berkovich et al. |
| 2019/0371845 A1 | 12/2019 | Chen et al. |
| 2019/0376845 A1 | 12/2019 | Liu et al. |
| 2019/0379388 A1 | 12/2019 | Gao et al. |
| 2019/0379827 A1 | 12/2019 | Berkovich et al. |
| 2019/0379846 A1 | 12/2019 | Chen et al. |
| 2020/0007800 A1 | 1/2020 | Berkovich et al. |
| 2020/0053299 A1 | 2/2020 | Zhang et al. |
| 2020/0059589 A1 | 2/2020 | Liu et al. |
| 2020/0068189 A1 | 2/2020 | Chen et al. |
| 2020/0186731 A1 | 6/2020 | Chen et al. |
| 2020/0195875 A1 | 6/2020 | Berkovich et al. |
| 2020/0217714 A1 | 7/2020 | Liu |
| 2020/0228745 A1 | 7/2020 | Otaka |
| 2020/0374475 A1 | 11/2020 | Fukuoka et al. |
| 2021/0026796 A1 | 1/2021 | Graif et al. |
| 2021/0099659 A1 | 4/2021 | Miyauchi et al. |
| 2021/0185264 A1 | 6/2021 | Wong et al. |
| 2021/0227159 A1 | 7/2021 | Sambonsugi |
| 2021/0368124 A1 | 11/2021 | Berkovich et al. |

FOREIGN PATENT DOCUMENTS

| | | |
|---|---|---|
| CN | 1812506 A | 8/2006 |
| CN | 101753866 A | 6/2010 |
| CN | 103002228 A | 3/2013 |
| CN | 103207716 A | 7/2013 |
| CN | 104125418 A | 10/2014 |
| CN | 104204904 A | 12/2014 |
| CN | 104469195 A | 3/2015 |
| CN | 104704812 A | 6/2015 |
| CN | 104733485 A | 6/2015 |
| CN | 104754255 A | 7/2015 |
| CN | 204633945 U | 9/2015 |
| CN | 105144699 A | 12/2015 |
| CN | 105529342 A | 4/2016 |
| CN | 105706439 A | 6/2016 |
| CN | 205666884 U | 10/2016 |
| CN | 106255978 A | 12/2016 |
| CN | 106791504 A | 5/2017 |
| CN | 107852473 A | 3/2018 |
| CN | 109298528 A | 2/2019 |
| DE | 202016105510 U1 | 10/2016 |
| EP | 0675345 A2 | 10/1995 |
| EP | 1681856 A2 | 7/2006 |
| EP | 1732134 A1 | 12/2006 |
| EP | 1746820 A1 | 1/2007 |
| EP | 1788802 A1 | 5/2007 |
| EP | 2037505 A1 | 3/2009 |
| EP | 2063630 A1 | 5/2009 |
| EP | 2538664 A2 | 12/2012 |
| EP | 2804074 A2 | 11/2014 |
| EP | 2833619 A1 | 2/2015 |
| EP | 3032822 A1 | 6/2016 |
| EP | 3229457 A1 | 10/2017 |
| EP | 3258683 A1 | 12/2017 |
| EP | 3425352 A1 | 1/2019 |
| EP | 3439039 A1 | 2/2019 |
| EP | 3744085 A2 | 12/2020 |
| JP | H08195906 A | 7/1996 |
| JP | 2001008101 A | 1/2001 |
| JP | 2002199292 A | 7/2002 |
| JP | 2003319262 A | 11/2003 |
| JP | 2005328493 A | 11/2005 |
| JP | 2006197382 A | 7/2006 |
| JP | 2006203736 A | 8/2006 |
| JP | 2007074447 A | 3/2007 |
| JP | 2011216966 A | 10/2011 |
| JP | 2012054495 A | 3/2012 |
| JP | 2012054876 A | 3/2012 |
| JP | 2012095349 A | 5/2012 |
| JP | 2013009087 A | 1/2013 |
| JP | 2013055581 A | 3/2013 |
| JP | 2013172203 A | 9/2013 |
| JP | 2013225774 A | 10/2013 |
| JP | 2014107596 A | 6/2014 |
| JP | 2014165733 A | 9/2014 |
| JP | 2014236183 A | 12/2014 |
| JP | 2015065524 A | 4/2015 |
| JP | 2015126043 A | 7/2015 |
| JP | 2015530855 A | 10/2015 |
| JP | 2015211259 A | 11/2015 |
| JP | 2016092661 A | 5/2016 |
| JP | 2016513942 A | 5/2016 |
| JP | 2017509251 A | 3/2017 |
| KR | 100574959 B1 | 4/2006 |
| KR | 20080019652 A | 3/2008 |
| KR | 20090023549 A | 3/2009 |
| KR | 20110050351 A | 5/2011 |
| KR | 20110134941 A | 12/2011 |
| KR | 20120058337 A | 6/2012 |
| KR | 20120117953 A | 10/2012 |
| KR | 20150095841 A | 8/2015 |
| KR | 20160008267 A | 1/2016 |
| KR | 20160008287 A | 1/2016 |
| TW | 201448184 A | 12/2014 |
| TW | 201719874 A | 6/2017 |
| TW | 201728161 A | 8/2017 |
| TW | I624694 B | 5/2018 |
| WO | 2006124592 A2 | 11/2006 |
| WO | 2006129762 A1 | 12/2006 |
| WO | 2010117462 A1 | 10/2010 |
| WO | 2013099723 A1 | 7/2013 |
| WO | WO-2014055391 A2 | 4/2014 |
| WO | 2014144391 A1 | 9/2014 |
| WO | 2015135836 A1 | 9/2015 |
| WO | 2015182390 A1 | 12/2015 |
| WO | 2016014860 A1 | 1/2016 |
| WO | WO-2016095057 A1 | 6/2016 |
| WO | 2016194653 A1 | 12/2016 |
| WO | WO-2017003477 A1 | 1/2017 |
| WO | WO-2017013806 A1 | 1/2017 |
| WO | WO-2017047010 A1 | 3/2017 |
| WO | 2017058488 A1 | 4/2017 |
| WO | WO-2017069706 A1 | 4/2017 |
| WO | 2017169882 A1 | 10/2017 |
| WO | WO-2017169446 A1 | 10/2017 |
| WO | WO-2019018084 A1 | 1/2019 |
| WO | WO-2019111528 A1 | 6/2019 |
| WO | WO-2019145578 A1 | 8/2019 |
| WO | WO-2019168929 A1 | 9/2019 |

OTHER PUBLICATIONS

Non-Final Office Action dated Mar. 2, 2022 for U.S. Appl. No. 17/127,670, filed Dec. 18, 2020, 18 pages.
Notice of Allowance dated Mar. 2, 2022 for U.S. Appl. No. 16/453,538, filed Jun. 26, 2019, 8 pages.
Notice of Allowance dated Mar. 7, 2022 for U.S. Appl. No. 16/421,441, filed May 23, 2019, 18 pages.
Notice of Allowance dated Mar. 11, 2022 for U.S. Appl. No. 16/716,050, filed Dec. 16, 2019, 13 pages.
Notification of the First Office Action dated Oct. 28, 2021 for Chinese Application No. 2019800218483, filed Jan. 24, 2019, 17 pages.
Advisory Action dated Apr. 7, 2020 for U.S. Appl. No. 15/801,216, filed Nov. 1, 2019, 3 Pages.
Advisory Action dated Oct. 8, 2020 for U.S. Appl. No. 16/210,748, filed Dec. 5, 2018, 4 Pages.
Advisory Action dated Oct. 23, 2019 for U.S. Appl. No. 15/668,241, filed Aug. 3, 2017, 5 Pages.
Amir M.F., et al., "3-D Stacked Image Sensor With Deep Neural Network Computation," IEEE Sensors Journal, IEEE Service Center, New York, NY, US, May 15, 2018, vol. 18 (10), pp. 4187-4199, XP011681876.
Cho K., et al., "A Low Power Dual CDS for a Column-Parallel CMOS Image Sensor," Journal of Semiconductor Technology and Science, Dec. 30, 2012, vol. 12 (4), pp. 388-396.
Chuxi L., et al., "A Memristor-Based Processing-in-Memory Architechture for Deep Convolutional Neural Networks Approxi-

(56) References Cited

OTHER PUBLICATIONS mate Computation," Journal of Computer Research and Development, Jun. 30, 2017, vol. 54 (6), pp. 1367-1380.
Communication Pursuant Article 94(3) dated Dec. 23, 2021 for European Application No. 19744961.4, filed Jun. 28, 2019, 8 pages.
Communication Pursuant Article 94(3) dated Jan. 5, 2022 for European Application No. 19740456.9, filed Jun. 27, 2019, 12 pages.
Corrected Notice of Allowability dated Apr. 9, 2021 for U.S. Appl. No. 16/255,528, filed Jan. 23, 2019, 5 Pages.
Extended European Search Report for European Application No. 18179838.0, dated May 24, 2019, 17 Pages.
Extended European Search Report for European Application No. 18179846.3, dated Dec. 7, 2018, 10 Pages.
Extended European Search Report for European Application No. 18179851.3, dated Dec. 7, 2018, 8 Pages.
Extended European Search Report for European Application No. 18188684.7, dated Jan. 16, 2019, 10 Pages.
Extended European Search Report for European Application No. 18188962.7, dated Oct. 23, 2018, 8 Pages.
Extended European Search Report for European Application No. 18188968.4, dated Oct. 23, 2018, 8 Pages.
Extended European Search Report for European Application No. 19743908.6, dated Sep. 30, 2020, 9 Pages.
Final Office Action dated Dec. 3, 2021 for U.S. Appl. No. 17/072,840, filed Oct. 16, 2020, 23 pages.
Final Office Action dated Jul. 7, 2020 for U.S. Appl. No. 16/210,748, filed Dec. 5, 2018, 11 Pages.
Final Office Action dated Jun. 17, 2019 for U.S. Appl. No. 15/668,241, filed Aug. 3, 2017, 19 Pages.
Final Office Action dated Oct. 18, 2021 for U.S. Appl. No. 16/716,050, filed Dec. 16, 2019, 18 Pages.
Final Office Action dated Oct. 21, 2021 for U.S. Appl. No. 16/421,441, filed May 23, 2019, 23 Pages.
Final Office Action dated Dec. 26, 2019 for U.S. Appl. No. 15/801,216, filed Nov. 1, 2017, 5 Pages.
Final Office Action dated Feb. 27, 2020 for U.S. Appl. No. 16/177,971, filed Nov. 1, 2018, 9 Pages.
Final Office Action dated Jan. 27, 2021 for U.S. Appl. No. 16/255,528, filed Jan. 23, 2019, 31 Pages.
Final Office Action dated Jul. 28, 2021 for U.S. Appl. No. 17/083,920, filed Oct. 29, 2020, 19 Pages.
International Preliminary Report on Patentability for International Application No. PCT/US2018/039350, dated Jan. 9, 2020, 10 Pages.
International Search Report and Written Opinion for International Application No. PCT/US2018/039350, dated Nov. 15, 2018, 11 Pages.
International Search Report and Written Opinion for International Application No. PCT/US2018/039352, dated Oct. 26, 2018, 8 Pages.
International Search Report and Written Opinion for International Application No. PCT/US2018/039431, dated Nov. 7, 2018, 12 Pages.
International Search Report and Written Opinion for International Application No. PCT/US2018/045661, dated Nov. 30, 2018, 11 Pages.
International Search Report and Written Opinion for International Application No. PCT/US2018/045666, dated Dec. 3, 2018, 13 Pages.
International Search Report and Written Opinion for International Application No. PCT/US2018/045673, dated Dec. 4, 2018, 13 Pages.
International Search Report and Written Opinion for International Application No. PCT/US2019/014044, dated May 8, 2019, 9 Pages.
International Search Report and Written Opinion for International Application No. PCT/US2019/014904, dated Aug. 5, 2019, 7 Pages.
International Search Report and Written Opinion for International Application No. PCT/US2019/019756, dated Jun. 13, 2019, 11 Pages.
International Search Report and Written Opinion for International Application No. PCT/US2019/019765, dated Jun. 14, 2019, 9 Pages.
International Search Report and Written Opinion for International Application No. PCT/US2019/025170, dated Jul. 9, 2019, 11 Pages.
International Search Report and Written Opinion for International Application No. PCT/US2019/027727, dated Jun. 27, 2019, 10 Pages.
International Search Report and Written Opinion for International Application No. PCT/US2019/027729, dated Jun. 27, 2019, 9 Pages.
International Search Report and Written Opinion for International Application No. PCT/US2019/031521, dated Jul. 11, 2019, 8 Pages.
International Search Report and Written Opinion for International Application No. PCT/US2019/034007, dated Oct. 28, 2019, 18 Pages.
International Search Report and Written Opinion for International Application No. PCT/US2019/036492, dated Sep. 25, 2019, 8 Pages.
International Search Report and Written Opinion for International Application No. PCT/US2019/036536, dated Sep. 26, 2019, 13 Pages.
International Search Report and Written Opinion for International Application No. PCT/US2019/039410, dated Sep. 30, 2019, 10 Pages.
International Search Report and Written Opinion for International Application No. PCT/US2019/047156, dated Oct. 23, 2019, 9 Pages.
International Search Report and Written Opinion for International Application No. PCT/US2019/048241, dated Jan. 28, 2020, 16 Pages.
International Search Report and Written Opinion for International Application No. PCT/US2019/049756, dated Dec. 16, 2019, 8 pages.
International Search Report and Written Opinion for International Application No. PCT/US2019/059754, dated Mar. 24, 2020, 11 Pages.
International Search Report and Written Opinion for International Application No. PCT/US2019/066805, dated Mar. 6, 2020, 9 Pages.
International Search Report and Written Opinion for International Application No. PCT/US2019/066831, dated Feb. 27, 2020, 11 Pages.
International Search Report and Written Opinion for International Application No. PCT/US2020/044807, dated Sep. 30, 2020, 12 Pages.
International Search Report and Written Opinion for International Application No. PCT/US2020/058097, dated Feb. 12, 2021, 09 Pages.
International Search Report and Written Opinion for International Application No. PCT/US2020/059636, dated Feb. 11, 2021, 18 Pages.
International Search Report and Written Opinion for International Application No. PCT/US2021/031201, dated Aug. 2, 2021, 13 Pages.
International Search Report and Written Opinion for International Application No. PCT/US2021/033321, dated Sep. 6, 2021, 11 pages.
International Search Report and Written Opinion for International Application No. PCT/US2021/041775, dated Nov. 29, 2021, 14 pages.
Millet L., et al., "A 5500-Frames/s 85-GOPS/W 3-D Stacked BSI Vision Chip Based on Parallel In-Focal-Plane Acquisition and Processing," IEEE Journal of Solid-State Circuits, USA, Apr. 1, 2019, vol. 54 (4), pp. 1096-1105, XP011716786.
Non-Final Office Action dated Jan. 1, 2021 for U.S. Appl. No. 16/715,792, filed Dec. 16, 2019, 15 Pages.
Non-Final Office Action dated May 1, 2019 for U.S. Appl. No. 15/927,896, filed Mar. 21, 2018, 10 Pages.
Non-Final Office Action dated May 1, 2020 for U.S. Appl. No. 16/384,720, filed Apr. 15, 2019, 6 Pages.
Non-Final Office Action dated Oct. 1, 2019 for U.S. Appl. No. 16/286,355, filed Feb. 26, 2019, 6 Pages.

(56) References Cited

OTHER PUBLICATIONS

Non-Final Office Action dated Sep. 2, 2021 for U.S. Appl. No. 16/910,844, filed Jun. 24, 2020, 7 Pages.
Non-Final Office Action dated Mar. 4, 2020 for U.S. Appl. No. 16/436,049, filed Jun. 10, 2019, 9 Pages.
Non-Final Office Action dated May 7, 2021 for U.S. Appl. No. 16/421,441, filed May 23, 2019, 17 Pages.
Non-Final Office Action dated Jul. 10, 2019 for U.S. Appl. No. 15/861,588, filed Jan. 3, 2018, 11 Pages.
Non-Final Office Action dated Jul. 10, 2020 for U.S. Appl. No. 16/255,528, filed Jan. 23, 2019, 27 Pages.
Non-Final Office Action dated May 14, 2021 for U.S. Appl. No. 16/716,050, filed Dec. 16, 2019, 16 Pages.
Non-Final Office Action dated Apr. 21, 2021 for U.S. Appl. No. 16/453,538, filed Jun. 26, 2019, 16 Pages.
Non-Final Office Action dated Apr. 21, 2021 for U.S. Appl. No. 17/083,920, filed Oct. 29, 2020, 17 Pages.
Non-Final Office Action dated Dec. 21, 2018 for U.S. Appl. No. 15/668,241, filed Aug. 3, 2017, 16 Pages.
Non-Final Office Action dated Oct. 21, 2021 for U.S. Appl. No. 17/083,920, filed Oct. 29, 2020, 19 Pages.
Non-Final Office Action dated Jul. 22, 2020 for U.S. Appl. No. 16/249,420, filed Jan. 16, 2019, 9 Pages.
Non-Final Office Action dated Jul. 22, 2020 for U.S. Appl. No. 16/369,763, filed Mar. 29, 2019, 15 Pages.
Non-Final Office Action dated Nov. 23, 2018 for U.S. Appl. No. 15/847,517, filed Dec. 19, 2017, 21 Pages.
Non-Final Office Action dated Jul. 25, 2019 for U.S. Appl. No. 15/909,162, filed Mar. 1, 2018, 20 Pages.
Non-Final Office Action dated Sep. 25, 2019 for U.S. Appl. No. 16/177,971, filed Nov. 1, 2018, 9 Pages.
Non-Final Office Action dated Apr. 27, 2021 for U.S. Appl. No. 16/829,249, filed Mar. 25, 2020, 9 Pages.
Non-Final Office Action dated Jun. 27, 2019 for U.S. Appl. No. 15/801,216, filed Nov. 1, 2017, 13 Pages.
Non-Final Office Action dated Aug. 29, 2019 for U.S. Appl. No. 15/983,391, filed May 18, 2018, 12 Pages.
Non-Final Office Action dated Jun. 30, 2020 for U.S. Appl. No. 16/436,049, filed Jun. 10, 2019, 11 Pages.
Non-Final Office Action dated Jan. 31, 2020 for U.S. Appl. No. 16/210,748, filed Dec. 5, 2018, 11 Pages.
Notice of Allowance dated Apr. 1, 2021 for U.S. Appl. No. 16/255,528, filed Jan. 23, 2019, 7 Pages.
Notice of Allowance dated Nov. 2, 2021 for U.S. Appl. No. 16/453,538, filed Jun. 26, 2019, 8 Pages.
Notice of Allowance dated Nov. 3, 2020 for U.S. Appl. No. 16/566,583, filed Sep. 10, 2019, 11 Pages.
Notice of Allowance dated Jun. 4, 2020 for U.S. Appl. No. 16/286,355, filed Feb. 26, 2019, 7 Pages.
Notice of Allowance dated Mar. 5, 2020 for U.S. Appl. No. 15/668,241, filed Aug. 3, 2017, 8 Pages.
Notice of Allowance dated Jan. 7, 2022 for U.S. Appl. No. 16/899,908, filed Jun. 12, 2020, 10 pages.
Notice of Allowance dated Apr. 8, 2020 for U.S. Appl. No. 15/983,391, filed May 18, 2018, 8 Pages.
Notice of Allowance dated Dec. 8, 2021 for U.S. Appl. No. 16/829,249, filed Mar. 25, 2020, 6 pages.
Notice of Allowance dated Feb. 12, 2020 for U.S. Appl. No. 16/286,355, filed Feb. 26, 2019, 7 Pages.
Notice of Allowance dated Oct. 14, 2020 for U.S. Appl. No. 16/384,720, filed Apr. 15, 2019, 8 Pages.
Notice of Allowance dated Oct. 15, 2020 for U.S. Appl. No. 16/544,136, filed Aug. 19, 2019, 11 Pages.
Notice of Allowance dated Apr. 16, 2021 for U.S. Appl. No. 16/715,792, filed Dec. 16, 2019, 10 Pages.
Notice of Allowance dated Sep. 16, 2020 for U.S. Appl. No. 16/435,449, filed Jun. 7, 2019, 7 Pages.
Notice of Allowance dated Nov. 17, 2021 for U.S. Appl. No. 16/899,908, filed Jun. 12, 2020, 7 Pages.
Notice of Allowance dated Mar. 18, 2020 for U.S. Appl. No. 15/909,162, filed Mar. 1, 2018, 9 Pages.
Notice of Allowance dated Nov. 18, 2020 for U.S. Appl. No. 16/249,420, filed Jan. 16, 2019, 8 Pages.
Notice of Allowance dated Dec. 21, 2021 for U.S. Appl. No. 16/550,851, filed Aug. 26, 2019, 10 pages.
Notice of Allowance dated Dec. 22, 2021 for U.S. Appl. No. 16/910,844, filed Jun. 24, 2020, 7 pages.
Notice of Allowance dated Jan. 22, 2021 for U.S. Appl. No. 16/369,763, filed Mar. 29, 2019, 8 Pages.
Notice of Allowance dated Nov. 22, 2021 for U.S. Appl. No. 16/820,594, filed Mar. 16, 2020, 18 pages.
Notice of Allowance dated Nov. 22, 2021 for U.S. Appl. No. 16/820,594, filed Mar. 16, 2020, 8 pages.
Notice of Allowance dated Jun. 23, 2020 for U.S. Appl. No. 15/801,216, filed Nov. 1, 2017, 5 Pages.
Notice of Allowance dated Apr. 24, 2020 for U.S. Appl. No. 16/177,971, filed Nov. 1, 2018, 6 Pages.
Notice of Allowance dated Nov. 24, 2021 for U.S. Appl. No. 16/910,844, filed Jun. 24, 2020, 8 pages.
Notice of Allowance dated Aug. 25, 2021 for U.S. Appl. No. 16/715,792, filed Dec. 16, 2019, 9 Pages.
Notice of Allowance dated Oct. 25, 2021 for U.S. Appl. No. 16/435,451, filed Jun. 7, 2019, 8 Pages.
Notice of Allowance dated Aug. 26, 2020 for U.S. Appl. No. 16/384,720, filed Apr. 15, 2019, 8 Pages.
Notice of Allowance dated Nov. 26, 2019 for U.S. Appl. No. 15/861,588, filed Jan. 3, 2018, 9 Pages.
Notice of Allowance dated Oct. 26, 2021 for U.S. Appl. No. 16/896,130, filed Jun. 8, 2020, 8 Pages.
Notice of Allowance dated Jul. 27, 2020 for U.S. Appl. No. 16/435,449, filed Jun. 7, 2019, 8 Pages.
Notice of Allowance dated Jun. 29, 2020 for U.S. Appl. No. 15/668,241, filed Aug. 3, 2017, 8 Pages.
Notice of Allowance dated Aug. 30, 2021 for U.S. Appl. No. 16/829,249, filed Mar. 25, 2020, 8 pages.
Notice of Reason for Rejection dated Nov. 16, 2021 for Japanese Application No. 2019-571699, filed Jun. 25, 2018, 13 pages.
Office Action dated Jul. 3, 2020 for Chinese Application No. 201810821296, filed Jul. 24, 2018, 17 Pages.
Office Action dated Jul. 7, 2021 for European Application No. 19723902.3, filed Apr. 1, 2019, 3 Pages.
Office Action dated Mar. 9, 2021 for Chinese Application No. 201810821296, filed Jul. 24, 2018, 10 Pages.
Office Action dated Aug. 14, 2019 for European Application No. 18188968.4, filed Aug. 14, 2018, 5 Pages.
Office Action dated Dec. 14, 2021 for Japanese Application No. 2019571598, filed Jun. 26, 2018, 12 pages.
Office Action dated Nov. 26, 2019 for European Application No. 18188684.7, filed Aug. 13, 2018, 9 Pages.
Office Action dated Aug. 28, 2019 for European Application No. 18188962.7, filed Aug. 14, 2018, 6 Pages.
Office Action dated Jun. 28, 2020 for Chinese Application No. 201810821296, filed Jul. 24, 2018, 2 Pages.
Partial European Search Report for European Application No. 18179838.0, dated Dec. 5, 2018, 13 Pages.
Partial International Search Report and Provisional Opinion for International Application No. PCT/US2021/041775, dated Oct. 8, 2021, 12 pages.
Restriction Requirement dated Feb. 2, 2021 for U.S. Appl. No. 16/716,050, filed Dec. 16, 2019, 7 Pages.
Sebastian A., et al., "Memory Devices and Applications for In-memory Computing," Nature Nanotechnology, Nature Publication Group, Inc, London, Mar. 30, 2020, vol. 15 (7), pp. 529-544, XP037194929.
Shi C., et al., "A 1000fps Vision Chip Based on a Dynamically Reconfigurable Hybrid Architecture Comprising a PE Array and Self-Organizing Map Neural Network," International Solid-State Circuits Conference, Session 7, Image Sensors, Feb. 10, 2014, pp. 128-130, XP055826878.
Snoeij M.F., et al., "A low Power Column-Parallel 12-bit ADC for CMOS Imagers," XP007908033, Jun. 1, 2005, pp. 169-172.

(56) References Cited

OTHER PUBLICATIONS

Supplemental Notice of Allowability dated Apr. 29, 2020 for U.S. Appl. No. 15/668,241, filed Aug. 3, 2017, 5 Pages.
Tanner S., et al., "Low-Power Digital Image Sensor for Still Picture Image Acquisition," Visual Communications and Image Processing, San Jose, Jan. 22, 2001, vol. 4306, pp. 358-365, XP008014232.
International Search Report and Written Opinion for International Application No. PCT/US2021/057966, dated Feb. 22, 2022, 15 pages.
Notice of Allowance dated Apr. 19, 2022 for U.S. Appl. No. 16/899,908, filed Jun. 12, 2020, 10 pages.
Notice of Allowance dated Apr. 27, 2022 for U.S. Appl. No. 16/896,130, filed Jun. 8, 2020, 08 pages.
Notice of Allowance dated Apr. 28, 2022 for U.S. Appl. No. 16/435,451, filed Jun. 7, 2019, 09 pages.
Notice of Allowance dated Jul. 5, 2022 for U.S. Appl. No. 16/899,908, filed Jun. 12, 2020, 10 pages.
Notice of Allowance dated Jun. 8, 2022 for U.S. Appl. No. 17/150,925, filed Jan. 15, 2021, 10 pages.
Office Action for European Application No. 18179851.3, dated May 19, 2022, 7 pages.
Office Action dated Jul. 5, 2022 for Korean Application No. 10-2020-7002533, filed Jun. 25, 2018, 13 pages.
Office Action dated May 18, 2022 for Taiwan Application No. 108122878, 24 pages.
Office Action dated Jul. 12, 2022 for Japanese Application No. 2019-571699, filed Jun. 25, 2018, 5 pages.
Office Action dated Jul. 19, 2022 for Japanese Application No. 2019571598, filed Jun. 26, 2018, 10 pages.
U.S. Appl. No. 16/899,908, Notice of Allowance dated Sep. 17, 2021, 11 pages.
Taiwan Application No. 107124385, Office Action dated Sep. 30, 2021, 17 pages (8 pages of Original Document and 9 pages of English Translation).
U.S. Appl. No. 16/435,451, Final Office Action dated Jul. 12, 2021, 13 pages.
International Search Report and Written Opinion for International Application No. PCT/US2021/054327, dated Feb. 14, 2022, 8 pages.
International Preliminary Report on Patentability for International Application No. PCT/US2020/044807, dated Feb. 17, 2022, 10 pages.
Notice of Allowance dated Feb. 16, 2022 for U.S. Appl. No. 17/150,925, filed Jan. 15, 2021, 9 pages.
U.S. Appl. No. 15/719,345, "Final Office Action", dated Apr. 29, 2020, 14 pages.
U.S. Appl. No. 15/719,345, "Non- Final Office Action", dated Nov. 25, 2019, 14 pages.
U.S. Appl. No. 15/719,345, "Notice of Allowance", dated Aug. 12, 2020, 11 pages.
U.S. Appl. No. 15/719,345, "Notice of Allowance", dated Sep. 3, 2020, 12 pages.
U.S. Appl. No. 15/847,517, "Notice of Allowance", dated May 1, 2019, 11 pages.
U.S. Appl. No. 15/876,061, "Corrected Notice of Allowability", dated Apr. 28, 2020, 3 pages.
U.S. Appl. No. 15/876,061, "Non-Final Office Action", dated Sep. 18, 2019, 23 pages.
U.S. Appl. No. 15/876,061, "Notice of Allowability", dated May 6, 2020, 2 pages.
U.S. Appl. No. 15/876,061, "Notice of Allowance", dated Feb. 4, 2020, 13 pages.
U.S. Appl. No. 15/983,379, "Notice of Allowance", dated Oct. 18, 2019, 9 pages.
U.S. Appl. No. 16/382,015, "Notice of Allowance", dated Jun. 11, 2020, 11 pages.
U.S. Appl. No. 16/431,693, "Non-Final Office Action", dated Jan. 30, 2020, 6 pages.
U.S. Appl. No. 16/431,693, "Notice of Allowance", dated Jun. 24, 2020, 7 pages.
U.S. Appl. No. 16/435,451, "Non-Final Office Action", dated Feb. 1, 2021, 14 pages.
U.S. Appl. No. 16/436,137, "Non-Final Office Action", dated Dec. 4, 2020, 12 pages.
U.S. Appl. No. 16/454,787, "Notice of Allowance", dated Apr. 22, 2020, 10 pages.
U.S. Appl. No. 16/454,787, "Notice of Allowance", dated Jul. 9, 2020, 9 pages.
U.S. Appl. No. 16/454,787, "Notice of Allowance", dated Sep. 9, 2020, 9 pages.
U.S. Appl. No. 16/566,583, "Corrected Notice of Allowability", dated Dec. 11, 2020, 2 pages.
U.S. Appl. No. 16/566,583, "Corrected Notice of Allowability", dated Feb. 3, 2021, 2 pages.
U.S. Appl. No. 16/566,583, "Final Office Action", dated Apr. 15, 2020, 24 pages.
U.S. Appl. No. 16/566,583, "Non-Final Office Action", dated Jul. 27, 2020, 11 pages.
U.S. Appl. No. 16/566,583, "Non-Final Office Action", dated Oct. 1, 2019, 10 pages.
U.S. Appl. No. 16/707,988, "Non-Final Office Action", dated Sep. 22, 2020, 15 pages.
U.S. Appl. No. 16/707,988, "Notice of Allowance", dated May 5, 2021, 14 pages.
U.S. Appl. No. 16/820,594, "Non-Final Office Action", dated Jul. 2, 2021, 8 pages.
U.S. Appl. No. 16/896,130, "Non-Final Office Action", dated Mar. 15, 2021, 16 pages.
U.S. Appl. No. 17/072,840, "Non-Final Office Action", dated Jun. 8, 2021, 7 pages.
U.S. Appl. No. 17/150,925, "Notice of Allowance", dated Jul. 8, 2021, 10 pages.
EP18189100.3, "Extended European Search Report", dated Oct. 9, 2018, 8 pages.
Kavusi, et al., "Quantitative Study of High-Dynamic-Range Image Sensor Architectures", Proceedings of Society of Photo-Optical Instrumentation Engineers—The International Society for Optical Engineering, vol. 5301, Jun. 2004, pp. 264-275.
International Application No. PCT/US2018/046131, International Search Report and Written Opinion dated Dec. 3, 2018, 10 pages.
International Application No. PCT/US2018/064181, International Search Report and Written Opinion dated Mar. 29, 2019, 12 pages.
International Application No. PCT/US2019/035724, International Search Report and Written Opinion dated Sep. 10, 2019, 12 pages.
International Application No. PCT/US2019/036484, International Search Report and Written Opinion dated Sep. 19, 2019, 10 pages.
International Application No. PCT/US2019/036575, International Search Report and Written Opinion dated Sep. 30, 2019, 16 pages.
International Application No. PCT/US2019/039758, International Search Report and Written Opinion dated Oct. 11, 2019, 13 pages.
Snoeij, "A Low Power Column Parallel 12-Bit ADC for CMOS Imagers", Institute of Electrical and Electronics Engineers Workshop on Charge-Coupled Devices And Advanced Image Sensors, Jun. 2005, pp. 169-172.
Xu, et al., "A New Digital-Pixel Architecture for CMOS Image Sensor with Pixel-Level ADC and Pulse Width Modulation using a 0.18 Mu M CMOS Technology", Institute of Electrical and Electronics Engineers Conference on Electron Devices and Solid-State Circuits, Dec. 16-18, 2003, pp. 265-268.
European Communication Pursuant to Article 94(3) EPC dated Jul. 7, 2021.
International Application No. PCT/US2019/065430, International Search Report and Written Opinion dated Mar. 6, 2020, 13 pages.
U.S. Appl. No. 16/707,988, Corrected Notice of Allowability dated Jul. 26, 2021, 2 pages.
U.S. Appl. No. 16/896,130, Notice of Allowance dated Jul. 13, 2021, 8 pages.
European Application No. 19737299.8, Office Action dated Jul. 7, 2021, 5 pages.
U.S. Appl. No. 16/436,049, Notice of Allowance dated Oct. 21, 2020, 8 pages.
Corrected Notice of Allowance dated Mar. 29, 2022 for U.S. Appl. No. 17/150,925, filed Jan. 15, 2021, 2 Pages.

(56) References Cited

OTHER PUBLICATIONS

International Search Report and Written Opinion for International Application No. PCT/US2021/065174 dated Mar. 28, 2022, 10 pages.
Non-Final Office Action dated Mar. 28, 2022 for U.S. Appl. No. 17/072,840, filed Oct. 16, 2020, 8 Pages.
Office Action dated Mar. 15, 2022 for Japanese Patent Application No. 2020505830, filed on Aug. 9, 2018, 12 pages.
Non-Final Office Action dated Apr. 13, 2022 for U.S. Appl. No. 16/820,594, filed Mar. 16, 2020, 7 pages.
Office Action dated Mar. 17, 2022 for Taiwan Application No. 20180124384, 26 pages.
Office Action dated Mar. 29, 2022 for Japanese Patent Application No. 2020520431, filed on Jun. 25, 2018, 10 pages.
Corrected Notice of Allowability dated Jan. 9, 2023 for U.S. Appl. No. 17/150,925, filed Jan. 15, 2021, 8 pages.
Final Office Action dated Dec. 2, 2022 for U.S. Appl. No. 17/072,840, filed Oct. 16, 2020, 9 pages.
Notice of Allowance dated Dec. 6, 2022 for U.S. Appl. No. 16/896,130, filed Jun. 8, 2020, 8 pages.
Notice of Allowance dated Apr. 7, 2021 for U.S. Appl. No. 16/436,137, filed Jun. 10, 2019, 9 pages.
Notice of Allowance dated Dec. 9, 2022 for U.S. Appl. No. 16/435,451, filed Jun. 7, 2019, 8 pages.
Notice of Allowance dated Aug. 10, 2022 for U.S. Appl. No. 16/896,130, filed Jun. 8, 2020, 8 pages.
Notice of Allowance dated Feb. 10, 2023 for U.S. Appl. No. 16/899,908, filed Jun. 12, 2020, 9 pages.
Notice of Allowance dated Dec. 13, 2022 for U.S. Appl. No. 16/820,594, filed Mar. 16, 2020, 5 pages.
Notice of Allowance dated Oct. 21, 2022 for U.S. Appl. No. 16/899,908, filed Jun. 12, 2020, 10 pages.
Notice of Allowance dated Aug. 22, 2022 for U.S. Appl. No. 16/435,451, filed Jun. 7, 2019, 08 pages.
Notice of Allowance dated Dec. 22, 2022 for U.S. Appl. No. 17/496,712, filed Oct. 7, 2021, 13 pages.
Notice of Allowance dated Sep. 22, 2022 for U.S. Appl. No. 17/150,925, filed Jan. 15, 2021, 9 pages.
Notice of Allowance dated Aug. 23, 2022 for U.S. Appl. No. 16/896,130, filed Jun. 8, 2020, 2 pages.
Office Action dated Nov. 2, 2022 for Taiwan Application No. 107128759, filed Aug. 17, 2018, 16 pages.
Office Action dated Dec. 1, 2022 for Korean Application No. 10-2020-7002306, filed Jun. 25, 2018, 13 pages.
Office Action dated Nov. 1, 2022 for Japanese Patent Application No. 2020-520431, filed on Jun. 25, 2018, 11 pages.
Office Action dated Nov. 15, 2022 for Taiwan Application No. 108120143, filed Jun. 11, 2019, 8 pages.
Office Action dated Sep. 26, 2022 for Korean Patent Application No. 10-2020-7002496, filed on Jun. 26, 2018, 17 pages.
Office Action dated Sep. 29, 2022 for Taiwan Application No. 108122878, filed Jun. 28, 2019, 9 pages.
Office Action dated Aug. 30, 2022 for Japanese Patent Application No. 2020505830, filed on Aug. 9, 2018, 5 pages.
Office Action dated Jan. 5, 2023 for Chinese Application No. 201980043907.7, filed Jun. 28, 2019, 14 pages.
Office Action dated Feb. 7, 2023 for Japanese Application No. 2019-571699, filed Jun. 25, 2018, 5 pages.
International Preliminary Report on Patentability for International Application No. PCT/US2021/054327, dated Apr. 20, 2023, 7 pages.
International Preliminary Report on Patentability for International Application No. PCT/US2021/057966, dated May 19, 2023, 12 pages.
Notice of Allowance dated Apr. 13, 2023 for U.S. Appl. No. 17/072,840, filed Oct. 16, 2020, 6 pages.
Notice of Allowance dated Mar. 17, 2023 for U.S. Appl. No. 16/896,130, filed Jun. 8, 2020, 8 pages.
Notice of Allowance dated Apr. 24, 2023 for U.S. Appl. No. 17/496,712, filed Oct. 7, 2021, 12 pages.
Notice of Allowance dated Mar. 27, 2023 for U.S. Appl. No. 16/820,594, filed Mar. 16, 2020, 5 pages.
Office Action dated Mar. 10, 2023 for Chinese Application No. 201880053600.0, filed Jun. 25, 2018, 10 pages.
Office Action dated Feb. 15, 2023 for Chinese Application No. 201980049477.X, filed Jun. 11, 2019, 19 pages.
Office Action dated Mar. 16, 2023 for Korean Patent Application No. 10-2020-7002496, filed on Jun. 26, 2018, 3 pages.
Office Action dated May 9, 2023 for Japanese Patent Application No. 2020-5204312, filed on Jun. 25, 2018, 6 pages.
Office Action dated May 9, 2023 for Japanese Patent Application No. 2020-563959, filed on Nov. 12, 2020, 5 pages.
Corrected Notice of Allowance dated Aug. 9, 2023 for U.S. Appl. No. 17/072,840, filed Oct. 16, 2020, 3 pages.
International Preliminary Report on Patentability for International Application No. PCT/US2021/065174 dated Jul. 13, 2023, 9 pages.
Notice of Allowance dated Jun. 1, 2023 for U.S. Appl. No. 16/899,908, filed Jun. 12, 2020, 9 pages.
Notice of Allowance dated Jul. 7, 2023 for U.S. Appl. No. 16/896,130, filed Jun. 8, 2020, 8 pages.
Notice of Allowance dated Aug. 18, 2023 for U.S. Appl. No. 17/496,712, filed Oct. 7, 2021, 12 pages.
Notice of Allowance dated Jul. 19, 2023 for U.S. Appl. No. 16/820,594, filed Mar. 16, 2020, 5 pages.
Notice of Allowance dated Jun. 22, 2023 for U.S. Appl. No. 16/435,451, filed Jun. 7, 2019, 10 pages.
Notice of Allowance dated Jul. 31, 2023 for U.S. Appl. No. 17/072,840, filed Oct. 16, 2020, 6 pages.
Office Action dated Jul. 4, 2023 for Korean Application No. 10-2020-7002533, filed Jun. 25, 2018, 3 pages.
Office Action dated Jun. 1, 2023 for Korean Application No. 10-2020-7002306, filed Jun. 25, 2018, 3 pages.
Office Action dated Jul. 4, 2023 for Japanese Application No. 2019571598, filed Jun. 26, 2018, 34 pages.

\* cited by examiner

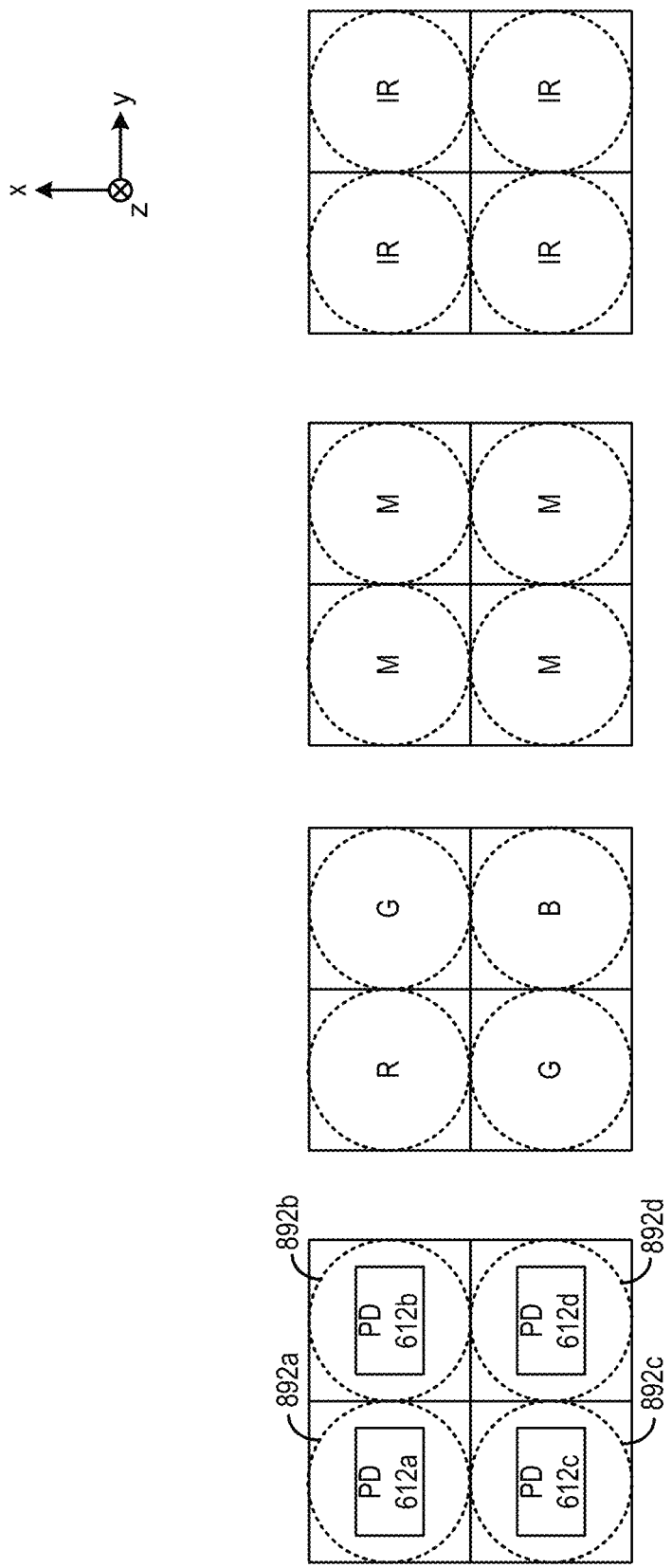

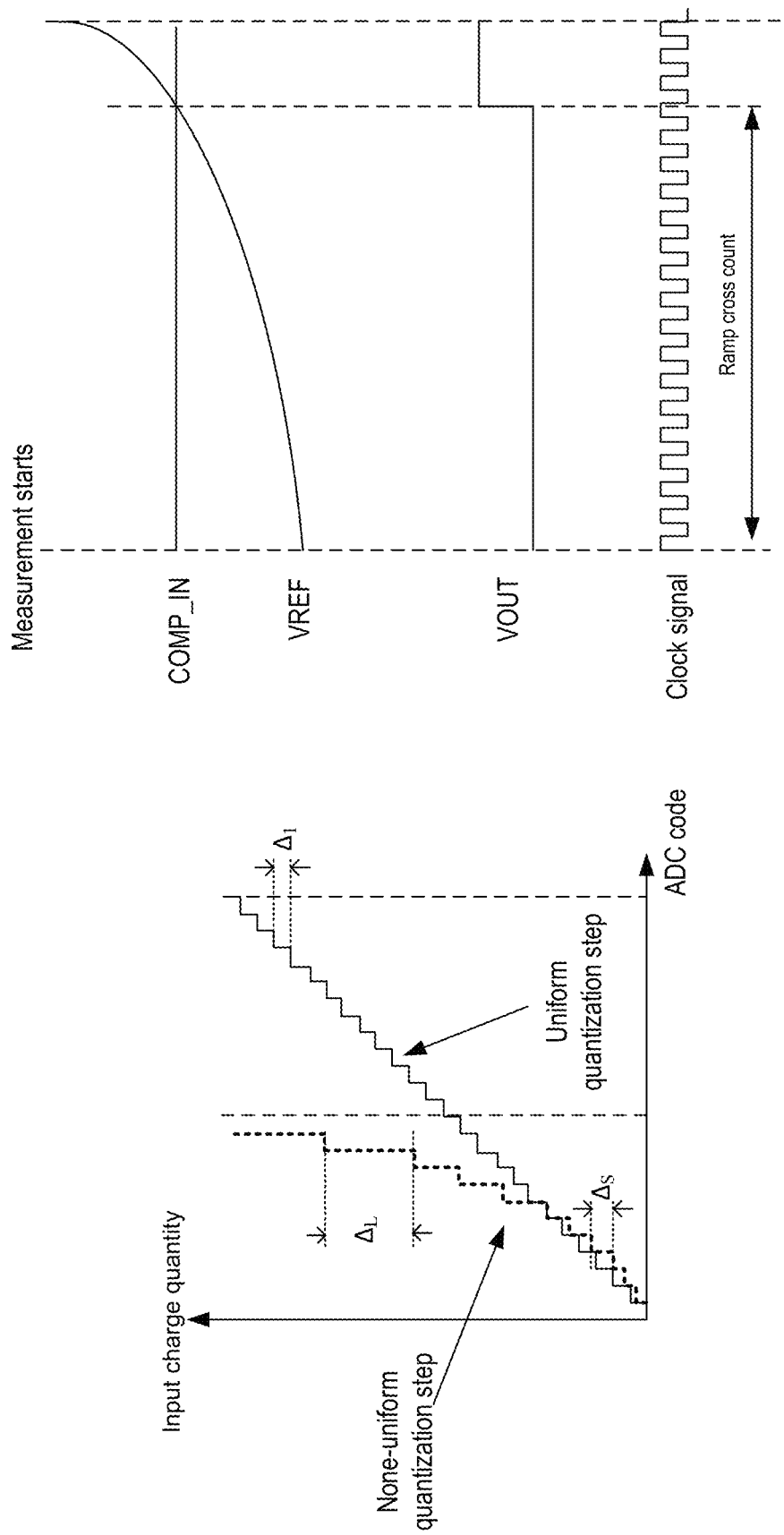

US 11,902,685 B1

PIXEL SENSOR HAVING HIERARCHICAL MEMORY

RELATED APPLICATION

This patent application claims priority to U.S. Provisional Patent Application Ser. No. 63/016,473, filed Apr. 28, 2020, entitled "Memory- and Comparator-Shared Exposure Center-Aligned Digital Pixel Sensor with Off-Array Memory," and which is assigned to the assignee hereof and is incorporated herein by reference in its entirety for all purposes.

BACKGROUND

A typical pixel in an image sensor includes a photodiode to sense incident light by converting photons into charge (e.g., electrons or holes). The incident light can include components of different wavelength ranges for different applications, such as two dimensional- (2D) and three dimensional- (3D) sensing. Moreover, to reduce image distortion, a global shutter operation can be performed in which each photodiode of the array of photodiodes senses the incident light simultaneously in a global exposure period to generate the charge. The charge can be converted by a charge sensing unit (e.g., a floating diffusion) to convert to a voltage. The array of pixel cells can measure different components of the incident light based on the voltages converted by the charge sensing unit and provide the measurement results for generation of 2D and 3D images of a scene.

SUMMARY

The present disclosure relates to image sensors. More specifically, and without limitation, this disclosure relates to a pixel cell. This disclosure also relates to operating the circuitries of pixel cells to generate a digital representation of the intensity of incident light.

In some examples, an apparatus is provided. The apparatus comprises an array of pixel cells, each pixel cell including: a photodiode to generate a charge in response to incident light, a charge sensing unit configured to generate a voltage based on the charge, and an in-pixel memory configured to store a digital output, the digital output being generated by a quantizer based on quantizing the voltage. The apparatus further comprises a bus interface, an off-array frame memory connected to the bus interface and the array of pixel cells, the in-pixel memory of the array of pixel cells being connected to the frame memory via a set of parallel interconnects, and a frame memory controller. The frame memory controller is configured to: control the frame memory to receive, via the set of parallel interconnects, the digital outputs from the in-pixel memory of each pixel cell of the array of pixel cells; store the digital outputs in the frame memory; fetch the digital outputs from the frame memory; and transmit the digital outputs to a host device via the bus interface.

In some aspects, the frame memory is housed within a same chip package as the array of pixel cells.

In some aspects, the in-pixel memory of the array of pixel cells is formed in a first semiconductor substrate. The frame memory is formed in a second semiconductor substrate, the first semiconductor substrate and the second semiconductor forming a vertical stack. The in-pixel memory of the array of pixel cells and the frame memory are connected via a set of parallel vertical interconnects.

In some aspects, the set of parallel vertical interconnects comprise at least one of: through silicon vias (TSVs), micro-TSVs, or Copper-Copper bumps.

In some aspects, the photodiode is a first photodiode; the charge is a first charge; the digital output is a first digital output; and the voltage is a first voltage. Each pixel cell of the array of pixel cells further comprises a second photodiode configured to generate a second charge in response to incident light. The charge sensing unit of the pixel cell is configured to, after outputting the first voltage, output a second voltage based on the second charge. The pixel cell is configured to, after the first digital output is transferred from the in-pixel memory to the frame memory, use the quantizer to quantize the second voltage to generate a second digital output. The in-pixel memory is configured to overwrite the first digital output with the second digital output.

In some aspects, the in-pixel memory has sufficient capacity to store the first digital output or the second digital output.

In some aspects, the in-pixel memory of the array of pixel cells is connected to the bus interface. The in-pixel memory of the array of pixel cells is configured to transmit the second digital outputs to the host device via the bus interface.

In some aspects, the first photodiode is configured to generate the first charge within a first exposure period between a first time and a second time. The second photodiode is configured to generate the second charge within a second exposure period between a third time and a fourth time. The fourth time is delayed from the third time by a processing delay, the processing delay including a quantization time by the quantizer to generate the first digital output, an in-pixel memory access time to store the first digital output into the in-pixel memory, and a transfer time of the first digital outputs from the in-pixel memory of the array of pixel cells to the frame memory.

In some aspects, the first time is also delayed from the third time by the processing delay.

In some aspects, the digital output is a first digital output. The photodiode is configured to: store a first portion of the charge as residual charge; and after being saturated by the residual charge, output a second portion of the charge as overflow charge to the charge sensing unit. Each pixel cell of the array of pixel cells is configured to: quantize the overflow charge stored in the charge sensing unit to generate the first digital output; transfer the residual charge to the charge sensing unit; quantize the residual charge stored in the charge sensing unit to generate a second digital output; and store the first digital output in the in-pixel memory based on the photodiode being saturated by the residual charge.

In some aspects, the charge sensing unit includes a capacitor having a configurable capacity. The capacitor is configured to have a first capacity to store the overflow charge. The capacitor is also configured to have a second capacity lower than the first capacity to store the residual charge.

In some aspects, the photodiode is configured to store the charge. Each pixel cell of the array of pixel cells is configured to transfer the charge from the photodiode to the charge sensing unit to generate the voltage.

In some aspects, the digital outputs are stored as light measurement values in the frame memory. Each pixel cell of the array of pixel cells is configured to: reset the charge sensing unit to cause the charge sensing unit to output a reset voltage; use the quantizer to output a dark pixel value based on quantizing the reset voltage; and store the dark pixel value in the in-pixel memory. The apparatus further comprises a digital correlated double sampling (CDS) circuit configured to: for each pixel cell, fetch the dark pixel value and the light measurement value from the frame memory; compute a difference between the dark pixel value and light measurement value; and transmit the difference as a noise-corrected pixel value to the host device via the bus interface.

In some aspects, the frame memory controller is configured to, within a first time, when the in-pixel memory of a first row of pixel cells of the array of pixel cells is connected to a first row of memory cells of the frame memory: receive a first subset of the digital outputs from the in-pixel memory of the first row of pixel cells of the array of pixel cells; and store the first subset of the digital outputs at the first row of memory cells of the frame memory. The frame memory controller is further configured to, within a second time after the first time, when the in-pixel memory of a second row of pixel cells of the array of pixel cells is connected to a second row of memory cells of the frame memory: receive a second subset of the digital outputs from the in-pixel memory of the second row of pixel cells of the array of pixel cells; and store the second subset of the digital outputs at the second row of memory cells of the frame memory.

In some aspects, the frame memory controller is configured to, within a first time, when the in-pixel memory of a first row and a second row of pixel cells of the array of pixel cells is connected to, respectively and simultaneously, a first row and a second row of memory cells of the frame memory: receive a first subset of the digital outputs from the in-pixel memory of the first row of pixel cells; receive a second subset of the digital outputs from the in-pixel memory of the second row of pixel cells; store the first subset of the digital outputs at the second row of memory cells of the frame memory; and store the first subset of the digital outputs at the second row of memory cells of the frame memory. The frame memory controller is further configured to, within a second time, when the in-pixel memory of a third row and a fourth row of pixel cells of the array of pixel cells is connected to, respectively and simultaneously, a third row and a fourth row of memory cells of the frame memory: receive a third subset of the digital outputs from the in-pixel memory of the third row of pixel cells; receive a fourth subset of the digital outputs from the in-pixel memory of the fourth row of pixel cells; store the third subset of the digital outputs at the third row of memory cells of the frame memory; and store the fourth subset of the digital outputs at the fourth row of memory cells of the frame memory.

In some aspects, the bus interface is a first bus interface. The apparatus further comprises a second bus interface. The frame memory controller is configured to: at a first time, select a first memory cell and a second memory cell of the frame memory; transmit, via the first bus interface, a first digital output from the first memory cell to the host device; transmit, via the second bus interface, a second digital output from the second memory cell to the host device; at a second time, select a third memory cell and a fourth memory cell of the frame memory; transmit, via the first bus interface, a third digital output from the third memory cell to the host device; and transmit, via the second bus interface, a fourth digital output from the fourth memory cell to the host device.

In some aspects, the photodiode is a first photodiode associated with a first wavelength channel. Each pixel cell of the array of pixel cells further comprises a second photodiode associated with second wavelength channel. The first digital output and the second digital output are generated for the first photodiode and the second photodiode of a first pixel cell of the array of pixel cells. The third digital output and the fourth digital output are generated for the first photodiode and the second photodiode of a second pixel cell of the array of pixel cells.

In some aspects, the first digital output and the third digital output are generated by the first photodiode of, respectively, the first pixel cell and the second pixel cell. The second digital output and the fourth digital output are generated by the second photodiode of, respectively, the first pixel cell and the second pixel cell.

In some aspects, the first digital output and the third digital output are generated by, respectively, the first photodiode of the first pixel cell and the second photodiode of the second pixel cell. The second digital output and the fourth digital output are generated by, respectively, the second photodiode of the first pixel cell and the first photodiode of the second pixel cell.

In some examples, a method is provided. The method comprises: generating, using a photodiode of each pixel cell of an array of pixel cells, a charge in response to incident light; generating, using a charge sensing unit of each pixel cell of the array of pixel cells and based on the charge, a voltage; generating, using a quantizer, a digital output for each pixel cell based on quantizing the voltage output by the charge sensing unit of the respective pixel cell; storing, at an in-pixel memory of each pixel cell of the array of pixel cells, the digital output for the respective pixel cell; receiving, by an off-array frame memory via a set of parallel interconnects, the digital outputs from the in-pixel memory of each pixel cell of the array of pixel cells; storing the digital outputs in the frame memory; and transmitting, via a bus interface, the digital outputs from the frame memory to a host device.

BRIEF DESCRIPTION OF THE DRAWINGS

Illustrative examples are described with reference to the following figures.

FIGS. 8A, 8B, 8C, 8D, and 8E illustrate examples of components of the image sensor of FIG. 6.

FIGS. 11A, 11B, 11C, and 11D illustrate techniques for performing quantization.

Figure 1A:
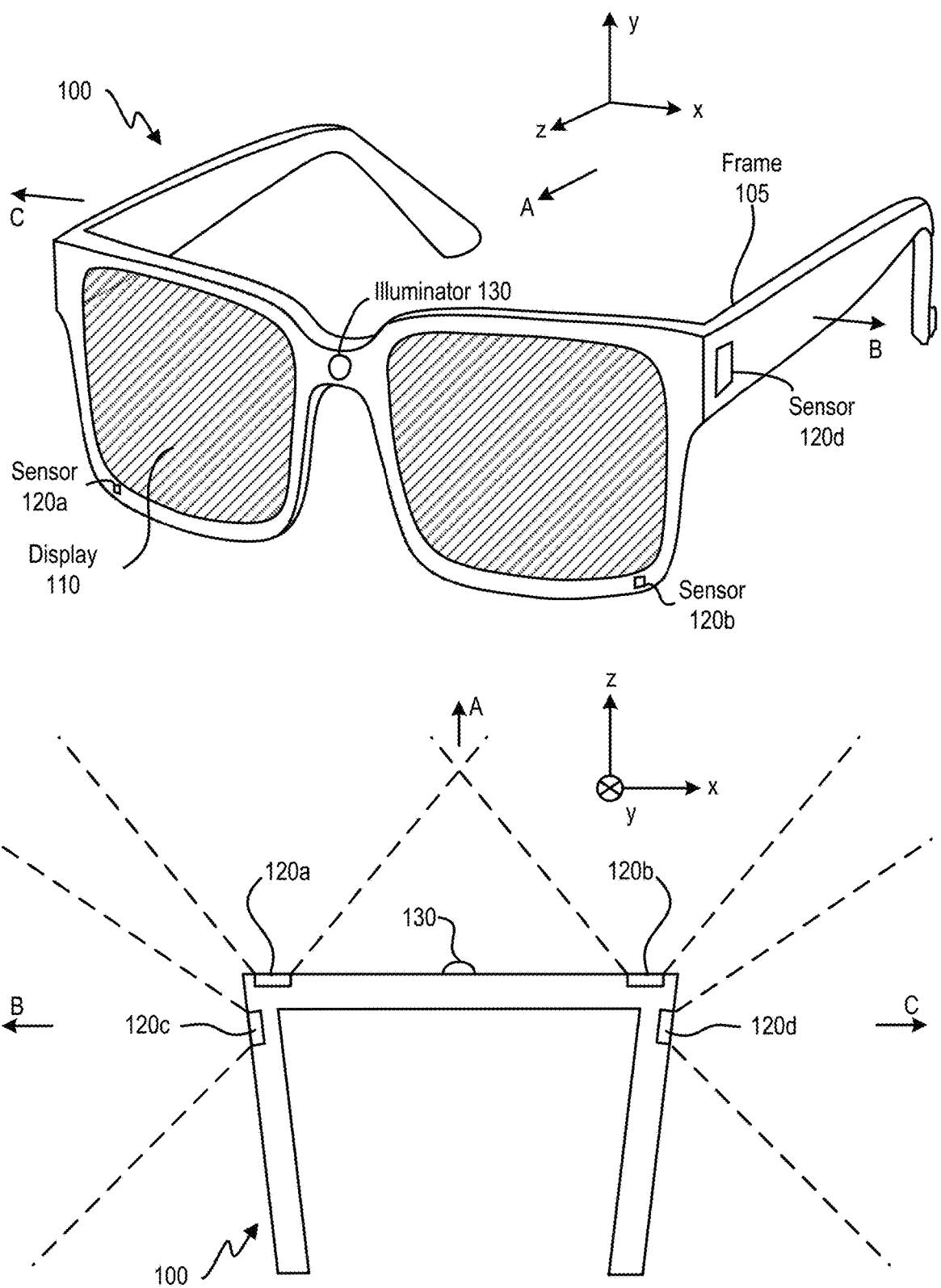
FIGS. 1A and 1B are diagrams of an example of a near-eye display.

The figures depict examples of the present disclosure for purposes of illustration only. One skilled in the art will readily recognize from the following description that alternative examples of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive examples. However, it will be apparent that various examples may be practiced without these specific details. The figures and description are not intended to be restrictive.

A typical image sensor includes an array of pixel cells. Each pixel cell includes a photodiode. As part of a light measurement operation, the photodiode can measure the intensity incident light by converting photons into charge (e.g., electrons or holes). The charge generated by the photodiode can be converted to a voltage by a charge sensing unit, which can include a floating diffusion node. The voltage can be quantized by an analog-to-digital converter (ADC) into a digital value. The digital value can represent an intensity of light received by the pixel cell and can form a pixel, which can correspond to light received from a spot of a scene. An image comprising an array of pixels can be derived from the digital outputs of the array of pixel cells.

An image sensor can be used to perform different modes of imaging, such as 2D and 3D sensing. The 2D and 3D sensing can be performed based on light of different wavelength ranges. For example, visible light can be used for 2D sensing, whereas invisible light (e.g., infrared light) can be used for 3D sensing. An image sensor may include an optical filter array to allow visible light of different optical wavelength ranges and colors (e.g., red, green, blue, monochrome) to a first set of pixel cells assigned for 2D sensing, and invisible light to a second set of pixel cells assigned for 3D sensing.

To perform 2D sensing, a photodiode at a pixel cell can generate charge at a rate that is proportional to an intensity of visible light component (e.g., red, green, blue, monochrome) incident upon the pixel cell, and the quantity of charge accumulated in an exposure period can be used to represent the intensity of visible light (or a certain color component of the visible light). The charge can be stored temporarily at the photodiode and then transferred to a capacitor (e.g., a floating diffusion) to develop a voltage. The voltage can be sampled and quantized by an ADC to generate an output corresponding to the intensity of visible light. An image pixel value can be generated based on the outputs from multiple pixel cells configured to sense different color components of the visible light (e.g., red, green, and blue colors).

Moreover, to perform 3D sensing, light of a different wavelength range (e.g., infrared light) can be projected onto an object, and the reflected light can be detected by the pixel cells. The light can include structured light, light pulses, etc. The pixel cells outputs can be used to perform depth sensing operations based on, for example, detecting patterns of the reflected structured light, measuring a time-of-flight of the light pulse, etc. To detect patterns of the reflected structured light, a distribution of quantities of charge generated by the pixel cells during the exposure time can be determined, and pixel values can be generated based on the voltages corresponding to the quantities of charge. For time-of-flight measurement, the timing of generation of the charge at the photodiodes of the pixel cells can be determined to represent the times when the reflected light pulses are received at the pixel cells. Time differences between when the light pulses are projected to the object and when the reflected light pulses are received at the pixel cells can be used to provide the time-of-flight measurement.

A pixel cell array can be used to generate information of a scene. In some examples, each pixel cell (or at least some of the pixel cells) of the pixel cell array can be used to perform collocated 2D and 3D sensing at the same time. For example, a pixel cell may include multiple photodiodes each configured to convert a different spectral component of light to charge. For 2D sensing, a photodiode can be configured to convert visible light (e.g., monochrome, or for a color of a particular frequency range) to charge, whereas another photodiode can be configured to convert infrared light to charge for 3D sensing. Having the same set of pixel cells to perform sensing of different spectral components of light can facilitate the correspondence between 2D and 3D images of different spectral components of light generated by the pixel cells. Moreover, given that every pixel cell of a pixel cell array can be used to generate the image, the full spatial resolution of the pixel cell array can be utilized for the imaging.

The 2D- and 3D-imaging data can be fused for various applications that provide virtual-reality (VR), augmented-reality (AR) and/or mixed reality (MR) experiences. For example, a wearable VR/AR/MR system may perform a scene reconstruction of an environment in which the user of the system is located. Based on the reconstructed scene, the VR/AR/MR can generate display effects to provide an interactive experience. To reconstruct a scene, the 3D-image data can be used to determine the distances between physical objects in the scene and the user. Moreover, 2D-image data can capture visual attributes including textures, colors, and reflectivity of these physical objects. The 2D- and 3D-image data of the scene can then be merged to create, for example, a 3D model of the scene including the visual attributes of the objects. As another example, a wearable VR/AR/MR system can also perform a head tracking operation based on a fusion of 2D and 3D image data. For example, based on the 2D-image data, the VR/AR/AR system can extract certain image features to identify an object. Based on the 3D-image data, the VR/AR/AR system can track a location of the identified object relative to the wearable device worn by the user. The VR/AR/AR system can track the head movement based on, for example, tracking the change in the location of the identified object relative to the wearable device as the user's head moves.

One major challenge of including multiple photodiodes in a pixel cell is how to reduce the size and power consumption of the pixel cell, which can impact a number of pixel cells that can be fit into a pixel cell array. The number of pixel cells in a pixel cell array can dominate the available resolution of the imaging. Specifically, in addition to the photodiodes, a pixel cell may include processing circuits to support measurement of the charge generated by each photodiode and to support the generation of a pixel value based on the measurements. Moreover, each pixel cell may also include a memory (e.g., static random-access memory (SRAM)) to store the measurement results while waiting to forward the measurement results to the VR/AR/MR application for processing.

The processing circuits and memory typically have considerable footprints and consume considerable amounts of power. For example, a pixel cell may include a charge sensing unit, which includes one or more charge storage devices (e.g., a floating diffusion node, a capacitor) to store the charge generated by a photodiode and to convert the charge to a voltage, and a buffer to buffer the voltage. Moreover, the processing circuits may include a quantizer to quantize the voltage to a digital value. The quantizer typically includes a comparator which includes analog circuits (e.g., differential pair, output stage, current source), which have large footprints and consume lots of power. Further, the memory devices typically include multiple memory banks (e.g., SRAM cells) to store the bits of the measurement result. The memory devices have significant footprints and can consume lots of power, especially if the memory is constructed using high bandwidth transistor devices to improve operation speed. The pixel cell may include multiple photodiodes each to measure light of a particular wavelength range to generate a frame, or that the pixel cell includes a single photodiode but the photodiode is to perform multiple measurements of the incident light within a frame. In each case, the memory within the pixel cell may need to have sufficient capacity to store multiple pixel values for either multiple photodiodes, or for multiple measurements from a single photodiode. Including such a high-capacity memory in the pixel cell can substantially increase both the footprint and the power consumption of the pixel cell. This may render the pixel cells unsuitable for applications where space and power are at a premium, such as applications at mobile devices and wearable devices.

One way to reduce the footprint and the power consumption of a pixel cell is by reducing or minimizing the capacity of the in-pixel memory. For example, the in-pixel memory can have sufficient capacity to store only one pixel value from a light intensity measurement operation by a photodiode followed by a quantization operation by the ADC. Before overwriting the pixel value stored in the in-pixel memory, a read out operation can be performed to transfer the stored pixel value to the VR/AR/AR application. After the stored pixel value is read out and transferred to the VR/AR/MR application, a subsequent quantization operation can then start to process the measurement result from another light intensity measurement operation of the same photodiode or of a different photodiode to generate a new pixel value, and to store the new pixel value into the in-pixel memory.

While such arrangements can reduce the reduce the footprint and the power consumption of a pixel cell, having each pixel cell to transfer a pixel value out of the in-pixel memory to the VR/AR/MR application before starting a subsequent quantization operation can introduce substantial delay, such that it takes a longer time to generate all the pixel values for a frame. Specifically, the VR/AR/MR application is typically hosted in a host device external to the image sensor, and the pixel data is typically transferred via physical buses, such as serial buses based on the Mobile Industry Processor Interface (MIPI) specification. Before the subsequent quantization operation can start, each pixel cell (or a group of pixel cells) may take turns in accessing the physical buses to transfer out the pixel data stored at the in-pixel memory of the pixel cell as serial signals to the host device. But due to the sequential transfer of the pixel data by each pixel cell, as well as the limited bandwidth of the physical buses, the transfer of the pixel data takes a considerable amount of time to complete, which delays the subsequent quantization operations, and it takes a longer time to generate all the pixel values for a frame. As a result, the achievable frame rate of the image sensor can be reduced, which can degrade the performance of the image sensor especially in capturing images of high-speed objects.

The present disclosure relates to an image sensor that can address at least some of the issues above. The image sensor may include an array of pixel cells, with each pixel cell including one or more photodiodes, an in-pixel ADC and an in-pixel memory. The ADC is configured to generate one or more pixel values each corresponding to an intensity of light received by the one or more photodiodes, whereas the in-pixel memory is configured to store one pixel value for one photodiode of the one or more photodiodes at a time. The image sensor further includes an off-array frame memory that is external to the array of pixel cells. After the in-pixel memory of a pixel cell stores a pixel value in the in-pixel memory, the pixel cell can transfer the pixel value from the in-pixel memory to the off-array frame memory for storage, and then overwrite the stored pixel value with a new pixel value from the in-pixel ADC. A host device, which can host a VR/AR/AR application that consumes the pixel data generated by array of pixel cells, can then perform a read out of the pixel data from the off-array frame memory, from the in-pixel memory of each pixel cell, or both.

In some examples, the off-array frame memory can be an on-chip memory formed on the same semiconductor substrate as the array of pixel cells. In some examples, the array of pixel cells can be formed on one or more first semiconductor substrates, whereas the off-array frame memory can be formed on a second semiconductor substrates, and the first and second semiconductor substrates can be stacked. The off-array frame memory can be connected to the array of pixel cells via parallel vertical interconnects. The image sensor further includes one or more bus interfaces which can be connected to the off-array frame memory and, in some examples, the in-pixel memory. The one or more bus interfaces can be connected to a physical bus that is connected the host device. The parallel vertical interconnects can include, for example, chip-to-chip copper bonding, through silicon vias (TSV), etc., whereas the physical bus can include a serial bus based on the MIPI specification. The parallel interconnects can transfer the pixel data at a higher rate than the external bus.

The off-array frame memory can support light measurement operations by a single photodiode or multiple photodiodes for 2D and 3D sensing operations. Specifically, in some examples, a pixel cell can include a single photodiode configured to perform multiple light measurement operations to generate multiple pixel values for a single frame. In some examples, a pixel cell can include multiple photodiodes each configured to perform a light measurement operation for light of a particular wavelength channel (e.g., visible red, blue, and green lights, and infrared light), and the pixel cell can generate multiple pixel values each representing a measurement of light of a particular wavelength channel. The off-chip frame memory can have sufficient capacity to store the multiple pixel values, or a subset of the multiple pixel values, for each pixel cell. After performing a light measurement operation with a photodiode and storing a pixel value into the in-pixel memory, a pixel cell can transfer the pixel value from the in-pixel memory to the off-chip frame memory, and then start a subsequent quantization operation for another measurement operation by the same photodiode or a different photodiode to generate a new pixel value, and store the new pixel value in the in-pixel memory.

In a case where a pixel cell includes multiple photodiodes, the pixel cell can perform the light measurement operations and quantization operations for the multiple photodiodes based on various timing arrangements. Specifically, each photodiode can perform a light measurement operation to generate charge with an exposure period. After the exposure period ends, the pixel cell can perform a quantization operation using the in-pixel ADC to quantize the charge into a pixel value. The start time of the quantization operation for each photodiode can be separated by a processing delay that accounts for the time it takes to perform the quantization operation to generate the pixel value, to store and then read the pixel value, and to transfer the pixel value to the off-chip frame memory. In some examples, the exposure periods for a first photodiode and a second photodiode that take turn in performing the quantization operation can have the same start time, while the end times of the exposure periods can be extended to accommodate the processing delay. In some examples, the exposure periods of the two photodiodes can be center-aligned such that the start time of a first exposure period of the first photodiode is delayed from the start time of a second exposure period of the second photodiode by the processing delay, whereas the end time of the first exposure period is earlier than the end time of the second exposure period also by the processing delay. Such an arrangement can reduce the motion artifacts caused by the mismatches in the exposure periods. As the processing delay is reduced by transferring the pixel data to the off-array frame memory rather than to the host device, the mismatches in the exposure periods between the photodiodes can be reduced, which can improve the global shutter operation of the image sensor.

The host device can fetch the pixel values generated for the frame, via the physical buses, from the off-chip frame memory, for processing by the VR/AR/MR application. The host device can also fetch some of the pixel values from the in-pixel memory of the pixel cells as well if the off-chip frame memory only stores a subset of the pixel values. In some examples, the host device can fetch the pixel values at the end of a frame period. In some examples, the host device can also fetch some of the pixel values within the frame period. Specifically, a light measurement operation and/or a quantization operation at the pixel cell can be performed in parallel with the fetching of the pixel value (generated from another light measurement operation) from the off-chip frame memory to the host device. Such arrangements can further reduce the delay incurred by the off-chip transfer of the pixel data between frames, which can increase the achievable frame rate and improve the performance of the image sensor in capturing images of high-speed objects. Moreover, as some of the pixel values stored in the off-chip frame memory can be transferred out before all the light measurement operations of for a frame complete, the off-chip frame memory only needs to have the capacity to store a subset of the pixel values of a frame. This can reduce the power and footprint of the off-chip frame memory as well as those of the image sensor as a whole.

Besides facilitating the transfer of pixel data from in-pixel memory, the off-chip frame memory can support other post-processing operations, such as a correlated double sampling (CDS) operation. Specifically, each pixel cell may include a charge storage device (e.g., a floating diffusion, a capacitor) to convert the charge generated by the photodiode during an exposure period. The quantizer can then quantize the voltage to generate a pixel value. The charge storage device can be reset before receiving the charge from the photodiode, which can introduce fixed pattern noise (FPN) charge, such as reset noise charge. To reduce the FPN charge component in the pixel value, the quantizer can first perform a first quantization operation based on a first voltage output by the charge storage device after reset to generate a dark pixel measurement output representing the FPN charge, and store the dark pixel measurement output at the in-pixel memory and then in the off-chip frame memory. After the end of the integration period, the quantizer can perform a second quantization operation based on a second voltage output by the charge storage device to generate a light measurement output representing both the charge generated by the photodiode and the FPN charge, and store the light measurement output in the in-pixel memory. The pixel cell can further include a digital CDS circuit to fetch the dark pixel measurement output and the light measurement output from, respectively, the off-chip frame memory and the in-pixel memory, compute a difference between the outputs, and output the difference as a pixel value to the host device. In some examples, the pixel cell can perform a single quantization operation to obtain one dark pixel measurement output, and use that to reduce the FPN charge component in all the light measurement outputs for other photodiodes (or for the same photodiode) of the pixel cell for a frame, to reduce the number of quantization operations performed for the frame as well as the required capacity of the off-array frame memory to store the dark pixel measurement outputs.

Various connection arrangements among the array of pixel cells, the off-chip frame memory, and the one or more bus interfaces are proposed to further reduce the transfer delay of pixel data from the in-pixel memory to the off-chip frame memory, and from the off-chip frame memory to the host device. As described above, the in-pixel memory of the pixel cells can be connected to the off-array frame memory via parallel vertical interconnects. In some examples, the pixel cells can be organized in rows and columns, and the in-pixel memory of one row/column of pixel cells can transfer pixel data in parallel to the off-array frame memory via the parallel vertical interconnects at a time, followed by another row/column. In some examples, the off-array frame memory can include a first portion and a second portion. Each portion can be accessed by a row/column of pixel cells, which allow parallel transfer of pixel data from two rows/columns of pixel cells to the off-array frame memory at a time.

In addition, as described above, the image sensor may include one or more bus interfaces to provide the off-array frame memory and/or the in-pixel memory of the array pixel cells with access to the physical bus. In some examples, the image sensor includes a single bus interface. Each memory unit of the off-array frame memory, which stores a pixel value, as well as the in-pixel memory of each pixel cell, can take turn in accessing the single bus interface to send serial signals representing the pixel value to the host device. In some examples, the image sensor may include multiple bus interfaces to connect with the host device via multiple physical buses, which allow parallel transfer of multiple pixel values to the host device. In some examples, the connection among the multiple bus interfaces and the in-pixel memory and off-array frame memory can be configured such that multiple pixel values of the same wavelength channel can be transferred in parallel to the host device, to speed up a sub-sampling operation in which pixel values of a particular wavelength channel of a frame are transmitted to the host device using the multiple physical buses, while pixel values of other wavelength channels are not transmitted to the host device.

With examples of the present disclosure, an off-array frame memory can be provided to provide temporary storage of pixel values from the array of pixel cells, which can reduce the size of the in-pixel memory of each pixel cell. This allows inclusion of a larger number of pixel cells to improve the resolution of the image sensor. Moreover, by implementing off-array frame memory within the same chip package as the array of pixel cells, and by providing parallel interconnects between the off-array frame memory and the array of pixel cells, the delay incurred in the transfer of pixel data from the in-pixel memory to the off-array frame memory can be reduced, especially compared with a case where the pixel data are transferred via the physical buses. This can reduce the delay between quantization operations for a photodiode or for different photodiodes of a pixel cell, which not only increases the achievable frame rate of the image sensor but also reduces the exposure period mismatches between multiple photodiodes of a pixel cell, and the global shutter operation can be improved as a result. Further, the off-chip frame memory can also support other post-processing operations, such as CDS, to reduce the noise components in the pixel values and improve the accuracy of the light measurement operations by the image sensor. All these can improve the performance of the image sensor.

The disclosed techniques may include or be implemented in conjunction with an artificial reality system. Artificial reality is a form of reality that has been adjusted in some manner before presentation to a user, which may include, e.g., VR, AR, MR, a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some examples, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an example of a near-eye display 100. Near-eye display 100 presents media to a user. Examples of media presented by near-eye display 100 include one or more images, video, and/or audio. In some examples, audio is presented via an external device (e.g., speakers and/or headphones) that receives audio information from the near-eye display 100, a console, or both, and presents audio data based on the audio information. Near-eye display 100 is generally configured to operate as a VR display. In some examples, near-eye display 100 is modified to operate as an AR display and/or a MR display.

Near-eye display 100 includes a frame 105 and a display 110. Frame 105 is coupled to one or more optical elements. Display 110 is configured for the user to see content presented by near-eye display 100. In some examples, display 110 comprises a waveguide display assembly for directing light from one or more images to an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, sensors 120a and 120b may be configured to provide image data representing two fields of view towards a direction A along the Z axis, whereas sensor 120c may be configured to provide image data representing a field of view towards a direction B along the X axis, and sensor 120d may be configured to provide image data representing a field of view towards a direction C along the X axis.

In some examples, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some examples, the location tracking system may operate a simultaneous localization and mapping (SLAM) algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120a-120d can provide the location tracking system a more holistic view of the physical environment, which can lead to more objects to be included in the construction and updating of the map. With such an arrangement, the accuracy and robustness of tracking a location of the user within the physical environment can be improved.

In some examples, near-eye display 100 may further include one or more active illuminators 130 to project light into the physical environment. The light projected can be associated with different frequency spectrums (e.g., visible light, infrared light, ultra-violet light, etc.), and can serve various purposes. For example, illuminator 130 may project light in a dark environment (or in an environment with low intensity of infrared light, ultra-violet light, etc.) to assist sensors 120a-120d in capturing images of different objects within the dark environment to, for example, enable location tracking of the user. Illuminator 130 may project certain markers onto the objects within the environment, to assist the location tracking system in identifying the objects for map construction/updating.

In some examples, illuminator 130 may also enable stereoscopic imaging. For example, one or more of sensors 120a or 120b can include both a first pixel array for visible light sensing and a second pixel array for infrared (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

Figure 1B:
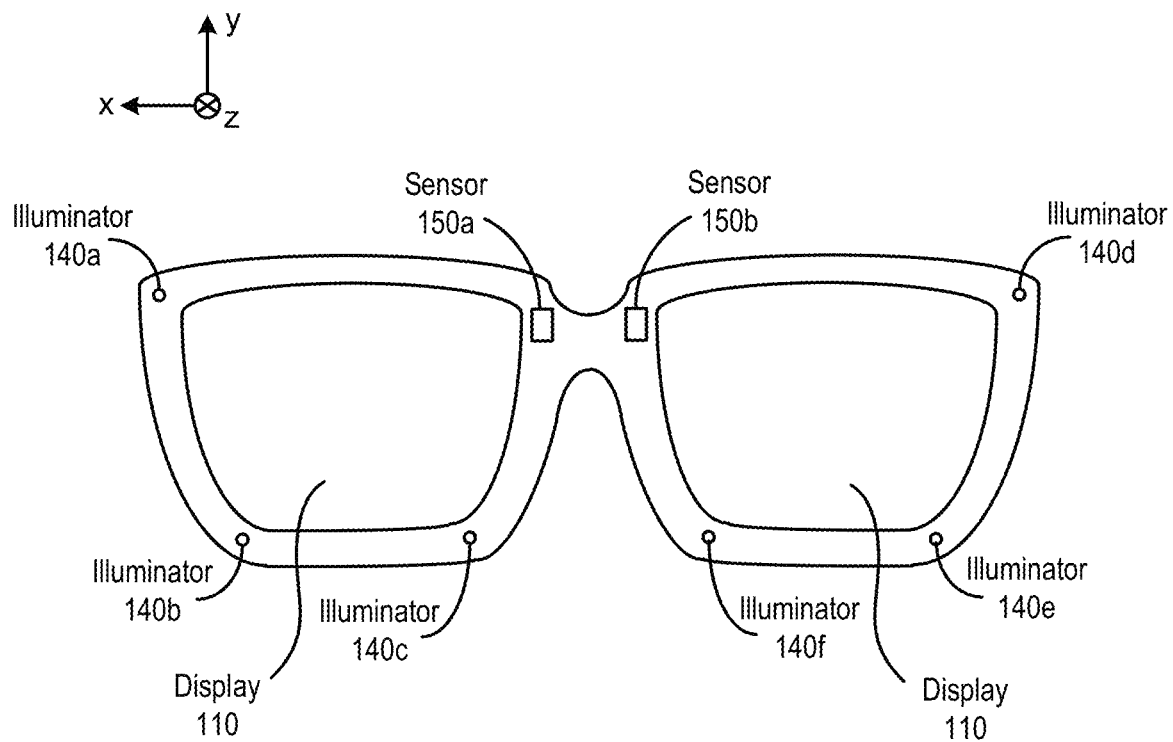

FIG. 1B is a diagram of another example of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., NIR) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user, and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

Figure 1B:
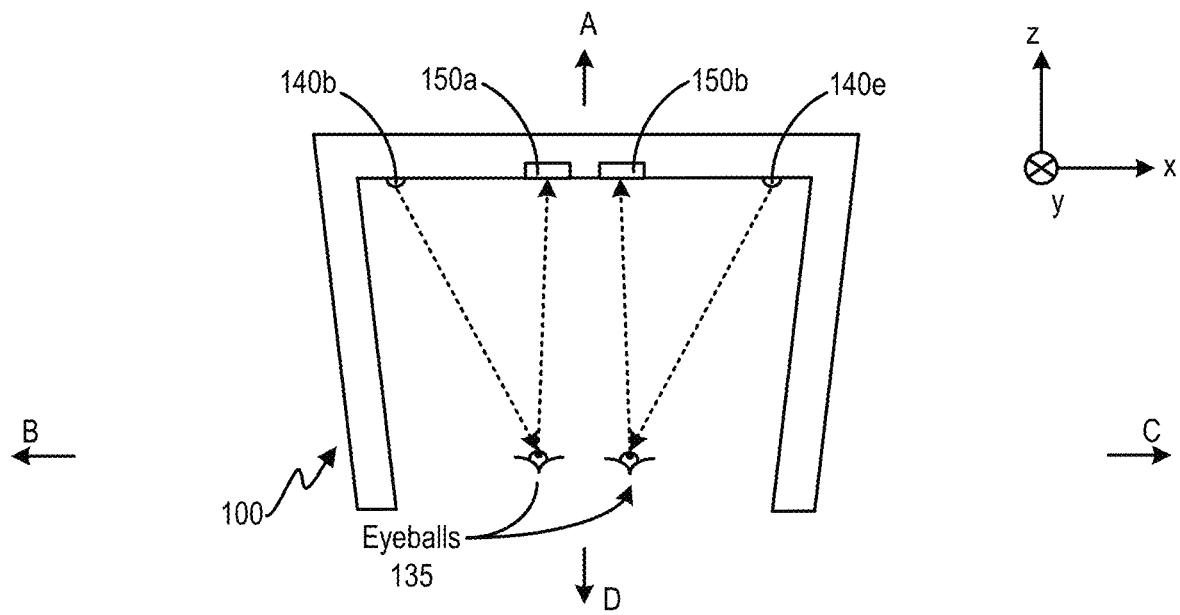
Figure 2:
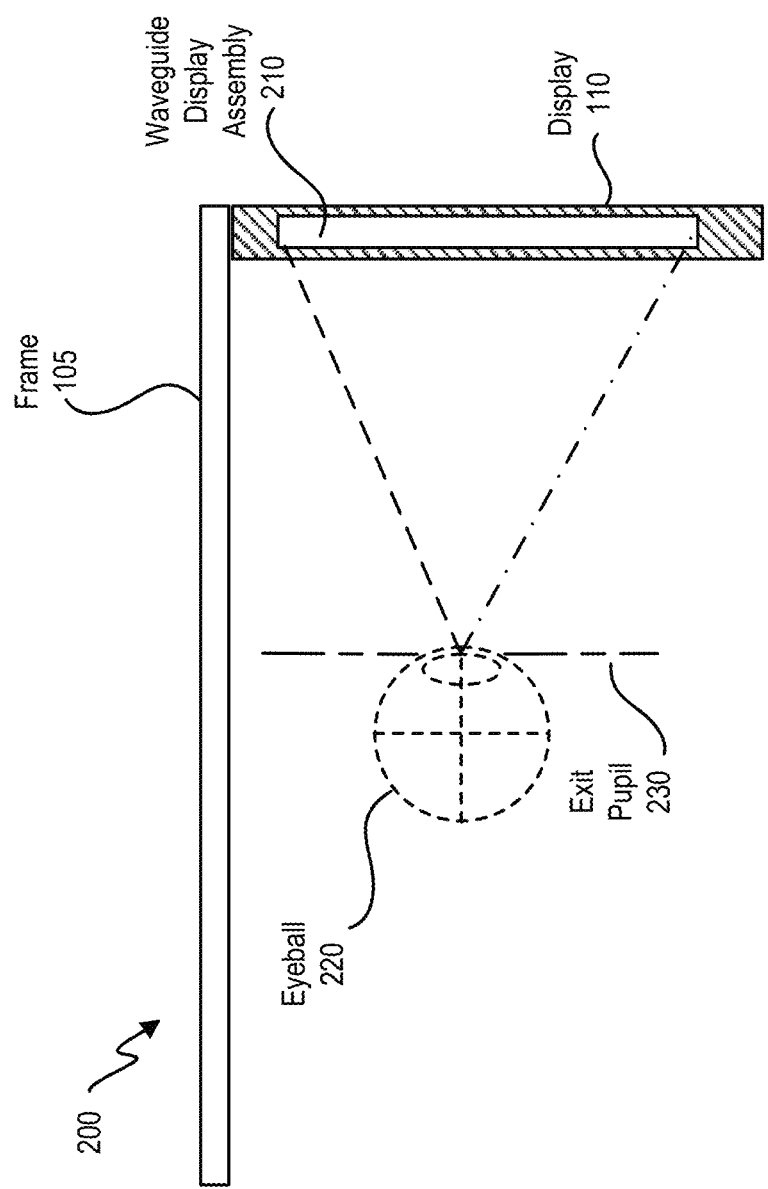
FIG. 2 is an example of a cross section of the near-eye display.

FIG. 2 is an example of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass) with one or more refractive indices. In some examples, near-eye display 100 includes one or more optical elements between waveguide display assembly 210 and eyeball 220.

In some examples, waveguide display assembly 210 includes a stack of one or more waveguide displays including, but not restricted to, a stacked waveguide display, a varifocal waveguide display, etc. The stacked waveguide display is a polychromatic display (e.g., RGB display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate examples, waveguide display assembly 210 may include the stacked waveguide display and the varifocal waveguide display.

Figure 3:
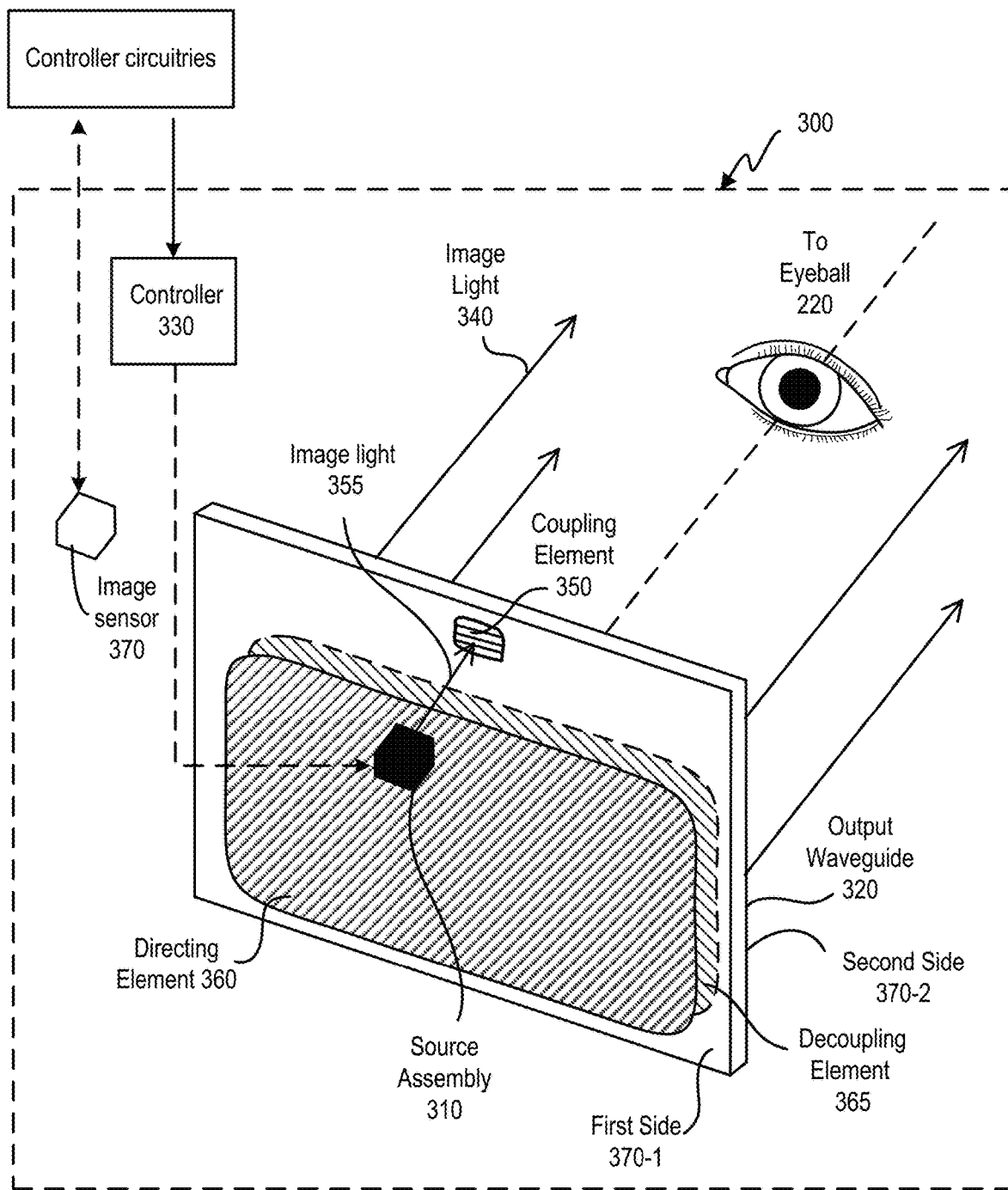
FIG. 3 illustrates an isometric view of an example of a waveguide display with a single source assembly.

FIG. 3 illustrates an isometric view of an example of a waveguide display 300. In some examples, waveguide display 300 is a component (e.g., waveguide display assembly 210) of near-eye display 100. In some examples, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some examples, another waveguide display is separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some examples, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some examples, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A to generate image data of a physical environment in front of the user (e.g., for location determination). Image sensor 370 may also be located on second side 370-2 and may include image sensors 150a and 150b of FIG. 1B to generate image data of eyeball 220 (e.g., for gaze point determination) of the user. Image sensor 370 may interface with a remote console that is not located within waveguide display 300. Image sensor 370 may provide image data to the remote console, which may determine, for example, a location of the user, a gaze point of the user, etc., and determine the content of the images to be displayed to the user. The remote console can transmit instructions to controller 330 related to the determined content. Based on the instructions, controller 330 can control the generation and outputting of image light 355 by source assembly 310.

Figure 4:
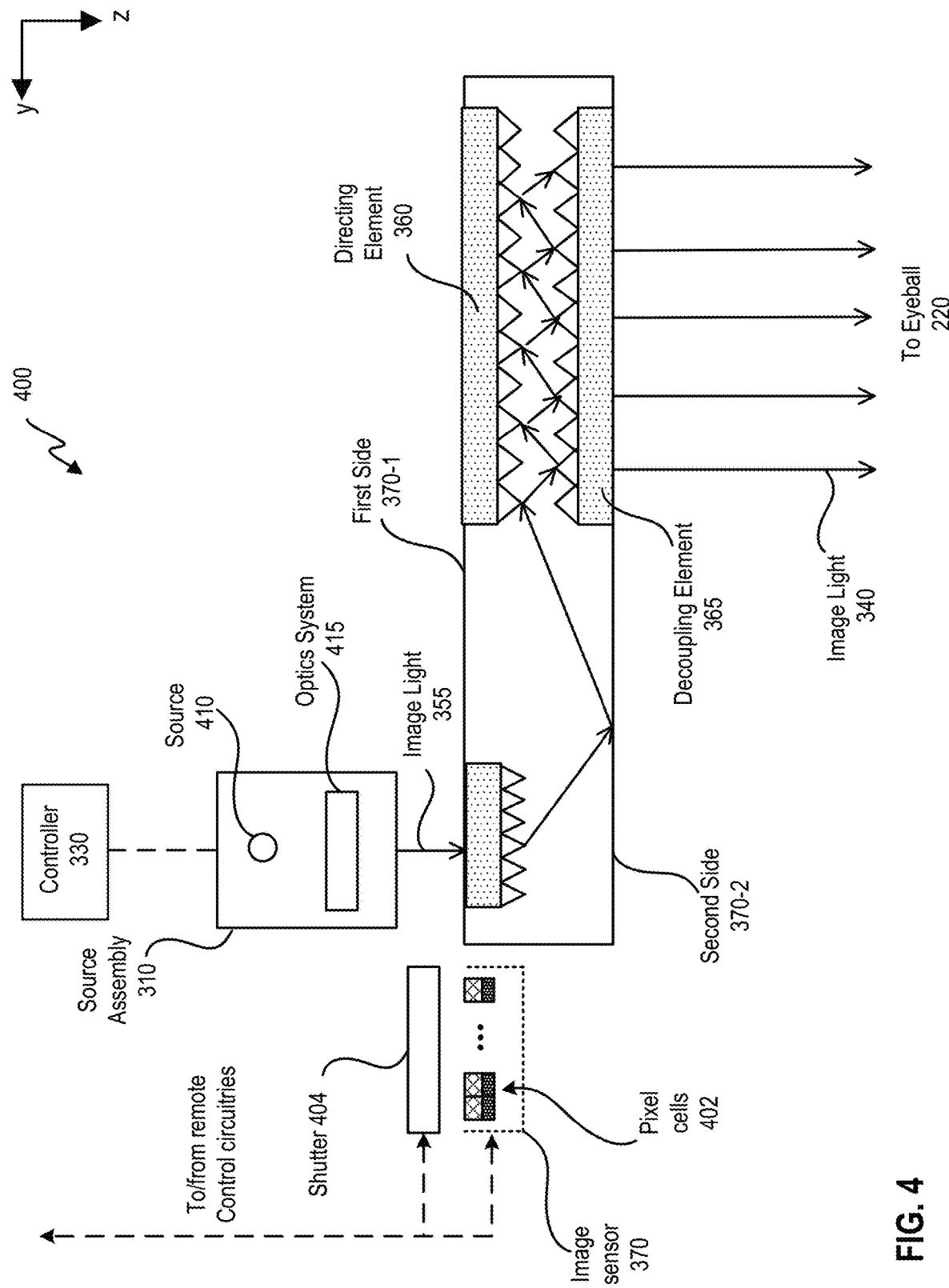
FIG. 4 illustrates a cross section of an example of the waveguide display.

FIG. 4 illustrates an example of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some examples, there can be a mechanical shutter 404 interposed between the set of pixel cells 402 and the physical environment to control the exposure of the set of pixel cells 402. In some examples, the mechanical shutter 404 can be replaced by an electronic shutter gate, as to be discussed below. Each of pixel cells 402 may correspond to one pixel of the image. Although not shown in FIG. 4, it is understood that each of pixel cells 402 may also be overlaid with a filter to control the frequency range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some examples, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In examples where coupling element 350 is diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In examples where directing element 360 is a diffraction grating, the pitch of the diffraction grating is chosen to cause incident image light 355 to exit output waveguide 320 at angle(s) of inclination relative to a surface of decoupling element 365.

In some examples, directing element 360 and/or decoupling element 365 are structurally similar. Expanded image light 340 exiting output waveguide 320 is expanded along one or more dimensions (e.g., may be elongated along x-dimension). In some examples, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
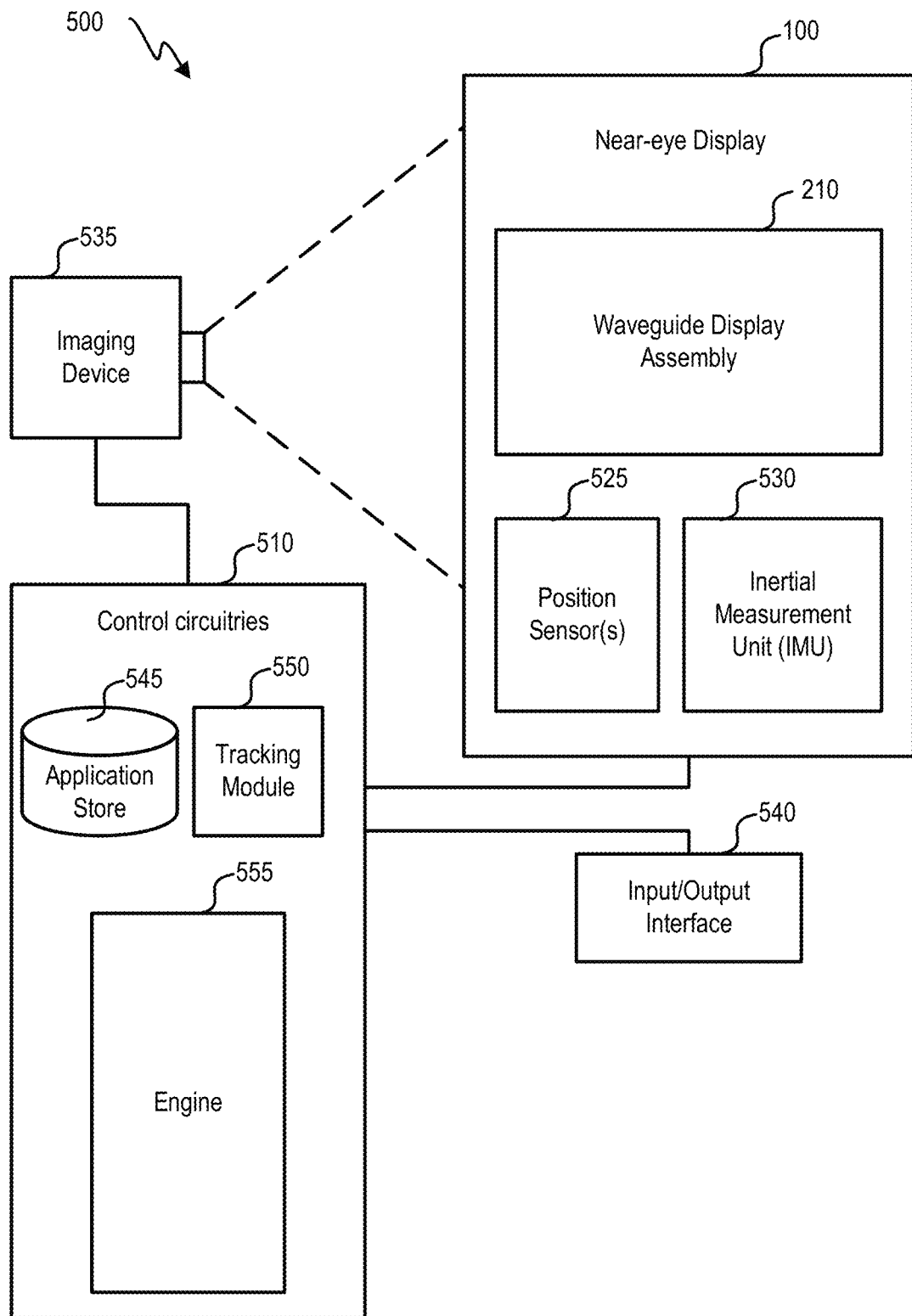
FIG. 5 is a block diagram of an example of a system including the near-eye display.

FIG. 5 is a block diagram of an example of a system 500 including the near-eye display 100. The system 500 comprises near-eye display 100, an imaging device 535, an input/output interface 540, and image sensors 120a-120d and 150a-150b that are each coupled to control circuitries 510. System 500 can be configured as a head-mounted device, a wearable device, etc.

Near-eye display 100 is a display that presents media to a user. Examples of media presented by the near-eye display 100 include one or more images, video, and/or audio. In some examples, audio is presented via an external device (e.g., speakers and/or headphones) that receives audio information from near-eye display 100 and/or control circuitries 510 and presents audio data based on the audio information to a user. In some examples, near-eye display 100 may also act as an AR eyewear glass. In some examples, near-eye display 100 augments views of a physical, real-world environment, with computer-generated elements (e.g., images, video, sound).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIG. 1A for generating image data of a physical environment in which the user is located, for performing location tracking of the user. Imaging device 535 may further include, for example, image sensors 150a-150b of FIG. 1B for generating image data for determining a gaze point of the user, to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provide media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions, that, when executed by a processor, generates content for presentation to the user. Examples of applications include: gaming applications, conferencing applications, video playback applications, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some examples, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), or a gaze point of the user (e.g., based on image data provided by imaging device 535), a distance between an object and user (e.g., based on image data provided by imaging device 535).

Figure 6:
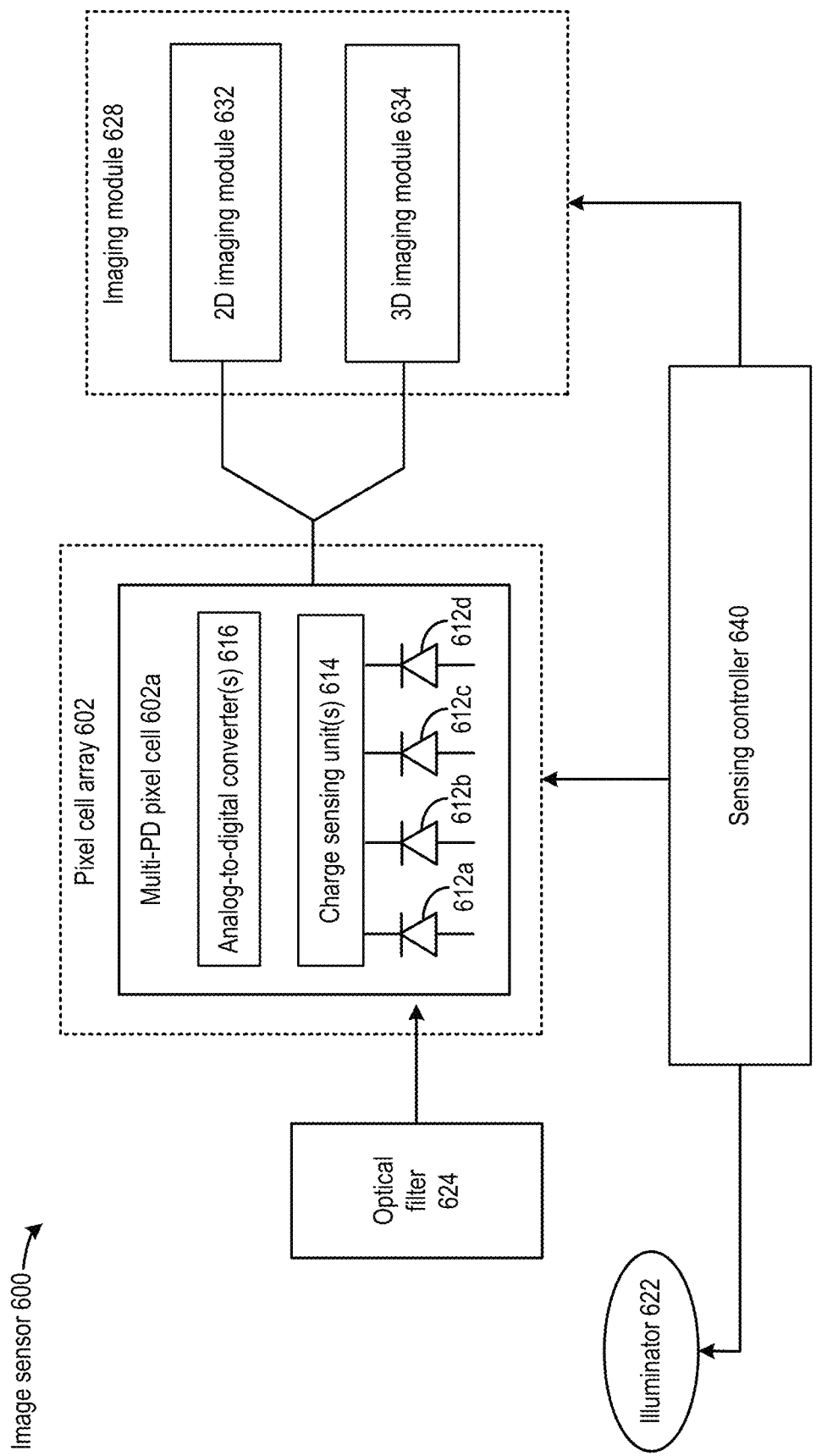
FIG. 6 illustrates block diagrams of examples of an image sensor.

FIG. 6 illustrates an example of an image sensor 600. Image sensor 600 can be part of near-eye display 100, and can provide 2D and 3D image data to control circuitries 510 of FIG. 5 to control the display content of near-eye display 100. As shown in FIG. 6, image sensor 600 may include an array of pixel cells 602 including pixel cell 602a. Although FIG. 6 illustrates only a single pixel cell 602, it is understood that an actual pixel cell array 602 can include many pixel cells.

Pixel cell 602a can include a plurality of photodiodes 612 including, for example, photodiodes 612a, 612b, 612c, and 612d, one or more charge sensing units 614, and one or more analog-to-digital converters 616. The plurality of photodiodes 612 can convert different components of incident light to charge. For example, photodiode 612a-612c can correspond to different visible light channels, in which photodiode 612a can convert a visible blue component (e.g., a wavelength range of 450-490 nanometers (nm)) to charge. Photodiode 612b can convert a visible green component (e.g., a wavelength range of 520-560 nm) to charge. Photodiode 612c can convert a visible red component (e.g., a wavelength range of 635-700 nm) to charge. Moreover, photodiode 612d can convert an infrared component (e.g., 700-1000 nm) to charge. Each of the one or more charge sensing units 614 can include a charge storage device and a buffer to convert the charge generated by photodiodes 612a-612d to voltages, which can be quantized by one or more ADCs 616 into digital values. In some examples, the ADCs can be external to pixel cell 602a and can be shared among multiple pixel cells. The digital values generated from photodiodes 612a-612c can represent the different visible light components of a pixel, and each can be used for 2D sensing in a particular visible light channel. Moreover, the digital value generated from photodiode 612d can represent the infrared light component of the same pixel and can be used for 3D sensing. Although FIG. 6 shows that pixel cell 602a includes four photodiodes, it is understood that the pixel cell can include a different number of photodiodes (e.g., two, three).

In some examples, image sensor 600 may also include an illuminator 622, an optical filter 624, an imaging module 628, and a sensing controller 630. Illuminator 622 may be an infrared illuminator, such as a laser, a light emitting diode (LED), et cetera, that can project infrared light for 3D sensing. The projected light may include, for example, structured light, light pulses, etc. Optical filter 624 may include an array of filter elements overlaid on the plurality of photodiodes 612a-612d of each pixel cell including pixel cell 606a. Each filter element can set a wavelength range of incident light received by each photodiode of pixel cell 606a. For example, a filter element over photodiode 612a may transmit the visible blue light component while blocking other components, a filter element over photodiode 612b may transmit the visible green light component, a filter element over photodiode 612c may transmit the visible red light component, whereas a filter element over photodiode 612d may transmit the infrared light component.

Image sensor 600 further includes an imaging module 628. Imaging module 628 may further include a 2D-imaging module 632 to perform 2D-imaging operations and a 3D-imaging module 634 to perform 3D-imaging operations. The operations can be based on digital values provided by ADCs 616. For example, based on the digital values from each of photodiodes 612a-612c, 2D-imaging module 632 can generate an array of pixel values representing an intensity of an incident light component for each visible color channel, and generate an image frame for each visible color channel. Moreover, 3D-imaging module 634 can generate a 3D image based on the digital values from photodiode 612d. In some examples, based on the digital values, 3D-imaging module 634 can detect a pattern of structured light reflected by a surface of an object, and compare the detected pattern with the pattern of structured light projected by illuminator 622 to determine the depths of different points of the surface with respect to the pixel cells array. For detection of the pattern of reflected light, 3D-imaging module 634 can generate pixel values based on intensities of infrared light received at the pixel cells. As another example, 3D-imaging module 634 can generate pixel values based on time-of-flight of the infrared light transmitted by illuminator 622 and reflected by the object.

Figure 7A:
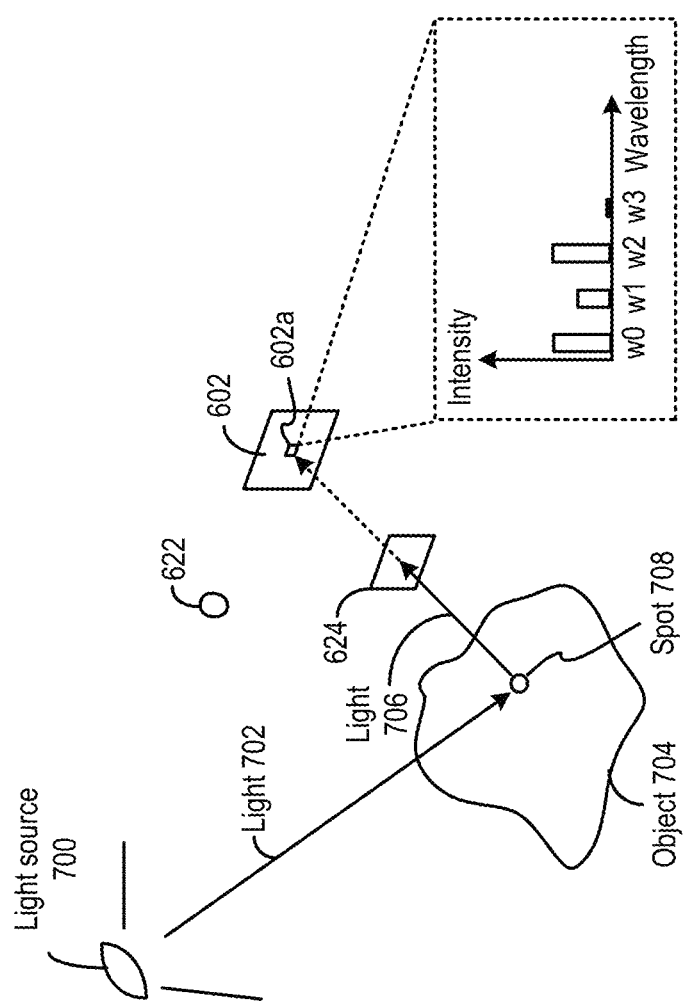
FIGS. 7A, 7B, and 7C illustrate operations for determining light intensities of different ranges by examples of FIG. 6.
Figure 7B:
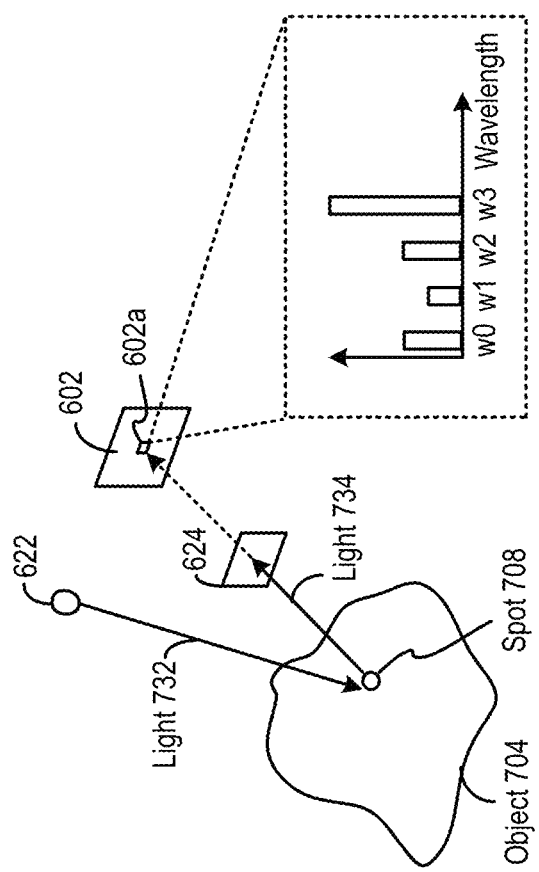
Figure 7C:
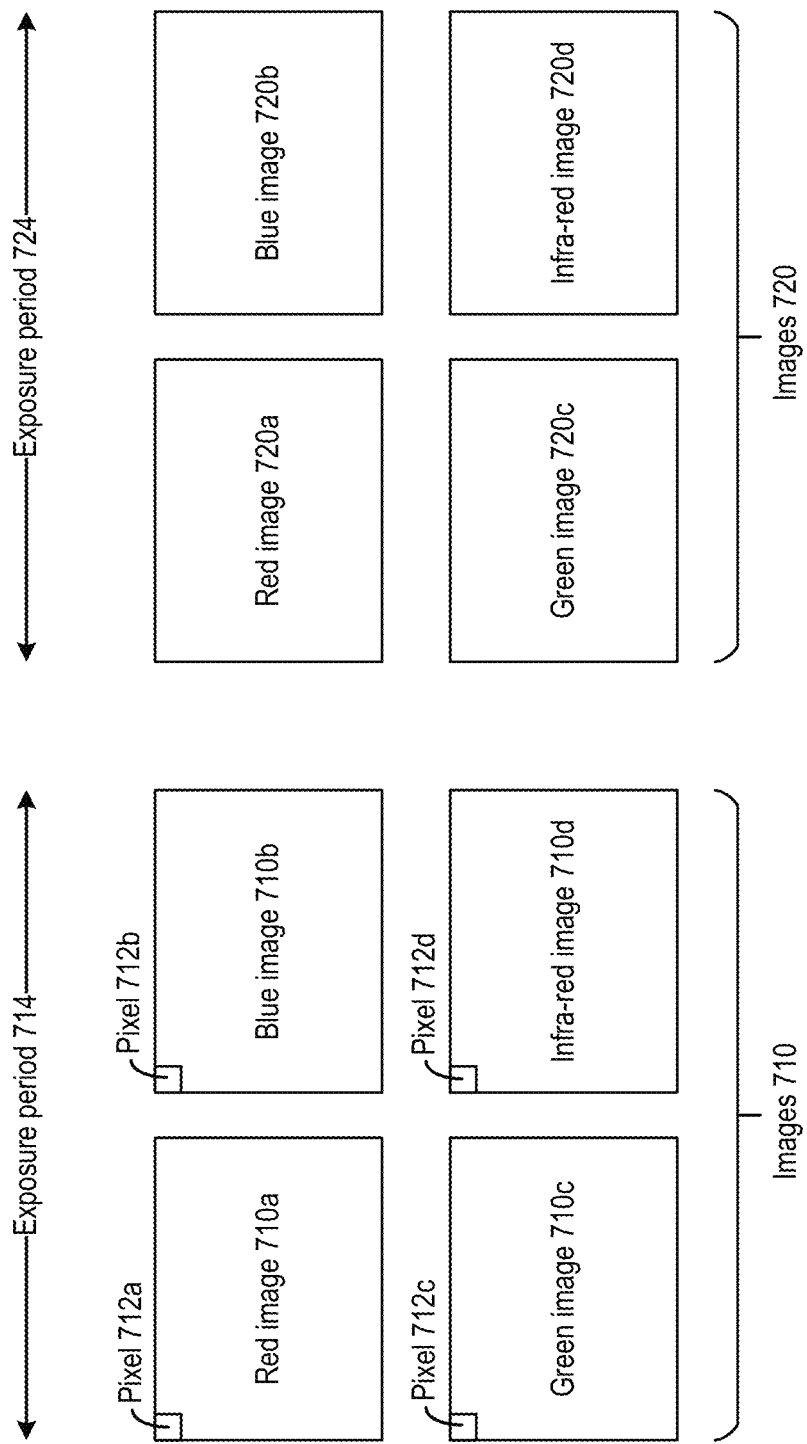

Image sensor 600 further includes a sensing controller 640 to control different components of image sensor 600 to perform 2D and 3D imaging of an object. Reference is now made to FIG. 7A-FIG. 7C, which illustrate examples of operations of image sensor 600 for 2D and 3D imaging. FIG. 7A illustrates an example of operations for 2D imaging. For 2D imaging, pixel cells array 602 can detect visible light in the environment including visible light reflected off an object. For example, referring to FIG. 7A, visible light source 700 (e.g., a light bulb, the sun, or other sources of ambient visible light) can project visible light 702 onto an object 704. Visible light 706 can be reflected off a spot 708 of object 704. Visible light 706 can also include the ambient infrared light component. Visible light 706 can be filtered by optical filter array 624 to pass different components of visible light 706 of wavelength ranges w0, w1, w2, and w3 to, respectively, photodiodes 612a, 612b, 612c, and 612d of pixel cell 602a. Wavelength ranges w0, w1, w2, and w3 and correspond to, respectively, blue, green, red, and infrared. As shown in FIG. 7A, as the infrared illuminator 622 is not turned on, the intensity of infrared component (w3) is contributed by the ambient infrared light and can be very low. Moreover, different visible components of visible light 706 can also have different intensities. Charge sensing units 614 can convert the charge generated by the photodiodes to voltages, which can be quantized by ADCs 616 into digital values representing the red, blue, and green components of a pixel representing spot 708. Referring to FIG. 7C, after the digital values are generated, sensing controller 640 can control 2D-imaging module 632 to generate, based on the digital values, sets of images including a set of images 710, which includes a red image frame 710a, a blue image frame 710b, and a green image frame 710c each representing one of red, blue, or green color image of a scene captured with the same exposure period 714. Each pixel from the red image (e.g., pixel 712a), from the blue image (e.g., pixel 712b), and from the green image (e.g., pixel 712c) can represent visible components of light from the same spot (e.g., spot 708) of a scene. A different set of images 720 can be generated by 2D-imaging module 632 in a subsequent exposure period 724. Each of red image 710a, blue image 710b, and green image 710c can represent the scene in a specific color channel and can be provided to an application to, for example, extract image features from the specific color channel. As each image represents the same scene and each corresponding pixel of the images represent light from the same spot of the scene, the correspondence of images between different color channels can be improved.

Furthermore, image sensor 600 can also perform 3D imaging of object 704. Referring to FIG. 7B, sensing controller 610 can control illuminator 622 to project infrared light 732, which can include a light pulse, structured light, etc., onto object 704. Infrared light 732 can have a wavelength range of 700 nanometers (nm) to 1 millimeter (mm). infrared light 734 can reflect off spot 708 of object 704 and can propagate towards pixel cells array 602 and pass through optical filter 624, which can provide the infrared component (of wavelength range w3) to photodiode 612d to convert to charge. Charge sensing units 614 can convert the charge to a voltage, which can be quantized by ADCs 616 into digital values. Referring to FIG. 7C, after the digital values are generated, sensing controller 640 can control 3D-imaging module 634 to generate, based on the digital values, an infrared image 710d of the scene as part of images 710 captured within exposure period 714. As infrared image 710d can represent the same scene in the infrared channel and a pixel of infrared image 710d (e.g., pixel 712d) represents light from the same spot of the scene as other corresponding pixels (pixels 712a-712c) in other images within images 710, the correspondence between 2D and 3D imaging can be improved as well.

Figure 8A:
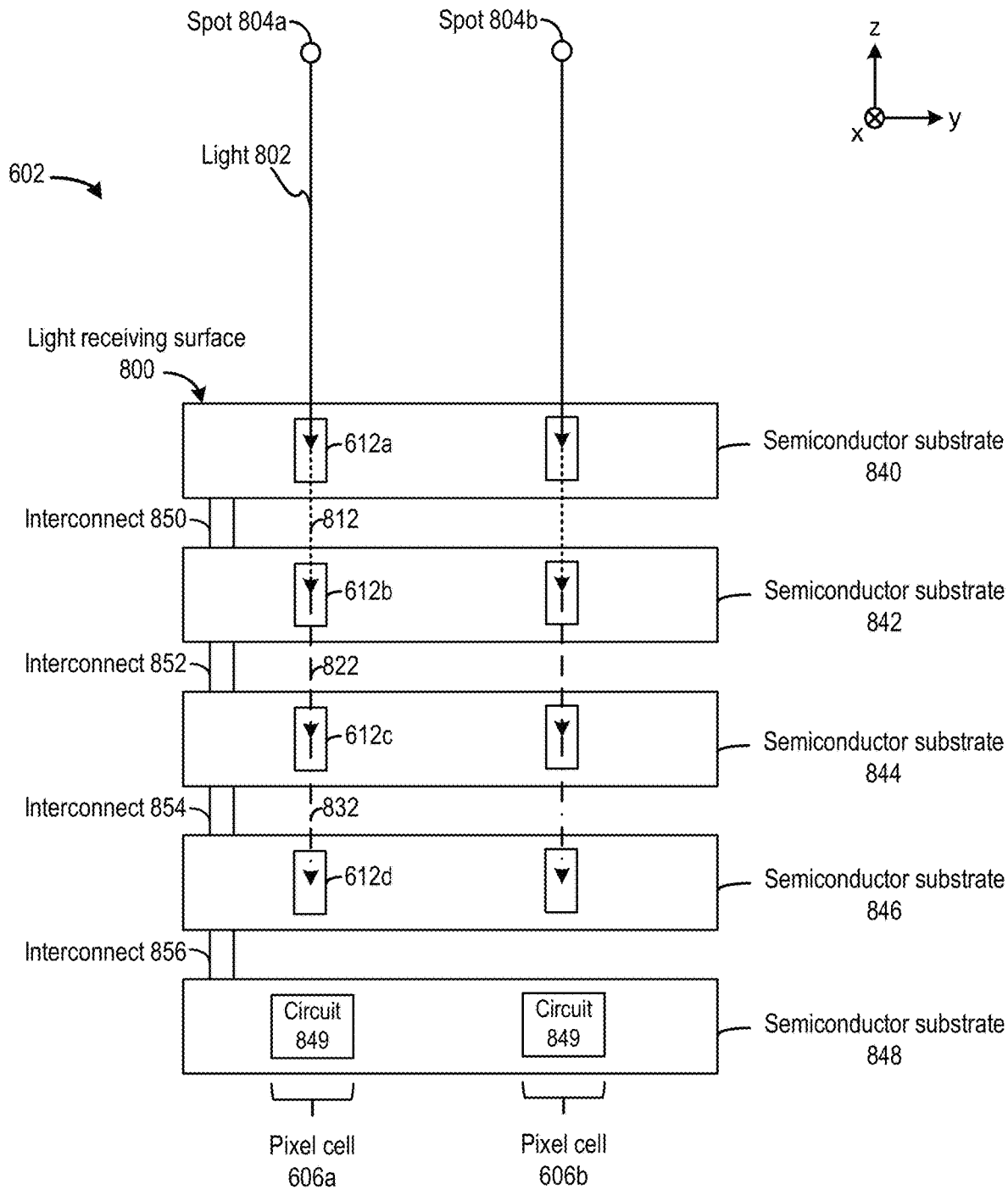

FIG. 8A-FIG. 8E illustrate examples of arrangements of photodiodes 612 in an image sensor, such as within a pixel cell or between different pixel cells. As shown in FIG. 8A, the photodiodes 612a-612d in a pixel cell 602a can form a stack along an axis that is perpendicular to a light receiving surface 800 through which pixel cell 602a receives incident light 802 from a spot 804a. For example, the photodiodes 612a-612d can form a stack along a vertical axis (e.g., the z-axis) when the light receiving surface 800 is parallel with the x and y axes. Each photodiode can have a different distance from light receiving surface 800, and the distance can set the component of incident light 802 being absorbed and converted to charge by each photodiode. For example, photodiode 612a is closest to light receiving surface 800 and can absorb and convert the blue component to charge, which is of the shortest wavelength range among the other components. Light 812 includes the remaining components of light 802 (e.g., green, red, and infrared) and can propagate to photodiode 612b, which can absorb and convert the green component. Light 822 includes the remaining components of light 812 (e.g., red and infrared) and can propagate to photodiode 612c, which can absorb and convert the red component. The remaining infrared component 832 can propagate to photodiode 612d to be converted to charge.

Each the photodiodes 612a, 612b, 612c, and 612d can be in a separate semiconductor substrate, which can be stacked to form image sensor 600. For example, photodiode 612a can be in a semiconductor substrate 840, photodiode 612b can be in a semiconductor substrate 842, and photodiode 612c can be in a semiconductor substrate 844, whereas photodiode 612d can be in a semiconductor substrate 846. Each of substrates 840-846 can include a charge sensing unit, such as charge sensing units 614. Substrates 840-846 can form a sensor layer. Each semiconductor substrate can include other photodiodes of other pixel cells, such as pixel cells 602b to receive light from spot 804b. Image sensor 600 can include another semiconductor substrate 848 which can include pixel cell processing circuits 849 which can include, for example, ADCs 616, imaging module 628, sensing controller 640, etc. In some examples, charge sensing units 614 can be in semiconductor substrate 848. Semiconductor substrate 848 can form an application specific integrated circuit (ASIC) layer. Each semiconductor substrate can be connected to a metal interconnect, such as metal interconnects 850, 852, 854, and 856 to transfer the charge generated at each photodiode to processing circuit 849.

Figure 8B:
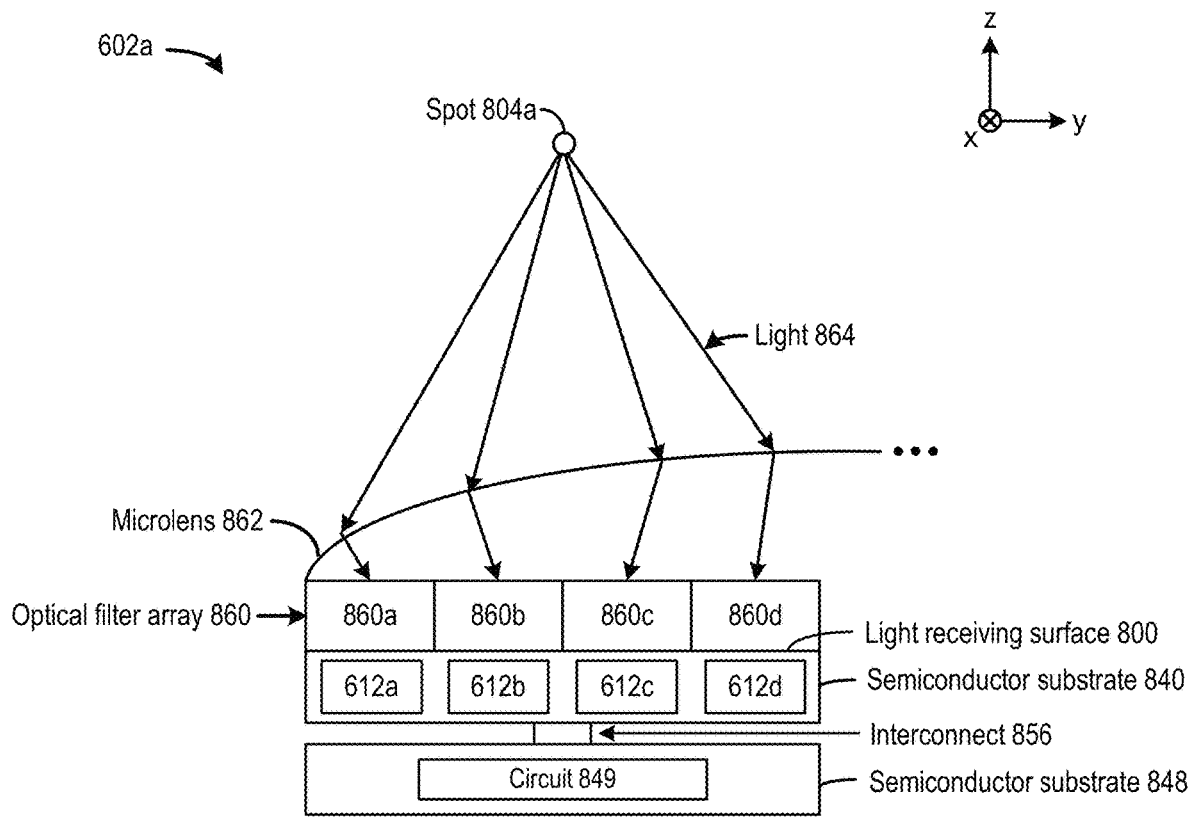
Figure 8B:
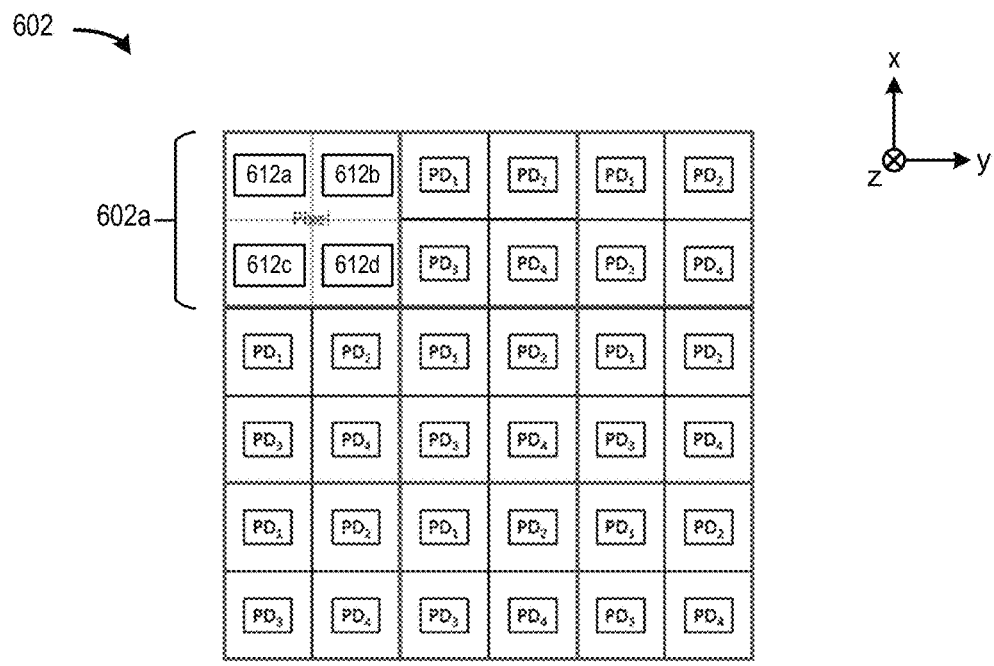
Figure 8C:
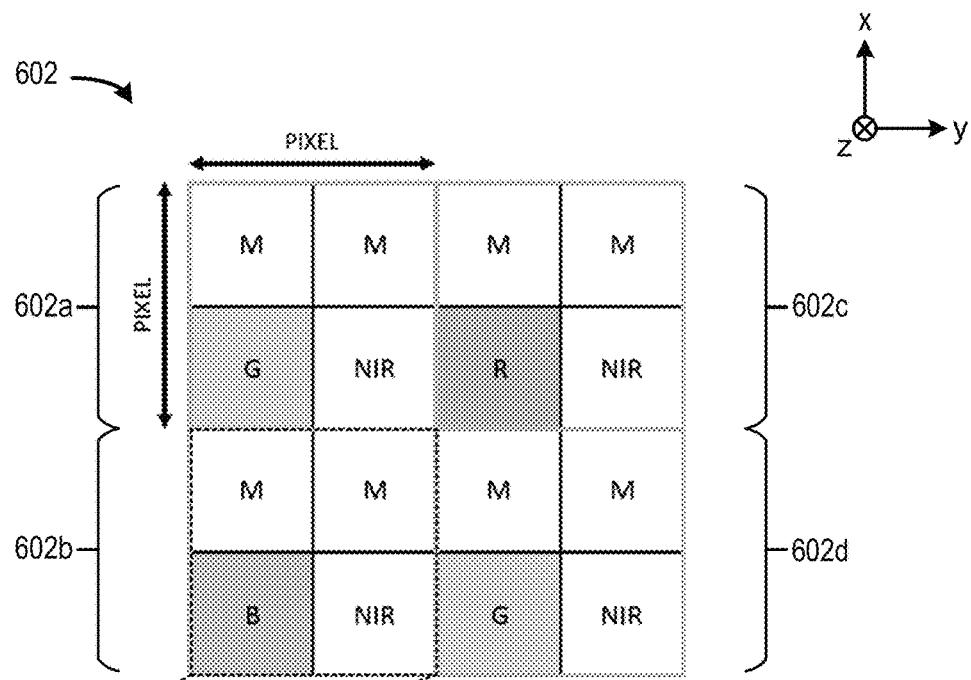
Figure 8C:
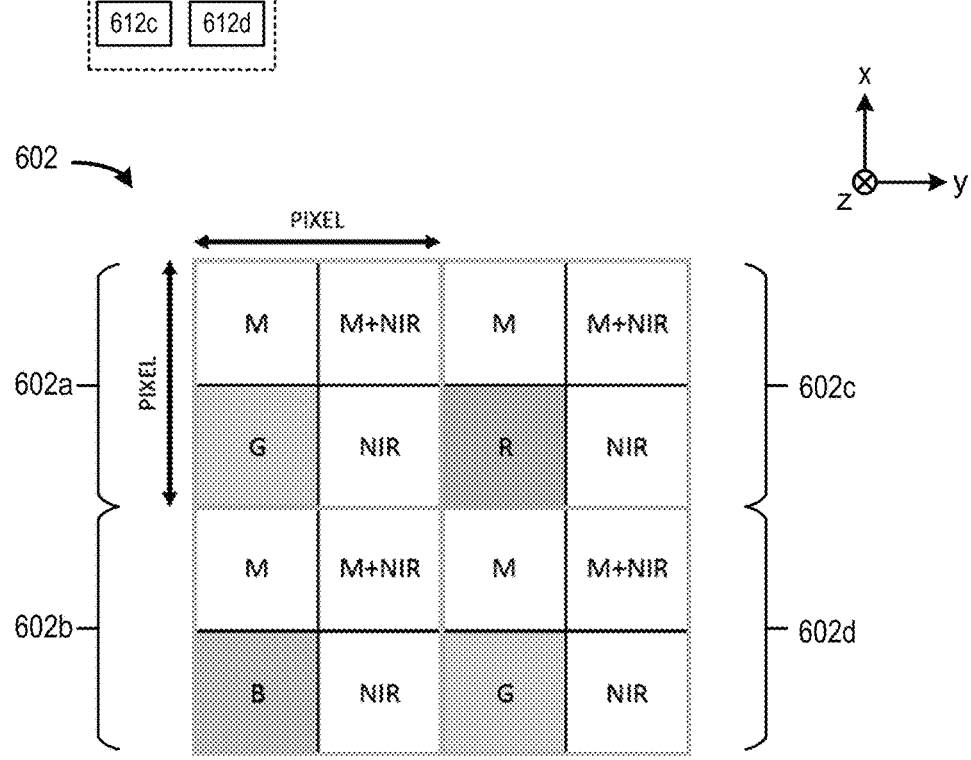
Figure 8D:
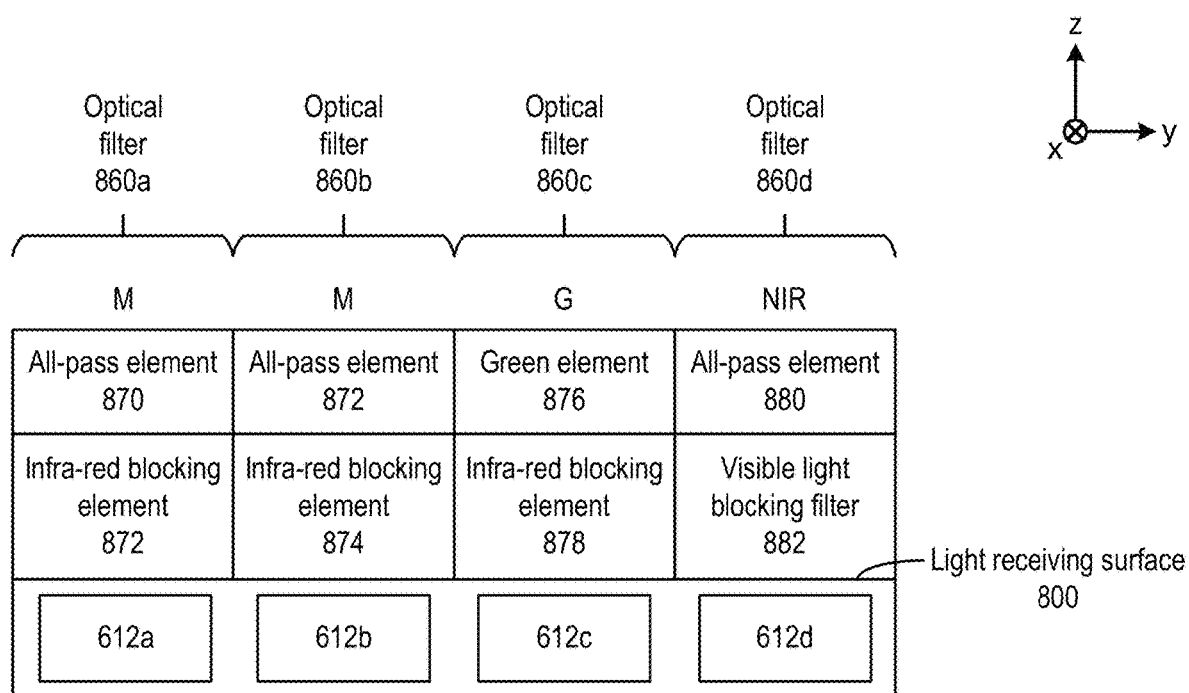
Figure 8D:
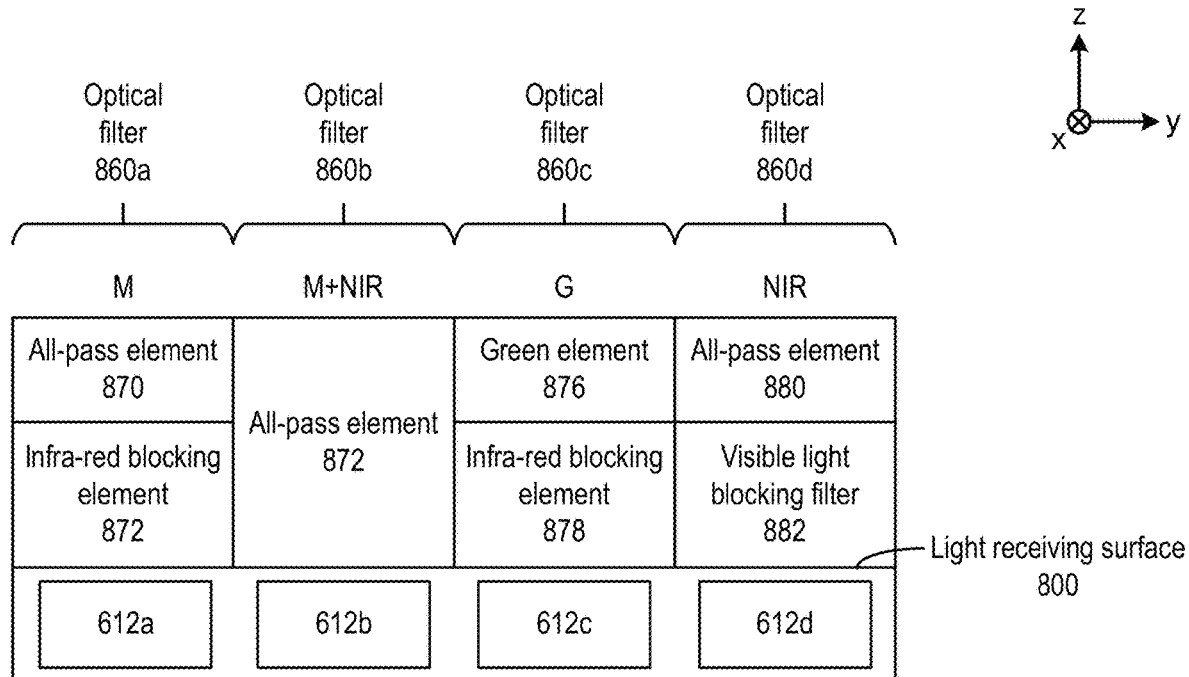

FIG. 8B-FIG. 8D illustrate other example arrangements of photodiodes 612 within a pixel cell. As shown in FIG. 8B-FIG. 8D, the plurality of photodiodes 612 can be arranged laterally, parallel with light receiving surface 800. The top graph of FIG. 8B illustrates a side view of an example of pixel cell 602a, whereas the bottom graph of FIG. 8B illustrates a top view of pixel array 602 including pixel cell 602a. The top graph and the bottom graph may illustrate two different example arrangements of photodiodes. For example, in the top graph four pixel cells 612a, 612b, 612c, and 612d can be arranged in a 4×1 pattern, while the bottom graph the four pixel cells are arranged in a 2×2 pattern.

As shown in FIG. 8B, with light receiving surface 800 being parallel with the x and y axes, photodiodes 612a, 612b, 612c, and 612d can be arranged adjacent to each other also along the x and y axes in semiconductor substrate 840. Pixel cell 602a further includes an optical filter array 860 overlaid on the photodiodes. Optical filter array 860 can be part of optical filter 624. Optical filter array 860 can include a filter element overlaid on each of photodiodes 612a, 612b, 612c, and 612d to set a wavelength range of incident light component received by the respective photodiode. For example, filter element 860a is overlaid on photodiode 612a and can allow only visible blue light to enter photodiode 612a. Moreover, filter element 860b is overlaid on photodiode 612b and can allow only visible green light to enter photodiode 612b. Further, filter element 860c is overlaid on photodiode 612c and can allow only visible red light to enter photodiode 612c. Filter element 860d is overlaid on photodiode 612d and can allow only infrared light to enter photodiode 612d.

Pixel cell 602a further includes one or more microlens 862 which can project light 864 from a spot of a scene (e.g., spot 804a) via optical tiler array 860 to different lateral locations of light receiving surface 800, which allows each photodiode to become a sub-pixel of pixel cell 602a and to receive components of light from the same spot corresponding to a pixel. In some examples, a single microlens 862 can be overlaid on multiple pixels as shown in FIG. 8B. In some examples, a single microlens 862 can be overlaid on a pixel, and each pixel can have a single microlens.

Pixel cell 602a can also include semiconductor substrate 848 which can include circuit 849 (e.g., charge sensing units 614, ADCs 616.) to generate digital values from the charge generated by the photodiodes. Semiconductor substrates 840 and 848 can form a stack and can be connected with interconnect 856. In FIG. 8B, semiconductor substrate 840 can form a sensor layer, whereas semiconductor substrate 848 can form an ASIC layer.

The arrangements of FIG. 8B, in which the photodiodes are arranged laterally and an optical filter array is used to control the light components received by the photodiodes, can offer numerous advantages. For example, the number of stacks and the number of semiconductor substrates can be reduced, which not only reduce the vertical height but also the interconnects among the semiconductor substrates. Moreover, relying on filter elements rather than the propagation distance of light to set the wavelength ranges of the components absorbed by each photodiode can offer flexibilities in selecting the wavelength ranges. As shown in top graph of FIG. 8C, pixel cells array 602 can include different optical filter arrays 860 for different pixel cells. For example, each pixel cell of pixel cells array 602 can have an optical filter array that provides monochrome channel of a wavelength range of 380-740 nm (labelled with "M") for photodiodes 612a and 612b, and an infrared channel of a wavelength range of 700-1000 nm (labelled with "NIR") for photodiode 612d. But the optical filter arrays may also provide a different visible color channel for the different pixel cells. For example, the optical filter arrays 860 for pixel cells array 602a, 602b, 602c, and 602d may provide, respectively, a visible green channel (labelled with "G"), a visible red channel (labelled with "R"), a visible blue channel (labelled with "B"), and a visible green channel for photodiode 612c of the pixel cells arrays. As another example, as shown in the bottom graph of FIG. 8C, each optical filter array 860 can provide a monochrome and infrared channel (labelled "M+NIR") which spans a wavelength range of 380-1000 nm for photodiode 612b of each pixel cells array.

FIG. 8D illustrates examples of optical filter array 860 to provide the example channels shown in FIG. 8C. As shown in FIG. 8D, optical filter array 860 can include a stack of optical filters to select a wavelength range of light received by each photodiode within a pixel cell array. For example, referring to the top graph of FIG. 8D, optical filter 860a can include an all-pass element 870 (e.g., a transparent glass that passes both visible light and infrared light) and an infrared blocking element 872 forming a stack to provide a monochrome channel for photodiode 612a. Optical filter 860b can also include an all-pass element 874 and an infrared blocking element 876 to also provide a monochrome channel for photodiode 612b. Further, optical filter 860c can include a green-pass element 876 which passes green visible light (but reject other visible light component), and an infrared blocking element 878, to provide a green channel for photodiode 612c. Lastly, optical filter 860d can include an all-pass element 880 and a visible light blocking filter 882 (which can block out visible light but allows infrared light to go through) to provide an infrared channel for photodiode 612d. In another example, as shown in the bottom graph of FIG. 8D, optical filter 860b can include only all-pass element 872 to provide a monochrome and infrared channel for photodiode 612b.

FIG. 8E illustrates another example optical configurations of photodiodes 612. As shown in FIG. 8E, instead of overlaying a microlens 862 over a plurality of photodiodes, as shown in FIG. 8B, a plurality of microlenses 892 can be overlaid over the plurality of photodiodes 612a-612d, which are arranged in a 2×2 format. For example, microlens 892a can be overlaid over photodiode 612a, microlens 892b can be overlaid over photodiode 612b, and microlens 892c can be overlaid over photodiode 612c, whereas microlens 892d can be overlaid over photodiode 612d. With such arrangements, each photodiode can correspond to a pixel, which can shrink the required footprint of pixel cell array to achieve a target resolution.

Different patterns of filter arrays can be inserted between plurality of microlenses 862 and plurality of photodiodes 612. For example, as shown in FIG. 8E, a 2×2 color filter pattern comprising red (R), green (G), and blue (B) filters can be inserted between the microlenses and the photodiodes. Moreover, an all-pass filter pattern can also be inserted between the microlenses and the photodiodes so that each photodiode detects a monochrome channel. Also, an infrared filter pattern can also be inserted between the microlenses and the photodiodes so that each photodiode detects infrared light.

Figure 9:
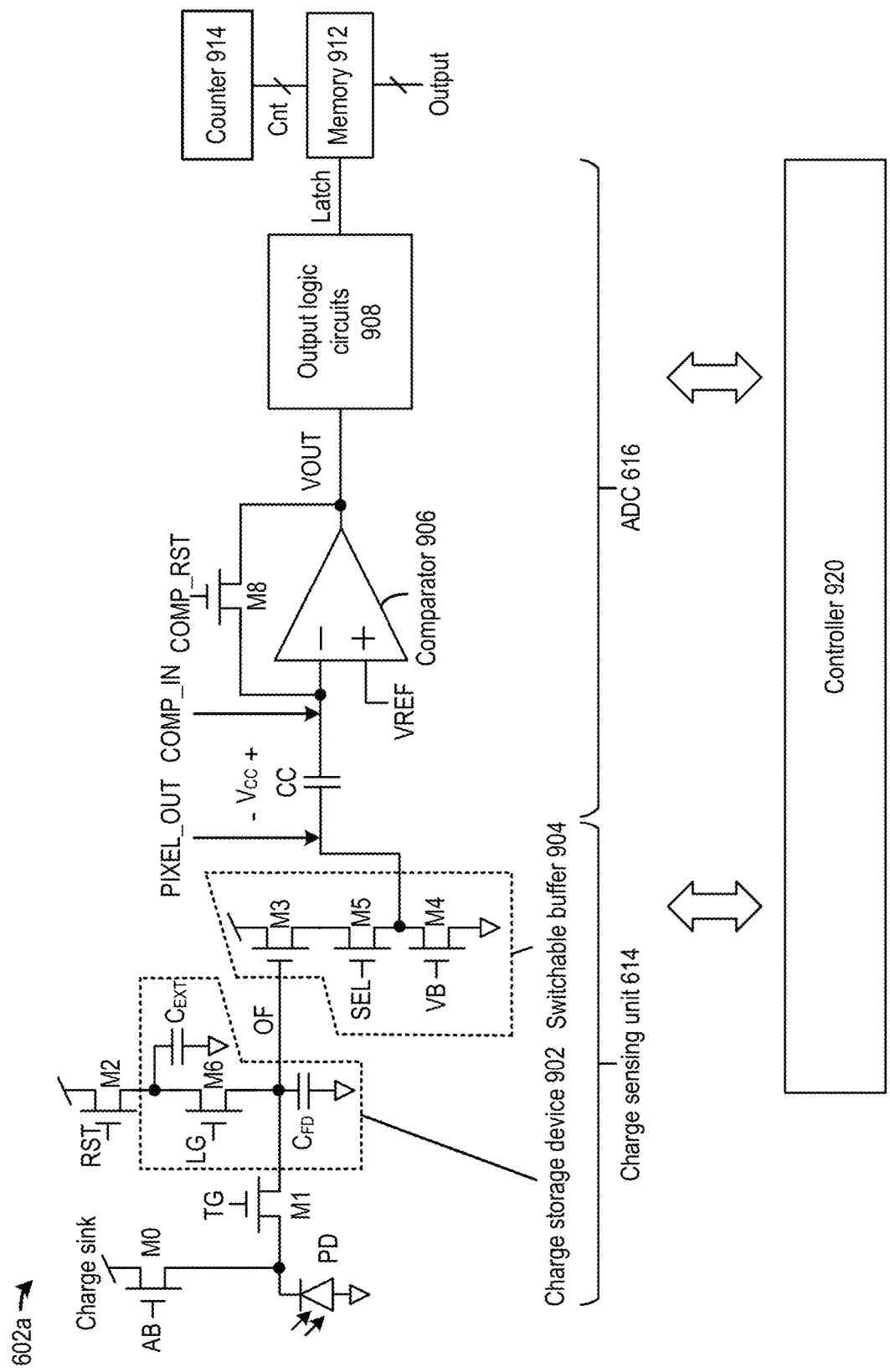
FIG. 9 illustrates examples of internal components of a pixel cell of FIG. 6.

Reference is now made to FIG. 9, which illustrates additional components of pixel cell 602a, including an example of charge sensing unit 614 and ADC 616. As shown in FIG. 9, pixel cell 602a can include a photodiode PD (e.g., photodiode 612a), a charge draining transistor M0, a charge transfer transistor M1, a charge sensing unit 614 comprising a charge storage device 902 and a switchable buffer 904, and an ADC 616 comprising a CC capacitor, a comparator 906, and output logic circuits 908. The output of comparator 906 is coupled, via output logic circuits 908, with a memory 912 and a counter 914 which can be internal to or external to pixel cell 602a. Pixel cell 602 further includes a controller 920 to control the transistors, charge sensing unit 614, as well as ADC 616, As to be described below, controller 920 can set an exposure period to accumulate charge based on incident light, and can control charge sensing unit 614 and ADC 616 to perform multiple quantization operations associated with different light intensity ranges to generate a digital representation of the intensity of the incident light. Controller 920 can be internal to pixel cell 602a or part of sensing controller 640. Each transistor in pixel cell 602a can include, for example, a metal-oxide-semiconductor field-effect transistor (MOSFET), a bipolar junction transistor (BJT), etc. Photodiode PD, charge draining transistor M0, charge transfer transistor M1, and charge sensing unit 614 can be in a sensor layer (e.g., substrates 840-846 of FIG. 8A, substrate 840 of FIG. 8B), whereas ADC 616, memory 912, and counter 914 can be in an ASIC layer (e.g., substrate 848 of FIG. 8A and FIG. 8B), with the two substrates forming a stack.

Specifically, charge transfer transistor M1 can be controlled by a TG signal provided by controller 920 to transfer some of the charge to charge storage device 902. In one quantization operation, charge transfer transistor M1 can be biased at a partially-on state to set a quantum well capacity of photodiode PD, which also sets a quantity of residual charge stored at photodiode PD. After photodiode PD is saturated by the residual charge, overflow charge can flow through charge transfer transistor M1 to charge storage device 902. In another quantization operation, charge transfer transistor M1 can be fully turned on to transfer the residual charge from photodiode PD to charge storage device for measurement. Moreover, charge draining transistor M0 is coupled between photodiode PD and a charge sink. Charge draining transistor M0 can be controlled by an anti-blooming (AB) signal provided by controller 920 to start an exposure period, in which photodiode PD can generate and accumulate charge in response to incident light. Charge draining transistor M0 can also be controlled to provide an anti-blooming function to drain away additional charge generated by photodiode PD to the charge sink after charge storage device 902 saturates, to prevent the additional charge from leaking into neighboring pixel cells.

Charge storage device 902 has a configurable capacity and can convert the charge transferred from transistor M1 to a voltage at the OF node. Charge storage device 902 includes a CFD capacitor (e.g., a floating diffusion) and a CEXT capacitor (e.g., a MOS capacitor, a metal capacitor, etc.) connected by a M6 transistor. M6 transistor can be enabled by a LG signal to expand the capacity of charge storage device 902 by connecting CFD and CEXT capacitors in parallel, or to reduce the capacity by disconnecting the capacitors from each other. The capacity of charge storage device 902 can be reduced for measurement of residual charge to increase the charge-to-voltage gain and to reduce the quantization error. Moreover, the capacity of charge storage device 902 can also be increased for measurement of overflow charge to reduce the likelihood of saturation and to improve non-linearity. As to be described below, the capacity of charge storage device 902 can be adjusted for measurement of different light intensity ranges. Charge storage device 902 is also coupled with a reset transistor M2 which can be controlled by a reset signal RST, provided by controller 920, to reset CFD and CEXT capacitors between different quantization operations. In some examples, with transistor M1 fully enabled, reset signal RST can also be used to control the start and end of the exposure period in which PD generates and accumulates charge in response to light. In such examples, charge draining transistor M0 can be omitted.

Switchable buffer 904 can be include a transistor M3 configured as a source follower to buffer the voltage at the OF node to improve its driving strength. The buffered voltage can be at the input node PIXEL_OUT of ADC 616. The M4 transistor provides a current source for switchable buffer 904 and can be biased by a VB signal. Switchable buffer 904 also includes a transistor M5 which be enabled or disabled by a SEL signal. When transistor M5 is disabled, source follower M3 can be disconnected from the PIXEL_OUT node. As to be described below, pixel cell 602a may include multiple charge sensing units 614 each including a switchable buffer 904, and one of the charge sensing units can be coupled with PIXEL_OUT (and ADC 616) at one time based on the SEL signal.

Figure 10:
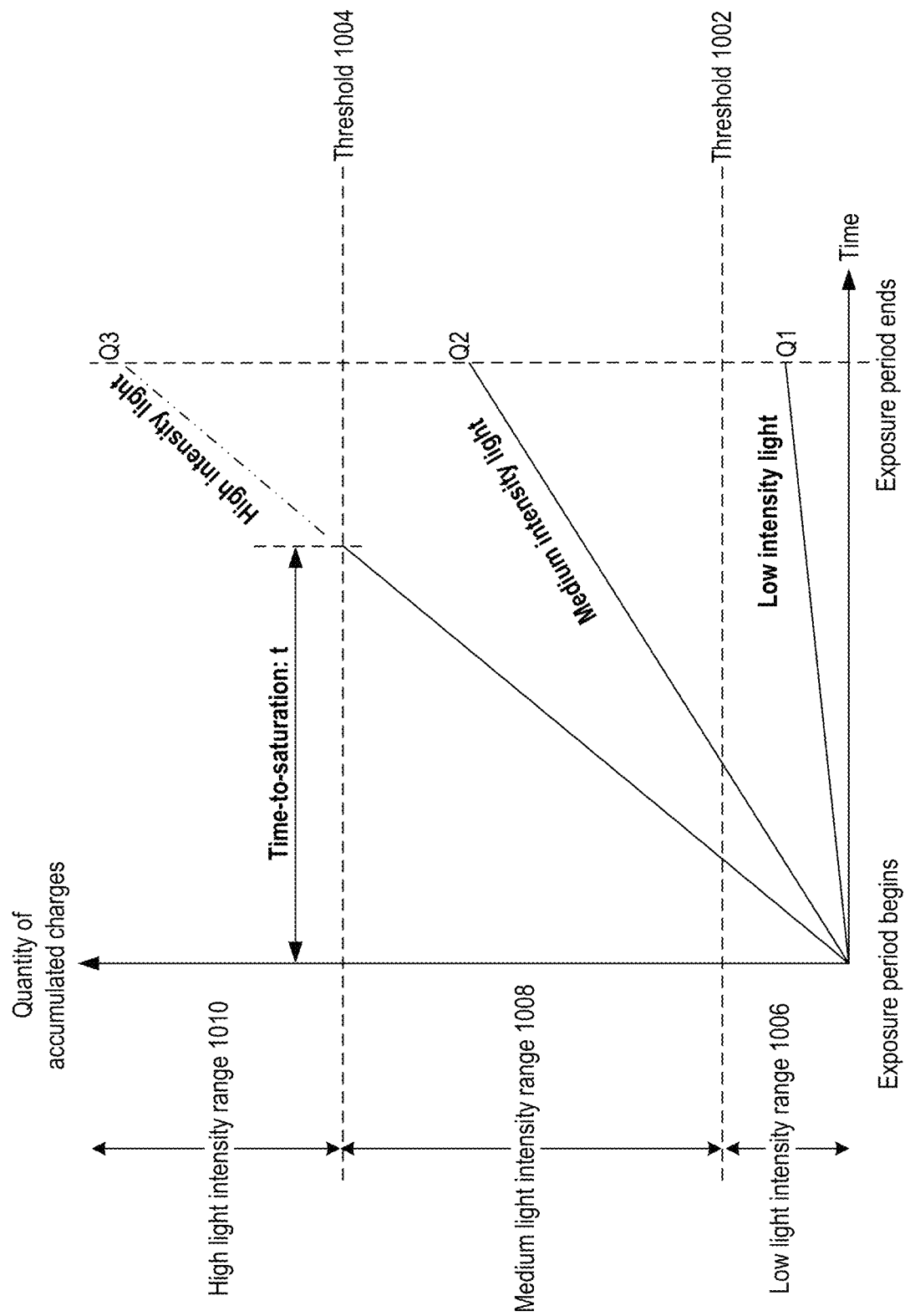
FIG. 10 illustrates examples of light intensity ranges to be measured by a pixel cell of FIG. 6.

As described above, charge generated by photodiode PD within an exposure period can be temporarily stored in charge storage device 902 and converted to a voltage. The voltage can be quantized to represent an intensity of the incident light based on a pre-determined relationship between the charge and the incident light intensity. Reference is now made to FIG. 10, which illustrates a quantity of charge accumulated with respect to time for different light intensity ranges. The total quantity of charge accumulated at a particular time point can reflect the intensity of light incident upon photodiode PD of FIG. 6 within an exposure period. The quantity can be measured when the exposure period ends. A threshold 1002 and a threshold 1004 can be defined for a threshold's quantity of charge defining a low light intensity range 1006, a medium light intensity range 1008, and a high light intensity range 1010 for the intensity of the incident light. For example, if the total accumulated charge is below threshold 1002 (e.g., Q1), the incident light intensity is within low light intensity range 1006. If the total accumulated charge is between threshold 1004 and threshold 1002 (e.g., Q2), the incident light intensity is within medium light intensity range 1008. If the total accumulated charge is above threshold 1004, the incident light intensity is within medium light intensity range 1010. The quantity of the accumulated charge, for low and medium light intensity ranges, can correlate with the intensity of the incident light, if the photodiode does not saturate within the entire low light intensity range 1006 and the measurement capacitor does not saturate within the entire medium light intensity range 1008.

The definitions of low light intensity range 1006 and medium light intensity range 1008, as well as thresholds 1002 and 1004, can be based on the full well capacity of photodiode PD and the capacity of charge storage device 902. For example, low light intensity range 706 can be defined such that the total quantity of residual charge stored in photodiode PD, at the end of the exposure period, is below or equal to the storage capacity of the photodiode, and threshold 1002 can be based on the full well capacity of photodiode PD. Moreover, medium light intensity range 1008 can be defined such that the total quantity of charge stored in charge storage device 902, at the end of the exposure period, is below or equal to the storage capacity of the measurement capacitor, and threshold 1004 can be based on the storage capacity of charge storage device 902. Typically threshold 1004 is can be based on a scaled storage capacity of charge storage device 902 to ensure that when the quantity of charge stored in charge storage device 902 is measured for intensity determination, the measurement capacitor does not saturate, and the measured quantity also relates to the incident light intensity. As to be described below, thresholds 1002 and 1004 can be used to detect whether photodiode PD and charge storage device 902 saturate, which can determine the intensity range of the incident light.

In addition, in a case where the incident light intensity is within high light intensity range 1010, the total overflow charge accumulated at charge storage device 902 may exceed threshold 1004 before the exposure period ends. As additional charge is accumulated, charge storage device 902 may reach full capacity before the end of the exposure period, and charge leakage may occur. To avoid measurement error caused due to charge storage device 902 reaching full capacity, a time-to-saturation measurement can be performed to measure the time duration it takes for the total overflow charge accumulated at charge storage device 902 to reach threshold 1004. A rate of charge accumulation at charge storage device 902 can be determined based on a ratio between threshold 1004 and the time-to-saturation, and a hypothetical quantity of charge (Q3) that could have been accumulated at charge storage device 902 at the end of the exposure period (if the capacitor had limitless capacity) can be determined by extrapolation according to the rate of charge accumulation. The hypothetical quantity of charge (Q3) can provide a reasonably accurate representation of the incident light intensity within high light intensity range 1010.

Referring back to FIG. 9, to measure high light intensity range 1010 and medium light intensity range 1008, charge transfer transistor M1 can be biased by TG signal in a partially turned-on state. For example, the gate voltage of charge transfer transistor M1 (TG) can be set based on a target voltage developed at photodiode PD corresponding to the full well capacity of the photodiode. With such arrangements, only overflow charge (e.g., charge generated by the photodiode after the photodiode saturates) will transfer through charge transfer transistor M1 to reach charge storage device 902, to measure time-to-saturation (for high light intensity range 1010) and/or the quantity of charge stored in charge storage device 902 (for medium light intensity range 1008). For measurement of medium and high light intensity ranges, the capacitance of charge storage device 902 (by connecting CEXT and CFD) can also be maximized to increase threshold 1004.

Moreover, to measure low light intensity range 1006, charge transfer transistor M1 can be controlled in a fully turned-on state to transfer the residual charge stored in photodiode PD to charge storage device 902. The transfer can occur after the quantization operation of the overflow charge stored at charge storage device 902 completes and after charge storage device 902 is reset. Moreover, the capacitance of charge storage device 902 can be reduced. As described above, the reduction in the capacitance of charge storage device 902 can increase the charge-to-voltage conversion ratio at charge storage device 902, such that a higher voltage can be developed for a certain quantity of stored charge. The higher charge-to-voltage conversion ratio can reduce the effect of measurement errors (e.g., quantization error, comparator offset, etc.) introduced by subsequent quantization operation on the accuracy of low light intensity determination. The measurement error can set a limit on a minimum voltage difference that can be detected and/or differentiated by the quantization operation. By increasing the charge-to-voltage conversion ratio, the quantity of charge corresponding to the minimum voltage difference can be reduced, which in turn reduces the lower limit of a measurable light intensity by pixel cell 602a and extends the dynamic range.

The charge (residual charge and/or overflow charge) accumulated at charge storage device 902 can develop an analog voltage at the OF node, which can be buffered by switchable buffer 904 at PIXEL_OUT and quantized by ADC 616. As shown in FIG. 9, ADC 616 includes a comparator 906 which can be reset by a transistor M8, and output logic circuits 908. ADC 616 is also coupled with memory 912 and counter 914. Counter 914 can generate a set of count values based on a free-running clock signal, whereas memory 912 can be controlled, by comparator 906 via output logic circuits 908, to store a count value (e.g., the latest count value) generated by counter 914. Memory 912 can be, for example, a latch circuit to store the counter value based on local pixel value as described below. The stored count value can be output via pixel output buses 816.

Comparator 906 can compare an analog voltage COMP_IN, which is derived from PIXEL_OUT by the CC capacitor, against a threshold VREF, and generate a decision VOUT based on the comparison result. The CC capacitor can be used in a noise/offset compensation scheme to store the reset noise and comparator offset information in a VCC voltage, which can be added to the PIXEL_OUT voltage to generate the COMP_IN voltage, to cancel the reset noise component in the PIXEL_OUT voltage. The offset component remains in the COMP_IN voltage and can be cancelled out by the offset of comparator 906 when comparator 906 compares the COMP_IN voltage against threshold VREF to generate the decision VOUT. Comparator 906 can generate a logical one for VOUT if the COMP_IN voltage equals or exceeds VREF. Comparator 906 can also generate a logical zero for VOUT if the COMP_IN voltage falls below VREF. VOUT can control a latch signal which controls memory 912 to store a count value from counter 914.

Figure 11B:
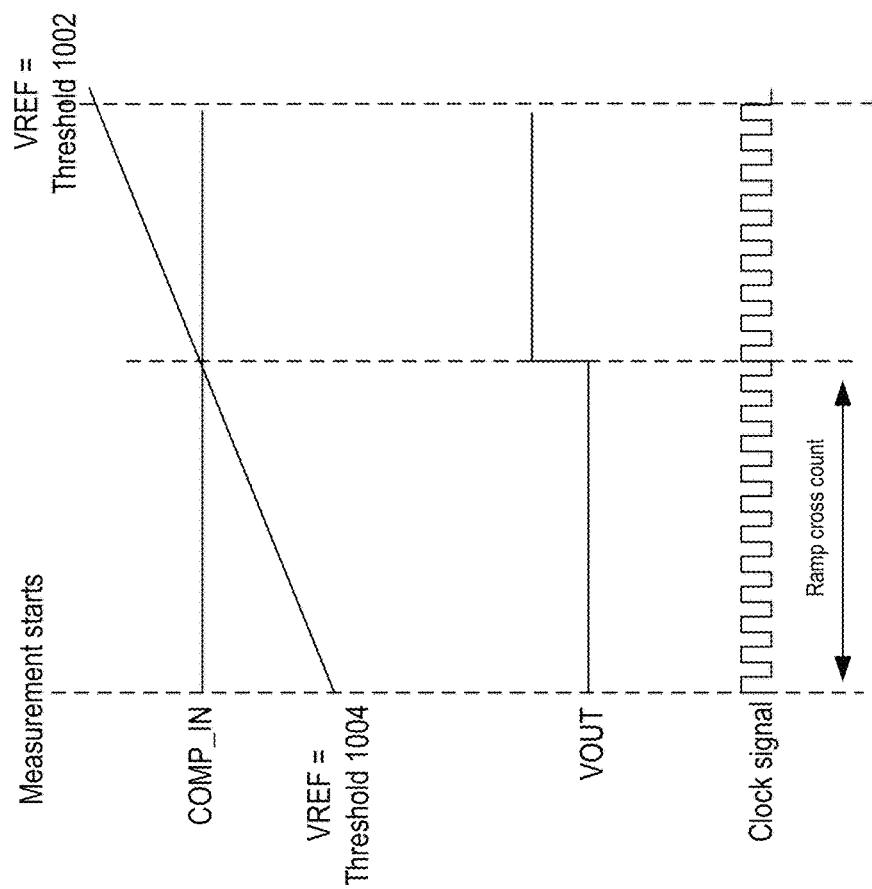
Figure 11A:
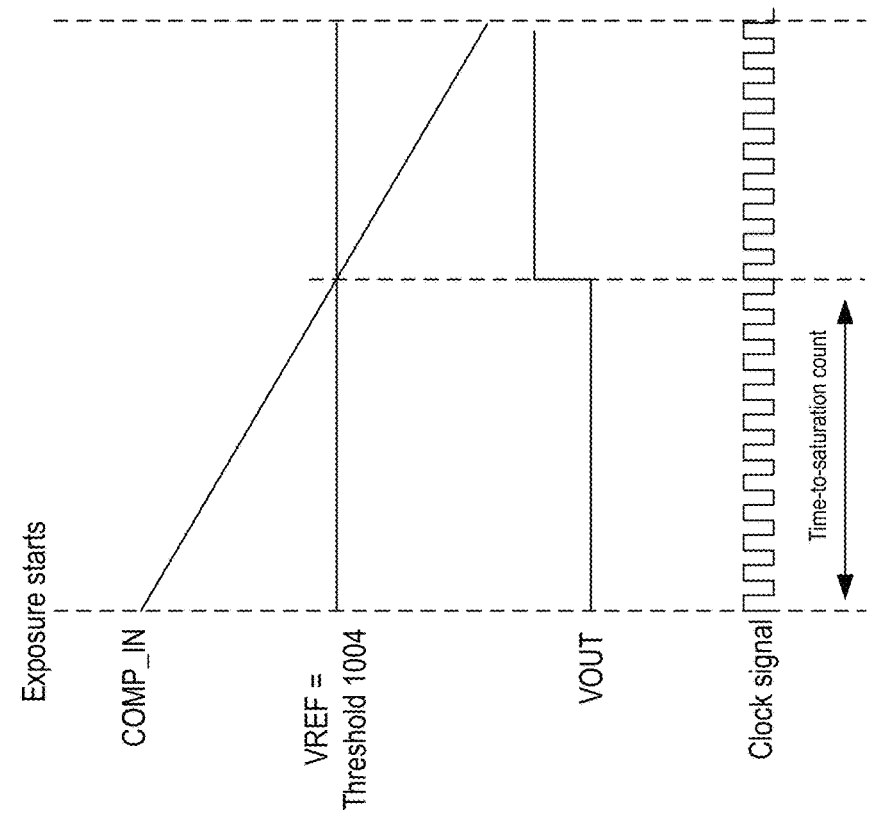

FIG. 11A illustrates an example of time-to-saturation measurement by ADC 616. To perform the time-to-saturation measurement, a threshold generator (which can be external to pixel cell 602a) can generate a fixed VREF. Fixed VREF can be set at a voltage corresponding a charge quantity threshold for saturation of charge storage device 902 (e.g., threshold 1004 of FIG. 10). Counter 914 can start counting right after the exposure period starts (e.g., right after charge draining transistor M0 is disabled). As the COMP_IN voltage ramps down (or up depending on the implementation) due to accumulation of overflow charge at charge storage device 902, clock signal keeps toggling to update the count value at counter 914. The COMP_IN voltage may reach the fixed VREF threshold at a certain time point, which causes VOUT to flip from low to high. The change of VOUT may stop the counting of counter 914, and the count value at counter 914 may represent the time-to-saturation.

FIG. 11B illustrates an example of measurement of a quantity of charge stored at charge storage device 902. After measurement starts, the threshold generator can generate a ramping VREF, which can either ramp up (in the example of FIG. 11B) or ramp down depending on implementation. The rate of ramping can be based on the frequency of the clock signal supplied to counter 914. In a case where overflow charge is measured, the voltage range of ramping VREF can be between threshold 1004 (charge quantity threshold for saturation of charge storage device 902) and threshold 1002 (charge quantity threshold for saturation of photodiode PD), which can define the medium light intensity range. In a case where residual charge is measured, the voltage range of the ramping VREF can be based on threshold 1002 and scaled by the reduced capacity of charge storage device 902 for residual charge measurement. In the example of FIG. 11B, the quantization process can be performed with uniform quantization steps, with VREF increasing (or decreasing) by the same amount for each clock cycle. The amount of increase (or decrease) of VREF corresponds to a quantization step. When VREF reaches within one quantization step of the COMP_IN voltage, VOUT of comparator 906 flips, which can stop the counting of counter 914, and the count value can correspond to a total number of quantization steps accumulated to match, within one quantization step, the COMP_IN voltage. The count value can become a digital representation of the quantity of charge stored at charge storage device 902, as well as the digital representation of the incident light intensity.

As discussed above, ADC 616 can introduce quantization errors when there is a mismatch between a quantity of charge represented by the quantity level output by ADC 616 (e.g., represented by the total number of quantization steps) and the actual input quantity of charge that is mapped to the quantity level by ADC 808. The quantization error can be reduced by using a smaller quantization step size. In the example of FIG. 11B, the quantization error can be reduced by the amount of increase (or decrease) in VREF per clock cycle.

Although quantization error can be reduced by using smaller quantization step sizes, area and performance speed may limit how far the quantization step can be reduced. With smaller quantization step size, the total number of quantization steps needed to represent a particular range of charge quantities (and light intensity) may increase. A larger number of data bits may be needed to represent the increased number of quantization steps (e.g., 8 bits to represent 255 steps, 7 bits to represent 127 steps). The larger number of data bits may require additional buses to be added to pixel output buses 816, which may not be feasible if pixel cell 601 is used on a head-mounted device or other wearable devices with very limited spaces. Moreover, with a larger number of quantization step size, ADC 808 may need to cycle through a larger number of quantization steps before finding the quantity level that matches (with one quantization step), which leads to increased processing power consumption and time, and reduced rate of generating image data. The reduced rate may not be acceptable for some applications that require a high frame rate (e.g., an application that tracks the movement of the eyeball).

One way to reduce quantization error is by employing a non-uniform quantization scheme, in which the quantization steps are not uniform across the input range. FIG. 11C illustrates an example of a mapping between the ADC codes (the output of the quantization process) and the input charge quantity level for a non-uniform quantization process and a uniform quantization process. The dotted line illustrates the mapping for the non-uniform quantization process, whereas the solid line illustrates the mapping for the uniform quantization process. For the uniform quantization process, the quantization step size (denoted by $\Delta_1$) is identical for the entire range of input charge quantity. In contrast, for the non-uniform quantization process, the quantization step sizes are different depending on the input charge quantity. For example, the quantization step size for a low input charge quantity (denoted by $\Delta_S$) is smaller than the quantization step size for a large input charge quantity (denoted by $\Delta_L$). Moreover, for the same low input charge quantity, the quantization step size for the non-uniform quantization process ($\Delta_S$) can be made smaller than the quantization step size for the uniform quantization process ($\Delta_1$).

One advantage of employing a non-uniform quantization scheme is that the quantization steps for quantizing low input charge quantities can be reduced, which in turn reduces the quantization errors for quantizing the low input charge quantities, and the minimum input charge quantities that can be differentiated by ADC 616 can be reduced. Therefore, the reduced quantization errors can push down the lower limit of the measureable light intensity of the image sensor, and the dynamic range can be increased. Moreover, although the quantization errors are increased for the high input charge quantities, the quantization errors may remain small compared with high input charge quantities. Therefore, the overall quantization errors introduced to the measurement of the charge can be reduced. On the other hand, the total number of quantization steps covering the entire range of input charge quantities may remain the same (or even reduced), and the aforementioned potential problems associated with increasing the number of quantization steps (e.g., increase in area, reduction in processing speed) can be avoided.

FIG. 11D illustrates an example of quantizing an analog voltage by pixel ADC 808 using a non-uniform quantization process. Compared with FIG. 11B (which employs a uniform quantization process), VREF increases in a non-linear fashion with each clock cycle, with a shallower slope initially and a steeper slope at a later time. The differences in the slopes are attributed to the uneven quantization step sizes. For lower counter count values (which correspond to a lower input quantity range), the quantization steps are made smaller, hence VREF increases at a slower rate. For higher counter count values (which correspond to a higher input quantity range), the quantization steps are made larger, hence VREF increases at a higher rate. The non-uniform VREF slope can be generated based on, for example, changing the frequency of counting of counter 814, changing the relationship between the VREF voltage and the count values of counter 914, etc. In some examples, the non-uniform quantization process of FIG. 11D can be employed for light intensity determination for low light intensity range 1006 and medium light intensity range 1008.

Referring back to FIG. 9, controller 920 can perform a time-to-saturation (TTS) quantization operation, a quantization operation to measure a quantity of overflow charge (herein after, "FD ADC" operation), and a quantization operation to measure a quantity of residual charge (hereinafter "PD ADC" operation). Controller 920 can also skip one or more of the quantization operations. Output logic circuits 908 can select which of the quantization operations to store the count value at memory 912. Output logic circuits 908 can make the selection based on determining, based on the output of comparator 906 in each quantization operation, whether a quantity of the residual charge in photodiode PD exceeds a saturation threshold of the photodiode (e.g., corresponding to threshold 1002 of FIG. 10), and whether a quantity of the overflow charge in charge storage device 902 exceeds a saturation threshold of the charge storage device (e.g., corresponding to threshold 1004 of FIG. 10). If output logic circuits 908 detect that the quantity of the overflow charge exceeds threshold 1004 during the TTS operation, output logic circuits 908 can store the TTS output in memory 912. If output logic circuits 908 detect that the quantity of the overflow charge does not exceed threshold 1004 but that the quantity of the residual charge exceeds threshold 1002, output logic circuits 908 can store the FD ADC output in memory 912. Lastly, if output logic circuits 908 detect the quantity of the residual charge does not exceed threshold 1002, output logic circuits 908 can store the PD ADC output in memory 912. In some examples, output logic circuits 908 can include registers to store one or more states of whether saturation of charge storage device 902 is detected and whether the saturation of photodiode PD is detected, which output logic circuits 908 can use to perform the selection.

Figure 12A:
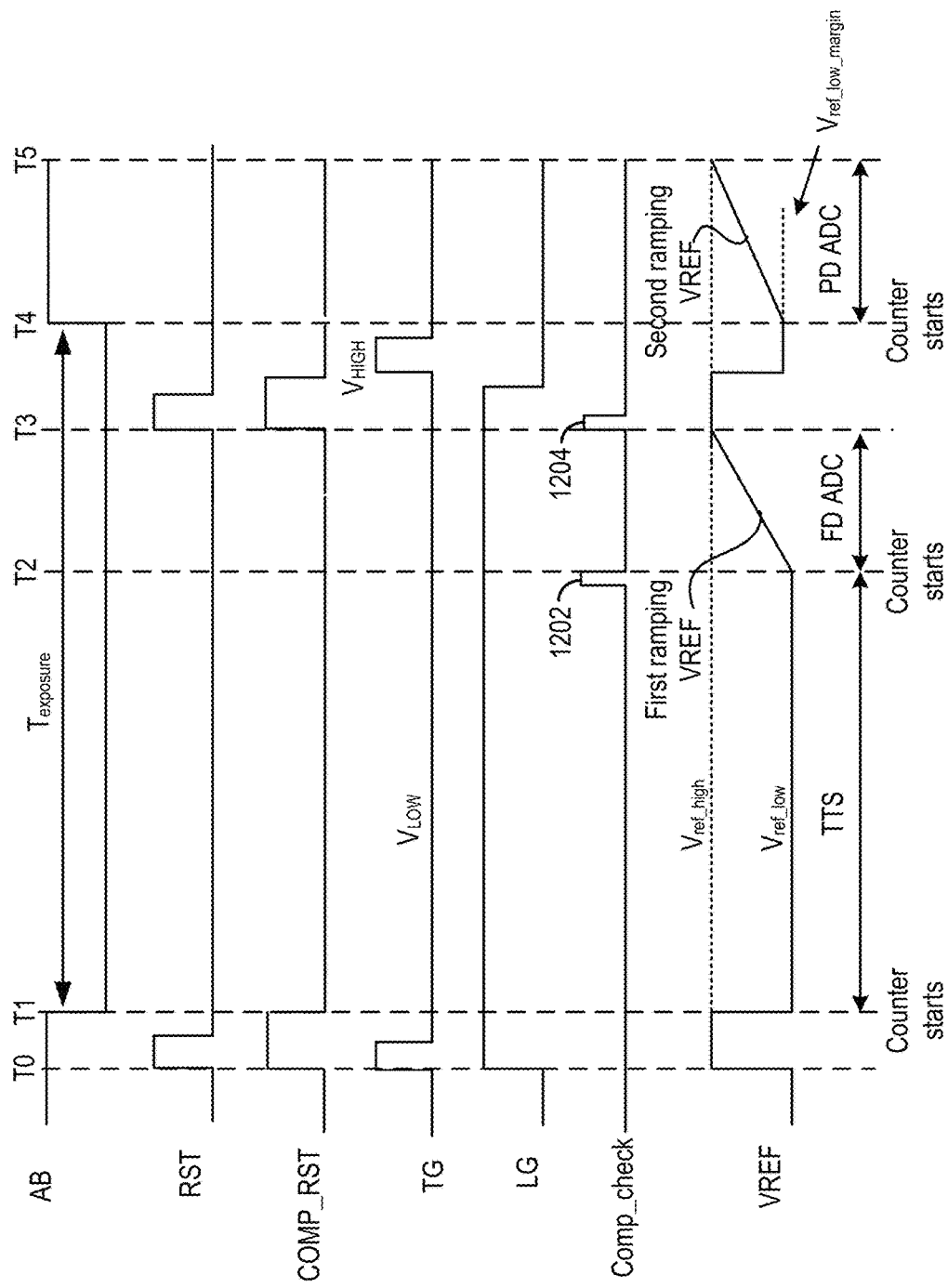
FIGS. 12A and 12B illustrate example sequences of control signals to perform light intensity measurement.
Figure 12B:
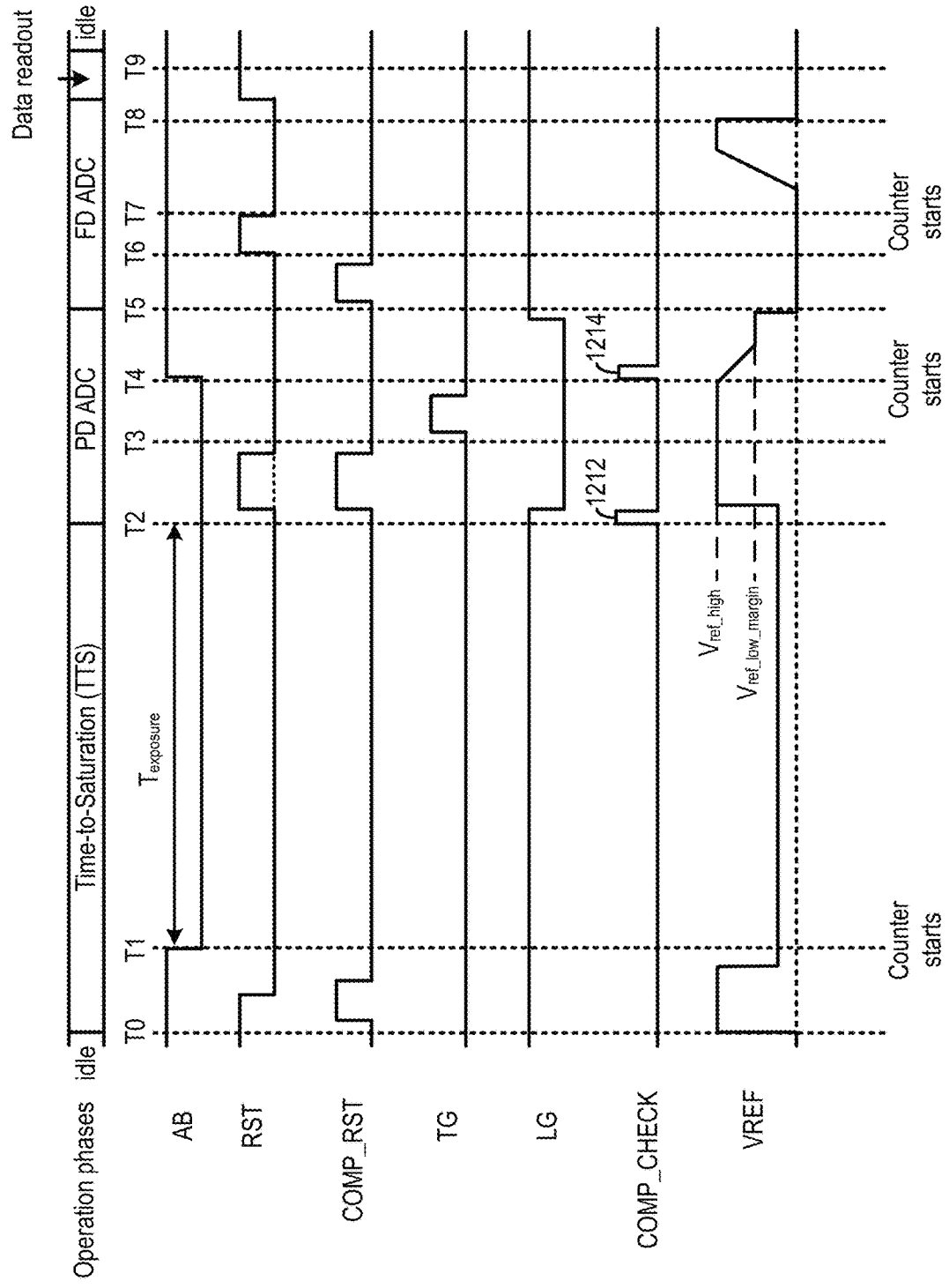

Reference is now made to FIG. 12A and FIG. 12B, which illustrate example sequences of the control signals of pixel cell 602a generated by controller 920. Both FIG. 12A and FIG. 12B illustrate the change of AB, RST, COMP_RST, TG, LG, and VREF with respect to time. Referring to FIG. 12A, the period between times T0 and T1 can correspond to a first reset phase, in which charge storage device 902 and comparator 906 can be put in a reset state by controller 920 by asserting the RST and COMP_RST signals, while the AB signal can be asserted to prevent charge generated by photodiode PD from reaching charge storage device 902. Both RST and LG signals are asserted to reset CFD and CEXT capacitors to set PIXEL_OUT at the reset level. With COMP_RST signal asserted and the positive terminal of comparator 906 connected to $V_{ref\_high}$, COMP_IN can be set to a sum of $V_{ref\_high}$ and comparator offset $V_{comp\_offset}$. Moreover, with RST signal asserted, PIXEL_OUT can be set the reset voltage $V_{pixel\_out\_rst}$ and can include reset noise $V\sigma_{KTC}$. A first sampling operation can be performed by the CC capacitor to store a $V_{CC}$ voltage including the components of the comparator offset, the reset noise, and PIXEL_OUT voltage at the reset level, as follows:

$$V_{cc}(T1) = (V_{ref\_high} + V_{comp\_offset}) - (V_{pixel\_out\_rst} + V\sigma_{KTC}) \quad \text{(Equation 1)}$$

At time T1, the RST signal, the AB signal, and the COMP_RST signal are released, which starts an exposure period (labelled $T_{exposure}$) in which photodiode PD can accumulate and transfer charge. Exposure period $T_{exposure}$ can end at time T4 when the AB signal is asserted. Between times T1 and T3, TG signal can set charge transfer transistor M1 in a partially turned-on state to allow PD to accumulate residual charge before photodiode PD saturates. If the light intensity in the medium or high intensity ranges of FIG. 10, photodiode PD can saturate and transfer overflow charge via charge transfer transistor M1. LG signal can remain asserted to operate in low gain mode, in which both CFD capacitor and CEXT capacitor are connected in parallel to form charge storage device 902 to store the overflow charge. The overflow charge develops a new PIXEL_OUT voltage, $V_{pixel\_out\_sig1}$. The CC capacitor can AC couple the new PIXEL_OUT voltage $V_{pixel\_out\_sig1}$ into COMP_IN voltage by adding the $V_{CC}$ voltage, which includes the reset noise and comparator offset component. The new PIXEL_OUT voltage also includes reset noise, which can be cancelled by the reset noise component of the $V_{CC}$ voltage. The COMP_IN voltage at time Tx between times T1 and T3 can be as follows:

$$V_{comp\_in}(Tx) = V_{pixel\_out\_sig1} - V_{pixel\_out\_rst} + V_{ref\_high} + V_{comp\_offset} \quad \text{(Equation 2)}$$

In Equation 2, the difference between $V_{pixel\_out\_sig1} - V_{pixel\_out\_rst}$ represents the quantity of overflow charge stored in charge storage device 902. The comparator offset in the COMP_IN voltage can also cancel out the comparator offset introduced by comparator 906 when performing the comparison.

Between times T1 and T3, two phases of measurement of the COMP_IN voltage can be performed, including a TTS measurement phase for high light intensity range 1010 and an FD ADC phase for measurement of overflow charge for medium light intensity 1008. Between times T1 and T2 the TTS measurement can be performed by comparing COMP_IN voltage with a static $V_{ref\_low}$ representing a saturation level of charge storage device 902 by comparator 906. When PIXEL_OUT voltage reaches the static VREF, the output of comparator 906 (VOUT) can trip, and a count value from counter 914 at the time when VOUT trips can be stored into memory 912. At time T2, controller 920 can perform a check 1202 of the state of comparator 906. If the output of comparator 906 trips, controller 920 can store the state in a register of output logic circuits 908 indicating that the overflow charge in charge storage device 902 exceeds threshold 1004. The storage of the state can also prevent subsequent measurement phases (FD ADC and PD ADC) from overwriting the count value stored in memory 912. The count value from TTS can then be provided to represent the intensity of light received by photodiode PD during the exposure period.

Between times T2 and T3, the FD ADC operation can be performed by comparing COMP_IN voltage with a ramping VREF voltage that ramps from $V_{ref\_low}$ to $V_{ref\_high}$, which represents the saturation level of photodiode PD (e.g., threshold 1002), as described in FIG. 11B. If VOUT of comparator 906 trips during FD ADC, the count value of counter 914 at the time when VOUT trips can be stored in memory 912, if the state flag in output logic circuits 908 is not asserted which indicated that charge storage device 902 does not saturate in the TTS operation. Although exposure period ends at time T2, between times T2 and T3 photodiode PD remains capable of accumulating residual charge (if not saturated) or transferring overflow charge to charge storage device 902. At time T3, the controller can perform a check 1204 of the state of comparator 906 of the state of comparator 906. If the output of comparator 906 trips, and the state flag in output logic circuits 908 is not asserted from the TTS operation, controller 920 can assert the state flag in output logic circuits 908 to indicate that the overflow charge in charge storage device 902 exceeds threshold 1004. The assertion of the state flag can also prevent subsequent PD ADC phase from overwriting the count value stored in memory 912. The count value from FD ADC can then be provided to represent the intensity of light received by photodiode PD during the exposure period.

Between times T3 and T4 can be the second reset phase, in which both RST and COMP_RST signals are asserted to reset charge storage device 902 (comprising the parallel combination of Co capacitor and CEXT capacitor) and comparator 906 to prepare for the subsequent PD ADC operation. The $V_{CC}$ voltage can be set according to Equation 1.

After RST and COMP_RST are released, LG is turned off to disconnect CEXT from CF to increase the charge-to-voltage conversion rate for the PD ADC operation. TG is set at a level to fully turn on the M1 charge transfer transistor to transfer the residual charge stored in photodiode PD to Co. The residual charge develops a new PIXEL_OUT voltage, $V_{pixel\_out\_sig2}$. The CC capacitor can AC couple the new PIXEL_OUT voltage $V_{pixel\_out\_sig2}$ into COMP_IN voltage by adding the $V_{CC}$ voltage. Between times T3 and T4, photodiode PD remains capable of generating additional charge in addition to the charge generated between times T1 to T3, and transferring the additional charge to charge storage device 902. The $V_{pixel\_out\_sig2}$ also represents the additional charge transferred between times T3 and T4. At time T4, the COMP_IN voltage can be as follows:

$$V_{comp\_in}(T4) = V_{pixel\_out\_sig2} - V_{pixel\_out\_rst} + V_{ref\_high} + V_{comp\_offset} \quad \text{(Equation 3)}$$

In Equation 3, the difference between $V_{pixel\_out\_sig2} - V_{pixel\_out\_rst}$ represents the quantity of charge transferred by the photodiode to charge storage device 902 between times T3 and T4. The comparator offset in the COMP_IN voltage can also cancel out the comparator offset introduced by comparator 906 when performing the comparison.

At time T4, the AB signal is asserted to prevent photodiode PD from accumulating and transferring additional charge. Moreover, VREF can be set a static level $V_{ref\_low}$ margin. Comparator 906 can compare the COMP_IN voltage with $V_{ref\_low\_margin}$ to determine whether photodiode PD saturates. $V_{ref\_low\_margin}$ is slightly higher than $V_{ref\_low}$, which represents the saturation level of photodiode PD (e.g., threshold 1002), to prevent false tripping of comparator 906 when the quantity of residual charge is close to but does not exceed the saturation level.

Between times T4 and T5, controller 920 can perform the PD ADC operation by comparing the COMP_IN voltage with a VREF ramp that starts from $V_{ref\_low}$ margin to $V_{ref\_high}$. In PD ADC phase, $V_{ref\_high}$ can represent the minimum detectable quantity of residual charge stored in photodiode PD, whereas $V_{ref\_low\_margin}$ can represent the saturation threshold of photodiode PD with margin to account for dark current, as described above. If the state flag in output logic circuits 908 remains not asserted at this point, and if the output of comparator 906 trips, the count value of counter 914 when comparator 906 trips can be stored into memory 912, and the count value from PD ADC can be provided to represent the intensity of light.

Reference is now made to FIG. 12B, which illustrates another example sequence of the control signals of pixel cell 602a generated by controller 920. In FIG. 12B, PD ADC operation can be performed between the TTS and FD ADC operations, which can reduce the accumulation of additional charge in charge storage device 902 or in photodiode PD after the TTS operation and improve shutter efficiency. As shown in FIG. 12B, between times T0 and T1 is a first reset phase as in FIG. 12A, in which both charge storage device 902 and comparator 906 can be put in a reset state by controller 920 by asserting the RST and COMP_RST signals. Moreover, LG signal is asserted, which allows Co and CEXT capacitors to be reset by the RST signal and the PIXEL_OUT signal is set at the reset level. With COMP_RST signal asserted and the positive terminal of comparator 1102 connected to $V_{ref\_high}$, COMP_IN can be set to a sum of $V_{ref\_high}$ and comparator offset $V_{comp\_offset}$. Moreover, with RST signal asserted, PIXEL_OUT can be set the reset voltage $V_{pixel\_out\_rst}$ and can include reset noise $V\sigma_{KTC}$. A first sampling operation can be performed by the CC capacitor to store a $V_{CC}$ voltage including the components of the comparator offset, the reset noise, and PIXEL_OUT voltage at the reset level, as described in Equation 1 above:

$$V_{cc}(T1) = (V_{ref\_high} + V_{comp\_offset}) - (V_{pixel\_out\_rst} + V\sigma_{KTC}) \quad \text{(Equation 1)}$$

Moreover, AB signal can be asserted to prevent charge generated by photodiode PD from reaching charge storage device 902.

At time T1, the AB, COMP_RST, and the RST signals are released, which starts the exposure period in which photodiode PD can accumulate and transfer charge. TG signal can set transfer transistor M1 in a partially turned-on state to allow PD to transfer overflow charge to charge storage device 902. LG signal can remain asserted to operate in low gain mode, in which both Co capacitor and CEXT capacitor are connected in parallel to form charge storage device 902 to store the overflow charge. The overflow charge develops a new PIXEL_OUT voltage, $V_{pixel\_out\_sig1}$. The CC capacitor can AC couple the PIXEL_OUT voltage to become the COMP_IN voltage. The COMP_IN voltage between times T1 and T2 can be set based on Equation 1 above.

Between times T1 and T2, TTS measurement can be performed by comparator 906 comparing COMP_IN voltage with a static $V_{ref\_low}$ to generate VOUT. At time T2, controller 920 can perform a check 1212 of the state of comparator 906. If the output of comparator 906 trips, controller 920 can store the state in a register of output logic circuits 908 indicating that the overflow charge in charge storage device 902 exceeds threshold 1004 as in FIG. 12A.

Following the TTS measurement, between times T2 and T5, the PD ADC operation can be performed to measure the residual charge stored in photodiode PD. The LG signal is de-asserted to disconnect CEXT from CFD to increase charge-to-voltage conversion ratio, as described above. The overflow charge (if any) is divided between CFD and CEXT based on a ratio of capacitances between CFD and CEXT such that CFD stores a first portion of the overflow charge and CEXT stores a second portion of the overflow charge. $V_{pixel\_out\_sig1}$ can correspond to the first portion of the overflow charge stored in CFD.

To prepare for the PD ADC operation, between times T2 and T3, COMP_RST signal is asserted again to reset comparator 1102. The resetting of comparator 1102 can set a new $V_{CC}$ voltage across the CC capacitor based on a difference between $V_{pixel\_out\_sig1}$ and the output of comparator 1102 in the reset state, as follows:

$$V_{cc}(T2) = (V_{ref\_high} + V_{comp\_offset}) - (V_{pixel\_out\_sig1}(T3) + V\sigma_{KTC}) \quad \text{(Equation 4)}$$

Optionally, the RST signal can be asserted between times T2 and T3 to reset CFD and to remove the first portion of the overflow charge, prior to the transfer of the residual charge. This allows the subsequent PD ADC operation to quantize only the residual charge rather than a mixture of the residual charge and the first portion of the overflow charge. Such arrangements can improve the accuracy of measurement of low light intensity as there is no need to remove the overflow charge component (based on the result of the subsequent FD ADC operation) from the PD ADC operation output which could otherwise introduce additional errors. On the other hand, not asserting the RST signal between times T2 and T3 can be advantageous, as such arrangements can introduce redundancy in the PD ADC and FD ADC operations and increase the signal-to-noise ratio, as both operations measure a mixture of residual and overflow charge.

Between times T3 and T4, COMP_RST signal is released so that comparator 1102 exits the reset state. Moreover, the TG signal can set transfer transistor M1 in a fully turned-on state to transfer the residual charge to CFD. The residual charge can be transferred to CFD, which changes the PIXEL_OUT voltage to $V_{pixel\_out\_sig2}$ The new PIXEL_OUT voltage can be AC coupled into a new COMP_IN voltage at time T4, as follows:

$$V_{comp\_in}(T4) = V_{pixel\_out\_sig2} - V_{pixel\_out\_sig1} + V_{ref\_high} + V_{comp\_offset} \quad \text{(Equation 5)}$$

In Equation 5, the difference between $V_{pixel\_out\_sig2} - V_{pixel\_out\_sig1}$ represents the quantity of residual charge transferred by the photodiode to charge storage device 902 between times T3 and T4.

After TG is fully turned-on between times T3 and T4, the TG is de-asserted to disconnect photodiode PD from CFD and CEXT. As a result, no additional charge is transferred to CFD and CEXT after time T4 until the start of next exposure period. Compared with the arrangements of FIG. 12A where additional charge can be accumulated in photodiode PD during the FD ADC operation which typically takes a long time, in FIG. 12B the additional charge is accumulated only during the reset period T2-T3 and the transfer period T3-T4, both of which are typically much shorter than a FD ADC operation. Moreover, after T4, no additional overflow charge is accumulated at charge storage device 608a. As a result, both FD ADC and PD ADC can process charge accumulated in almost the same exposure period as the TTS operation, which can improve the shutter efficiency of the image sensor.

Between times T4 and T5, controller 920 can perform the PD ADC operation by comparing the COMP_IN voltage with a VREF ramp that starts from $V_{ref\_high}$ to $V_{ref\_low}$ margin. In PD ADC phase, $V_{ref\_high}$ can represent the minimum detectable quantity of residual charge stored in photodiode PD, whereas $V_{ref\_low\_margin}$ can represent the saturation threshold of photodiode PD with margin to account for dark current, as described above. If photodiode PD does not saturate, COMP_IN can go above the VREF ramp. An inverted VOUT (VOUTb) can become a logical one and cause a count value to be stored in memory 912 for PD ADC. At time T5, the controller can perform a check 1214 of the state of comparator 906 of the state of comparator 906. If the output of comparator 906 trips, and the state flag in output logic circuits 908 is not asserted from the TTS operation, controller 920 can assert the state flag in output logic circuits 908 to indicate that the residual charge exceeds threshold 1002. The assertion of the state flag can also prevent subsequent FD ADC phases from overwriting the count value stored in memory 912. The count value from PD ADC can then be provided to represent the intensity of light received by photodiode PD during the exposure period.

Between times T5 and T8, a FD ADC operation can be made to measure the overflow charge transferred by photodiode PD within the exposure period. As photodiode PD remains disconnected from CFD and CEXT, no additional charge is transferred to CFD and CEXT, and the total charge stored in CFD and CEXT is mostly generated in the exposure period $T_{exposure}$, together with additional charge generated by the photodiode between times T3 and T4.

At time T5, the LG signal is asserted to connect CFD with CEXT, which allows the second portion of the overflow charge stored in CEXT to combine with the residual charge stored in CFD (and the first portion of the overflow charge if RST is not asserted between times T2 and T3), and a new PIXEL_OUT voltage $V_{pixel\_out\_sig3}$ can develop at the parallel combination of CFD and CEXT and is to be quantized.

Between times T5 and T7, a noise sampling operation can be performed to mitigate the effect of reset noise and comparator offset on the FD ADC operation. Between times T5 and T6, comparator 1102 can be reset as part of the first sampling operation. The positive terminal of comparator 1102 is connected to the lower end of VREF, $V_{ref\_low}$. The $V_{CC}$ voltage can include components of reset noise and comparator offset as described above. The $V_{CC}$ voltage can be as follows:

$$V_{cc}(T5) = (V_{ref\_low} + V_{comp\_offset}) - (V_{pixel\_out\_sig3} + V\sigma_{KTC1}) \quad \text{(Equation 6)}$$

Between times T6 and T7, both CFD and CEXT can be reset, while comparator 1102 exits the reset state, as part of a second sampling operation. As a result of resetting, PIXEL_OUT can be reset to a reset voltage $V_{pixel\_out\_rst}$. Moreover, second reset noise charge is also introduced into charge storage device 608, which can be represented by $V\sigma_{KTC2}$. The second reset noise charge typically tracks the first reset noise charge. At time T6, as the result of the second sampling operation, $V_{pixel\_out}$ can be as follows:

$$V_{pixel\_out}(T6) = V_{pixel\_out\_rst} + V\sigma_{KTC2} \quad \text{(Equation 7)}$$

At time T7, COMP_RST is released, and comparator 1102 exits the reset state. Via AC-coupling, the COMP_IN voltage can track $V_{pixel\_out}(T6)$ in addition to $V_{cc}(T5)$ as follows:

$$V_{comp\_in}(T7) = (V_{ref\_low} + V_{comp\_offset}) + (V_{pixel\_out\_rst} - V_{pixel\_out\_sig3}) + (V\sigma_{KTC2} - V\sigma_{KTC1}) \quad \text{(Equation 8)}$$

Following the second sampling operation, the COMP_IN voltage can be quantized by comparing against a VREF ramp between times T7 and T8. When VREF goes above COMP_IN, VOUT can become a logical one. If the state flag in output logic circuits 908 remains not asserted at this point, the count value of counter 914 when comparator 906 trips can be stored into memory 912, and the count value from FD ADC can be provided to represent the intensity of light. After time T8, the digital value stored in memory 912 can be read out to represent the intensity of light received by photodiode PD within the integration, at time T9. In a case where one image frame is generated in a single frame period, the frame period can span from time T0 to T8.

Although FIG. 12A and FIG. 12B show TTS, FD ADC and PD ADC operations are performed, it is understood that ADC 616 (and pixel cell 602a) needs not perform all of these operations, and can skip some of them. As to be described below, the quantization operations may vary for different photodiodes within pixel cell 602a.

The multi-stage quantization operations described in FIG. 12A and FIG. 12B, which involve the charge sensing unit 614, ADC 616, and memory 912, can substantially extend the dynamic range of a pixel cell and improve the pixel cell's performance in measuring high light intensity and low light intensity. However, in a case where a pixel cell includes multiple photodiode, as shown in FIG. 8A-FIG. 8C, providing a charge sensing unit 614, an ADC 616, and a memory 912 for each photodiode of a pixel cell to support the multi-stage quantization operations for the each photodiode can be challenging due to size and power. Specifically, buffer 904 and CEXT capacitor of charge sensing unit 614, as well as comparator 906, typically have very large footprint and can dominate the size of the pixel cell. In addition, circuit components such comparator 906, buffer 904, and memory 912 also consume a lot of power. If a charge sensing unit 614, an ADC 616, and a memory 912 is provided for each photodiode of a pixel cell, both the footprint and the power consumption of the pixel cell can be substantially increased, which may render the pixel cells unsuitable for applications where space and power are at a premium, such as applications at mobile devices and wearable devices.

Figure 13A:
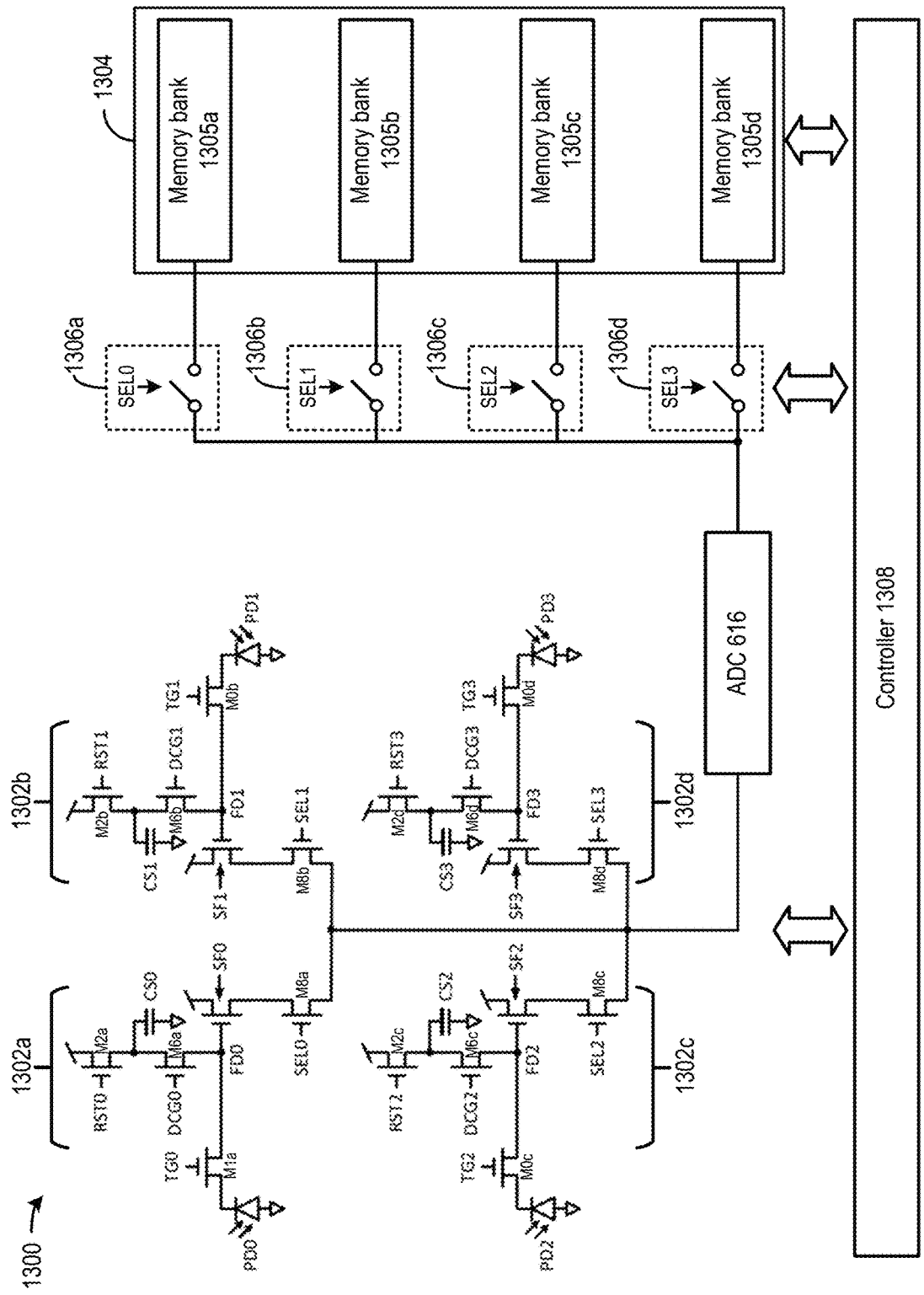
FIGS. 13A, 13B, 13C, and 13D illustrate examples of an imaging system and their operations.

Reference is now made to FIG. 13A-FIG. 13D, which illustrate example techniques to reduce the footprint of a sensor layer (e.g., substrates 840-846 of FIG. 8A, substrate 840 of FIG. 8B) of a multi-photodiode pixel cell. FIG. 13A illustrates an example of circuit components of an image sensor 1300 having a plurality of photodiodes including PD0, PD1, PD2, and PD3. In some examples, image sensor 1300 can be a pixel cell and include photodiodes PD0-PD3, such as pixel cell 602a of FIG. 6. For example, photodiodes PD0, PD1, PD2, PD3 can correspond to, photodiodes 612a, 612b, 612c, and 612d. In some examples, PD0, PD1, PD2, and PD3 can be configured to sense different components of visible light, such as R, Gr, Gb, and B channels. In some examples, the photodiodes can be part of different pixel cells.

Each of photodiodes PD0, PD1, PD2, and PD3 can be coupled with a charge sensing unit 1302 to convert the charge generated by the photodiode to a voltage. Charge sensing unit 1302 can be part of a pixel cell or shared between pixel cells. Specifically, PD0 is selectively coupled with a charge sensing unit 1302a via charge transfer transistor M1a when TG0 signal is asserted. Charge sensing unit 1302a includes a configurable charge storage device having a floating diffusion FD0 and an auxiliary capacitor CS0, and a switchable buffer having a source follower SF0. Floating diffusion FD0 and auxiliary capacitor CS0 can be connected in parallel by transistor M6a to increase the total capacitance when DCG0 signal is asserted. Charge sensing unit 1302a further includes a transistor M2a which can reset floating diffusion FD0 and auxiliary capacitor CS0 when RST0 signal is asserted. Transistor M2a can also reset photodiode PD0 and start the exposure period for photodiode PD0 via transistors M6a and M1a when both TG0 and DCG0 signals are asserted, while the de-assertion of TG0 can end the exposure period. Moreover, source follower SF0 can be enabled by transistor M8a when SEL0 signal is asserted.

Likewise, PD1 is selectively coupled with a charge sensing unit 1302b via charge transfer transistor M1b when TG1 signal is asserted. Charge sensing unit 1302b includes a configurable charge storage device having a floating diffusion FD1 and an auxiliary capacitor CS1, and a switchable buffer having a source follower SF1. Floating diffusion FD1 and auxiliary capacitor CS1 can be connected in parallel by transistor M6b to increase the total capacitance when DCG1 signal is asserted. Charge sensing unit 1302b further includes a transistor M2b which can reset floating diffusion FD1 and auxiliary capacitor CS1 when RST1 signal is asserted. Transistor M2b can also reset photodiode PD1 and start the exposure period for photodiode PD1 via transistors M6b and M1b when both TG1 and DCG1 signals are asserted, while the de-assertion of TG1 can end the exposure period. Moreover, source follower SF1 can be enabled by transistor M8b when SEL1 signal is asserted.

In addition, PD2 is selectively coupled with a charge sensing unit 1302c via charge transfer transistor M1c when TG2 signal is asserted. Charge sensing unit 1302c includes a configurable charge storage device having a floating diffusion FD2 and an auxiliary capacitor CS2, and a switchable buffer having a source follower SF2. Floating diffusion FD2 and auxiliary capacitor CS2 can be connected in parallel by transistor M6b to increase the total capacitance when DCG2 signal is asserted. Charge sensing unit 1302c further includes a transistor M2c which can reset floating diffusion FD2 and auxiliary capacitor CS2 when RST2 signal is asserted. Transistor M2c can also reset photodiode PD2 and start the exposure period for photodiode PD2 via transistors M6c and M0c when both TG2 and DCG2 signals are asserted, while the de-assertion of TG2 can end the exposure period. Moreover, source follower SF2 can be enabled by transistor M8c when SEL2 signal is asserted.

Further, PD3 is selectively coupled with a charge sensing unit 1302d via charge transfer transistor M1d when TG3 signal is asserted. Charge sensing unit 1302d includes a configurable charge storage device having a floating diffusion FD3 and an auxiliary capacitor CS3, and a switchable buffer having a source follower SF3. Floating diffusion FD3 and auxiliary capacitor CS3 can be connected in parallel by transistor M6d to increase the total capacitance when DCG3 signal is asserted. Charge sensing unit 1302a further includes a transistor M2d which can reset floating diffusion FD0 and auxiliary capacitor CS3 when RST3 signal is asserted. Transistor M2d can also reset photodiode PD3 and start the exposure period for photodiode PD3 via transistors M6d and M1d when both TG3 and DCG3 signals are asserted, while the de-assertion of TG3 can end the exposure period. Moreover, source follower SF3 can be enabled by transistor M8d when SEL3 signal is asserted.

Image sensor 1300 further includes ADC 616 as well as an in-pixel memory 1304. ADC 616 is shared among charge sensing units 1302a-1302d and is selectively coupled with one of source followers SF0, SF1, SF2, and SF3 when the corresponding SEL signal (SEL0, SEL1, SEL2, and SEL3) is asserted. The sharing of ADC 616 among charge sensing units 1302a-1302d, as opposed to having one dedicated ADC 616 for each of charge sensing units 1302a-1302d, can reduce the number of ADCs in image sensor 1300, which in turn can reduce the power and footprint of the pixel cell.

In addition, in-pixel memory 1304 can include memory banks 1305a, 1305b, 1305c, and 1305d, with each memory bank comprising multiple bits and configured to store a digital output (e.g., a pixel value) generated by ADC 616 for a photodiode. For example, memory bank 1305a can store the digital output from quantizing the charge generated by photodiode PD1, memory bank 1305b can store the digital output from quantizing the charge generated by photodiode PD2, memory bank 1305c can store the digital output from quantizing the charge generated by photodiode PD3, whereas memory bank 1304d can store the digital output from quantizing the charge generated by photodiode PD3. ADC 616 is coupled with each of memory banks 1305a, 1305b, 1305c, and 1304d via, respectively, switches 1306a, 1306b, 1306c, and 1306d. Switches 1306a-1306d can be controlled by SEL signals (SEL0, SEL1, SEL2, and SEL3) so that the assertion of a SEL signal can connect one of charge sensing units 1302a-1302d and photodiodes PD0-PD3 to ADC 616 to perform quantization operation, and the resulting digital output can be stored in the one of the memory banks 1305a-1304d corresponding to the photodiode. The digital outputs can then be forwarded to a host device. The digital outputs can represent the pixel values of an image frame, or can be used by the host device to reconstruct the pixel values of an image frame.

Image sensor 1300 further includes a controller 1308 that control the sequences of control signals TG0-TG3, RST0-RST3, SEL0-SEL3, and DCG0-DCG3 to control a sequence of light measurement operations including charge generation and storage, quantization operations of the stored charge to generate digital outputs, and storage of the digital outputs in memory 1304 for photodiodes PD0-PD3 using shared ADC 616. Controller 1308 can generate the control signals to provide photodiodes PD0-PD3 with sequential accesses to ADC 616 to perform quantization operations to generate a digital output and store the first digital output in memory 1304. The sequential accesses can start with photodiode PD0, followed by photodiodes PD1, PD2, and PD3.

Although the arrangements in FIG. 13A can reduce the power and footprint of pixel cell 1300, memory bank 1304 have significant footprints and can consume lots of power, especially if memory bank 1304 is constructed using high bandwidth transistor devices to improve operation speed, and that memory bank 1304 needs to have sufficient capacity to store a certain number of bits (e.g., 8 bits, 16 bits) for the digital output generated for each photodiode, or for multiple pixel values generated for a single photodiode. Including such a high-capacity memory in the pixel cell can substantially increase both the footprint and the power consumption of the pixel cell, which makes it challenging to include more pixel cells in the pixel cell array to improve the resolution of the imaging operation.

Figure 13B:
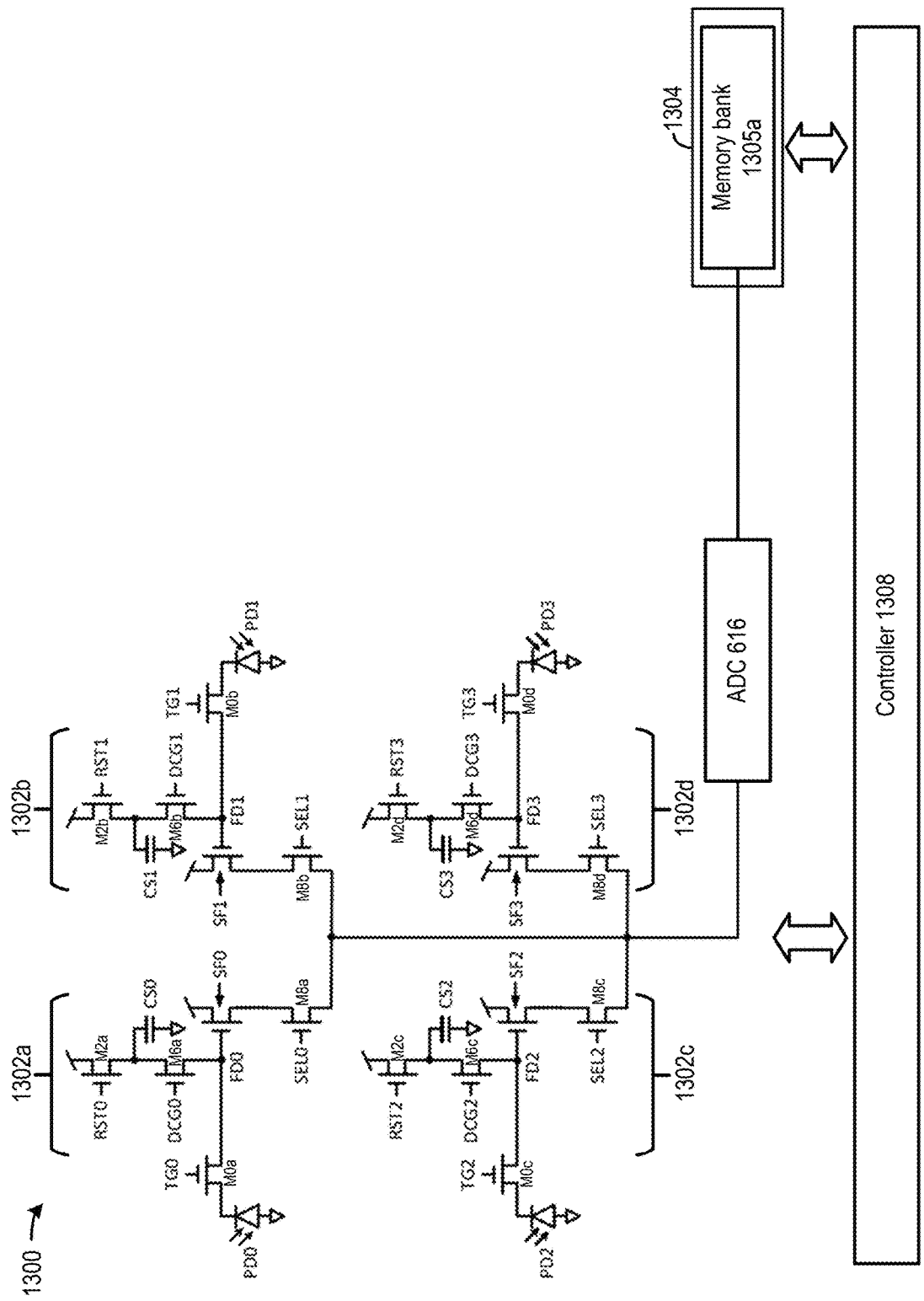

FIG. 13B illustrates another example of pixel cell 1300 having reduced power and footprint. As shown in FIG. 13B, instead of having an in-pixel memory 1304 that has the capacity to store the digital outputs generated for each of photodiodes PD0-PD3, in-pixel memory 1304 may include only a single memory bank 1305a having the capacity to store the pixel value generated by one of photodiodes PD0-PD3. To accommodate for the reduced capacity of memory 1304, controller 1308 can control the light measurement operations of PD0-PD3, as well as the quantization operations, such that the digital output for each of photodiodes PD0-PD3 can be stored at memory bank 1305a at different times. A digital output can be overwritten in memory bank 1305a after the digital output has been forwarded to the host device.

Figure 13C:
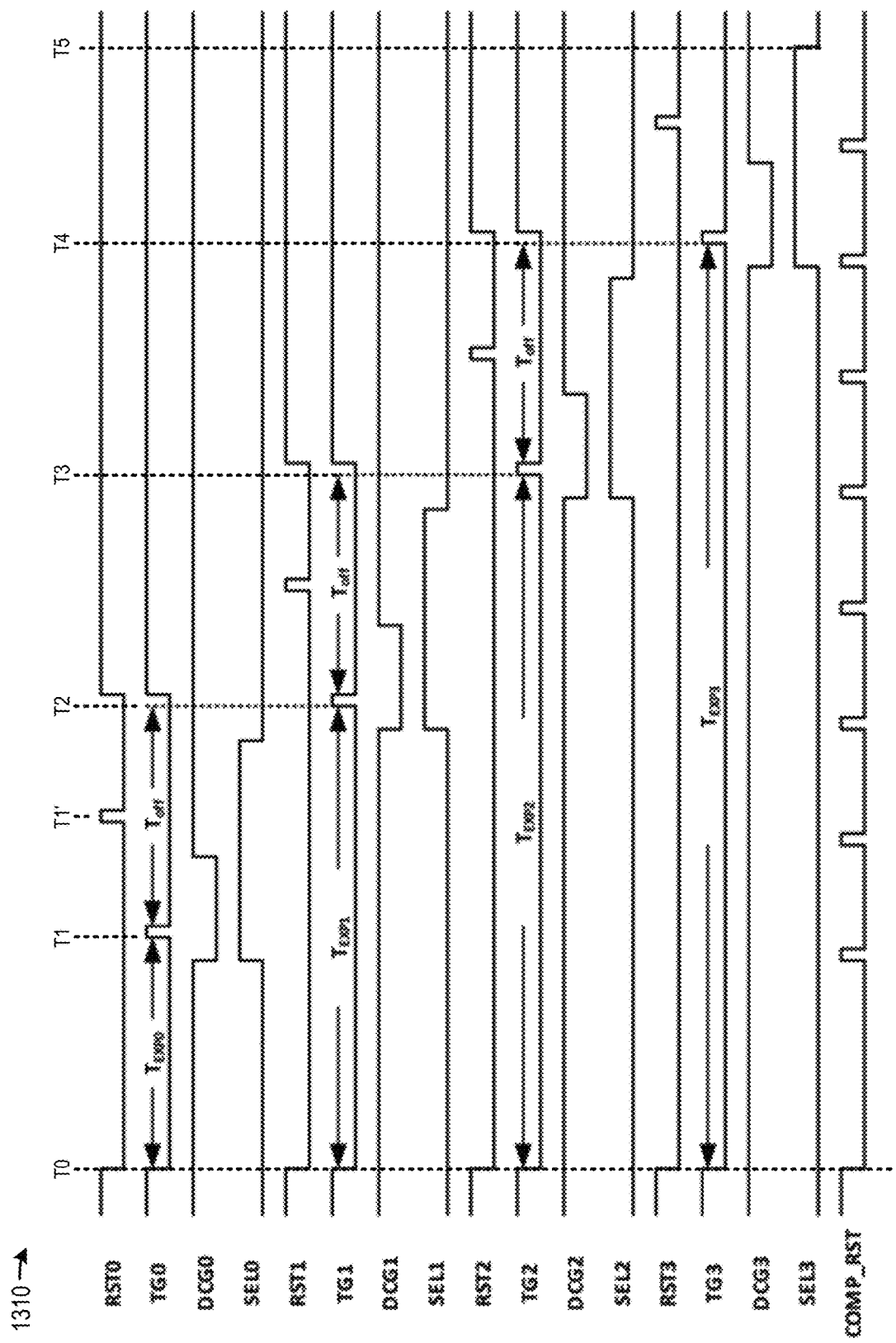

FIG. 13C illustrates a graph 1310 of an example sequence of control signals output by controller 1308 for pixel cell 1300 of FIG. 13B. In the example of FIG. 13C, TTS operation is omitted, and the quantization operations illustrated in FIG. 12B, in which PD ADC precedes FD ADC after the exposure period ends, are performed. But it is understood that the quantization operations illustrated in FIG. 12A, in which FD ADC is performed during the exposure period, as well as the TTS operation, can also be performed.

Referring to FIG. 13C, the exposure periods of photodiodes PD0-PD3, including $T_{EXP0}$ for PD0, $T_{EXP1}$ for PD1, $T_{EXP2}$ for PD2, and $T_{EXP3}$ for PD3, start at the same time T0. During the exposure periods, controller 1308 de-asserts reset signals RST0, RST1, RST2, and RST3 to release the photodiodes from reset. Controller 1308 also control a voltage level of TG0, TG1, TG2, and TG3 to set a saturation level of the photodiodes, to enable the photodiodes to accumulate charge until the saturation level is reached. When a photodiode saturates, the remaining charge can be output to the respective charge sensing unit 1302 as overflow charge. Controller 1308 also asserts DCG0, DCG1, DCG2, and DCG3 signals to maximize the capacitance of the charge storage device in each of the charge sensing units 1302, and to store portions of overflow charge in the floating diffusion node (e.g., FD0, FD1, FD2, and FD3) and in the auxiliary capacitor (e.g., CS0, CS1, CS2, and CS2) in each of the charge sensing units 1302.

Moreover, the signals SEL0, SEL1, SEL2, and SEL3 are also de-asserted during the exposure periods, as no quantization operation is performed during the exposure periods. But in a case where TTS and/or FD ADC are performed during the exposure periods, SEL0 can be asserted during $T_{EXP0}$ to enable TTS operation for PD0 using ADC 616. SEL1, SEL2 and SEL3 can also be asserted sequentially, one at a time, after the TTS operation for PD0 completes, to enable FD ADC operations sequentially for PD1, PD2, and PD3.

Between times T0 and T1, photodiode PD0 can be in the exposure phase within exposure period $T_{EXP0}$, which ends at time T1 where TG0 is asserted and DCG0 is de-asserted by controller 1308. A first portion of the overflow charge from photodiode PD0 (if any) can remain in auxiliary capacitor CS0, whereas a second portion of the overflow charge from PD0 (if any) stored in floating diffusion FD0 can be mixed with the residual charge transferred from photodiode PD0. At time T1 controller 1308 can reset comparator 906 of ADC 616 to store comparator offset information in the CC capacitor, and then start the quantization operations. Between times T1 and T2, controller 1308 can assert SEL0 to connect charge sensing unit 1302a to ADC 616 to perform a PD ADC operation (between times T1 and T1'), followed by asserting RST0 and COMP_RST at time T1' to store reset noise and comparator offset information in the CC capacitor, and a FD ADC operation between times T1' to T2. ADC 616 can then store the output from one of the PD ADC or FD ADC operations in memory bank 1305a as described above in FIG. 13B. The total time taken by the PD ADC and FD ADC operation is labelled as $T_{off}$. Controller 1308 can then de-assert SEL0 to disconnect charge sensing unit 1302a from ADC 616 after the quantization operations complete for photodiode PD0.

Between times T0 and T2, photodiode PD1 remains in the exposure phase within the exposure period $T_{EXP1}$, which ends at time T2 with a processing delay of $T_{off}$ from the end of the exposure period $T_{EXP0}$ (at time T1) for photodiode PD0. As a result, the total duration of exposure period $T_{EXP1}$ can be a sum of $T_{EXP0}$ and $T_{off}$ ($T_{EXP0}+T_{off}$). The processing delay in the end of exposure period $T_{EXP0}$ is to provide time for a sequence of operations. First, the quantization operations for photodiode PD0 is to complete at ADC 616 to generate a first digital output for PD0. Second, the first digital output can be stored at memory bank 1305a. Third, the first digital output can be read out from memory bank 1305a and transferred to the host device, so that the first digital output in memory bank 1305a can be overwritten by the digital output of a subsequent quantization operation (e.g., for photodiode PD1). The processing delay of $T_{off}$ can be represented by the following Equation:

$$T_{off} = T_{quantization} + T_{in\text{-}pixel\ mem\ access} + T_{external\ transfer} \quad \text{(Equation 9)}$$

In Equation 9, $T_{quantization}$ represents the time used to complete the quantization operation (e.g., PD ADC followed by FD ADC) at ADC 616 to generate a digital output, $T_{in\text{-}pixel\ mem\ access}$ represents the time used to store and then read the digital output at memory bank 1035a, whereas $T_{external\ transfer}$ represents the time used to transfer the digital output from memory bank 1035a to the host device.

Extending exposure period $T_{EXP1}$ beyond time T1 can be beneficial in that extra charge generated from the photon can be stored in the floating diffusion FD1 between times T1 and T2, prior to being quantized by ADC 616, to mitigate the effect of dark charge accumulated between times T1 and T2.

Referring back to FIG. 13C, following time T2, controller 1308 can assert SEL1 signal to connect charge sensing unit 1302b to ADC 616, to perform PD ADC operation followed by FD ADC operation based on a sequence of RST1, TG1, and DCG1 signals, and store the digital output in memory bank 1305a to overwrite the digital output generated for photodiode PD0. The quantization operations for photodiode PD1 ends at time T3 and span a duration of $T_{off}$. Controller 1308 can then de-assert SEL1 to disconnect charge sensing unit 1302b from ADC 616 after the quantization operations complete for photodiode PD1.

Moreover, between times T0 and T3, photodiode PD2 remains in the exposure phase within the exposure period $T_{EXP2}$, which ends at time T3 with a delay of $T_{off}$ from the end of the exposure period $T_{EXP1}$ (at time T2) for photodiode PD1. As a result, the total duration of exposure period $T_{EXP1}$ can be a sum of $T_{EXP1}$ and $T_{off}$ ($T_{EXP1}+T_{off}$). Following time T3, controller 1308 can assert SEL2 signal to connect charge sensing unit 1302c to ADC 616, to perform PD ADC operation followed by FD ADC operation based on a sequence of RST2, TG2, and DCG2 signals, and store the digital output in memory bank 1305a to overwrite the digital output generated for photodiode PD2. The quantization operations for photodiode PD2 ends at time T4 and spans a duration of $T_{off}$. Controller 1308 can then de-assert SEL2 to disconnect charge sensing unit 1302c from ADC 616 after the quantization operations complete for photodiode PD2.

In addition, between times T0 and T4, photodiode PD3 remains in the exposure phase within the exposure period $T_{EXP3}$, which ends at time T4 with a delay of $T_{off}$ from the end of the exposure period $T_{EXP2}$ (at time T3) for photodiode PD2. As a result, the total duration of exposure period $T_{EXP3}$ can be a sum of $T_{EXP2}$ and $T_{off}$ ($T_{EXP2}+T_{off}$). Following time T4, controller 1308 can assert SEL3 signal to connect charge sensing unit 1302d to ADC 616, to perform a PD ADC operation followed by a FD ADC operation based on a sequence of RST3, TG3, and DCG3 signals, and stores the digital output in memory bank 1305a to overwrite the digital output generated for photodiode PD2. The quantization operations for photodiode PD3 ends at time T5. Controller 1308 can then de-assert SEL3 to disconnect charge sensing unit 1302d from ADC 616 after the quantization operations complete for photodiode PD3. The digital outputs generated for photodiode PD3 can then be transferred to the host device. The digital outputs generated for photodiodes PD0-PD3 can be used to generate an image frame (e.g., in a demosaicing operation), or to generate separate image frames (e.g., for 2D and 3D sensing).

The arrangements of FIG. 13C, in which the exposure period of a photodiode is delayed to accommodate for an earlier quantization operation of a preceding photodiode in the sequential accesses, results in the exposure periods $T_{EXP0}$-$T_{EXP3}$ having different durations. In the example of FIG. 13C, the maximum duration difference between two exposure periods can be up to $3T_{off}$. The duration difference between the exposure periods can degrade the global shutter operation of the photodiodes within the pixel cell. Specifically, the duration difference between the exposure periods can introduce an offset among the digital outputs since each photodiode is provided with different durations of time to be exposed to light and to generate charge. As a result, the total charge generated by each photodiode can be different even if the first component and the second component of the incident light have the same intensity.

The duration difference between the exposure periods, and the resulting degradation of the global shutter operation, can be further exacerbated due to long processing delay $T_{off}$. The long processing delay $T_{off}$ can also increase the required frame period duration, since it takes a longer time to generate all the digital outputs/pixel values for a frame, and the capturing of a new frame may need to wait start until the digital outputs for the current frame are generated. As a result, the achievable frame rate of the image sensor can be reduced, which can degrade the performance of the image sensor especially in capturing images of high-speed objects.

Referring back to Equation 9, one main contributor to the processing delay $T_{off}$ is $T_{external}$ transfer, which represents the time used to transfer the digital output from memory bank 1035a to the host device. The transfer of the digital output from memory bank 1035a to the host device is typically via a physical bus, which can incur huge transmission delay. Moreover, each pixel cell may need to take turn in accessing the physical bus, which further adds to the transfer delay.

Figure 13D:
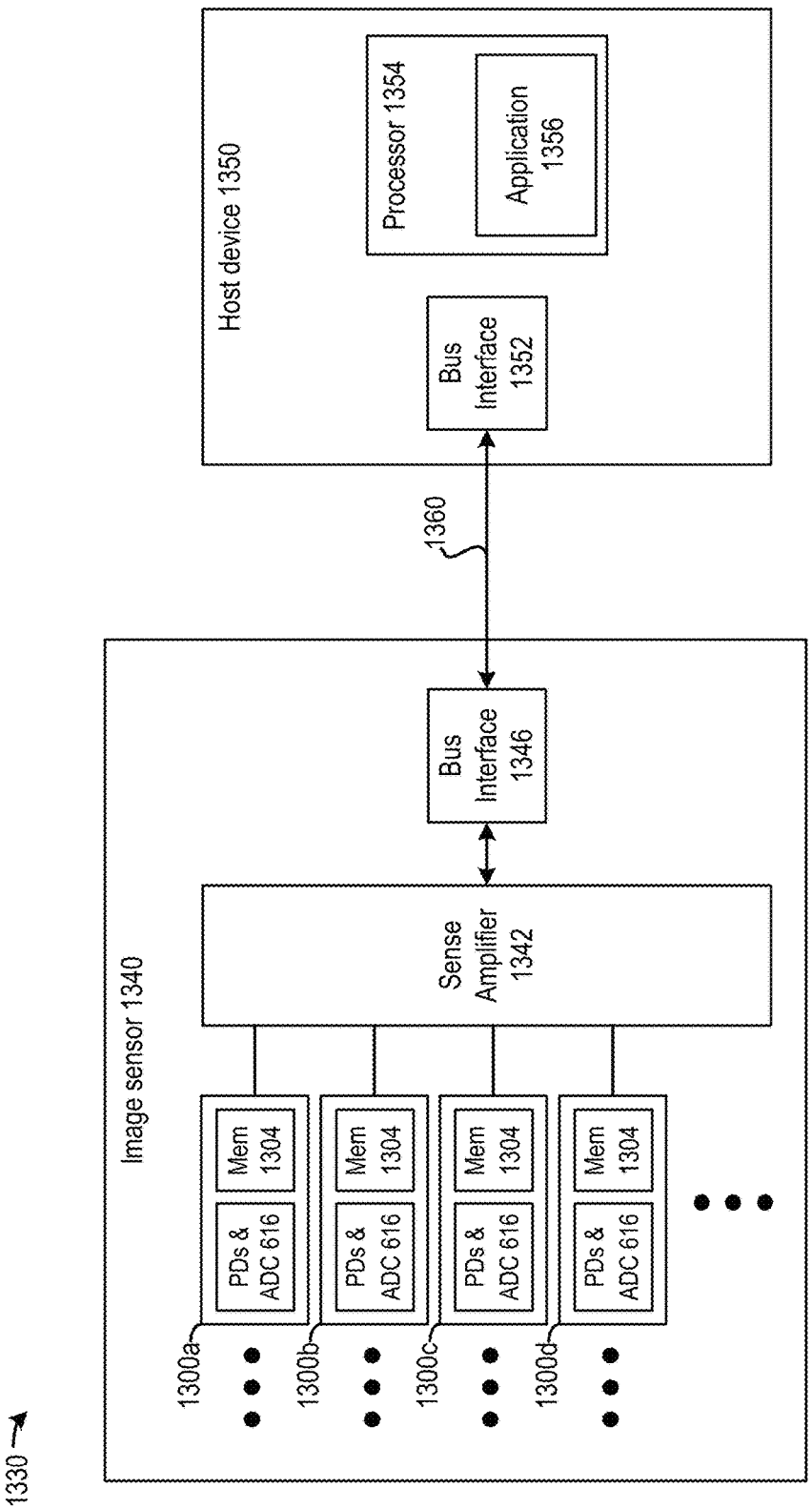

FIG. 13D illustrates an example of an imaging system 1330 including an image sensor 1340, which includes an array of pixel cells 1300 of FIG. 13B, a sense amplifier 1342, and a bus interface 1346. Moreover, imaging system 1330 further includes a host device 1350, which includes a bus interface 1352 and a processor 1354 that hosts an application 1356. Application 1356 can be a VR/AR/MR application that consumes frames of pixel data output by array of pixel cells 1300. Image sensor 1340 (through bus interface 1346) and host device 1350 (through bus interface 1352) can be connected via a physical bus 1360. In some examples, physical bus 1360 can be a serial bus based on the Mobile Industry Processor Interface (MIPI) specification.

After ADC 616 has generated a digital output for PD0 of each of pixel cells 1300 and store the digital output in in-pixel memory 1304, each pixel cell can send the digital output stored in in-pixel memory 1304 to sense amplifier 1342, which can include an array of amplifiers to amplify the signals representing the digital outputs, and send the amplified signals to bus interface 1346. Bus interface 1346 can transmit the amplified signals as serial signals to host device 1350 over physical bus 1360. In the example of FIG. 13D, one row/column of pixel cells 1300 (e.g., pixel cells 1300a-d) can access sense amplifier 1342 at a time to transmit the digital outputs, followed by another row/column of pixel cells 1300. For each row/column of pixel cells, sense amplifier 1342 also controls bus interface 1346 to transmit serial signals of digital outputs for one pixel cell at a time. After all of pixel cells 1300 have transmitted the stored digital output, each pixel cell can then proceed with a subsequent quantization operation to generate and store a new digital output into in-pixel memory 1304, as described in FIG. 13C. Meanwhile, processor 1354 (and application 1356) can process the pixel data received from pixel cells 1300.

The arrangements in FIG. 13D, while allowing each pixel cell to operate with a reduced-capacity in-pixel memory, can incur substantial amount of time $T_{external}$ transfer in the transfer of the pixel data, which in turn increases the processing delay $T_{off}$. Specifically, due to limited bandwidth of physical bus 1360, as well as the serial nature of the transmission, it takes a considerable amount of time to transmit a digital output for each pixel cell over physical bus

1360. As a result of the increased processing delay $T_{off}$, there can be an increased mismatch between exposure periods for different photodiodes which degrades the global shutter operation, while the achievable frame rate is also limited.

Figure 14A:
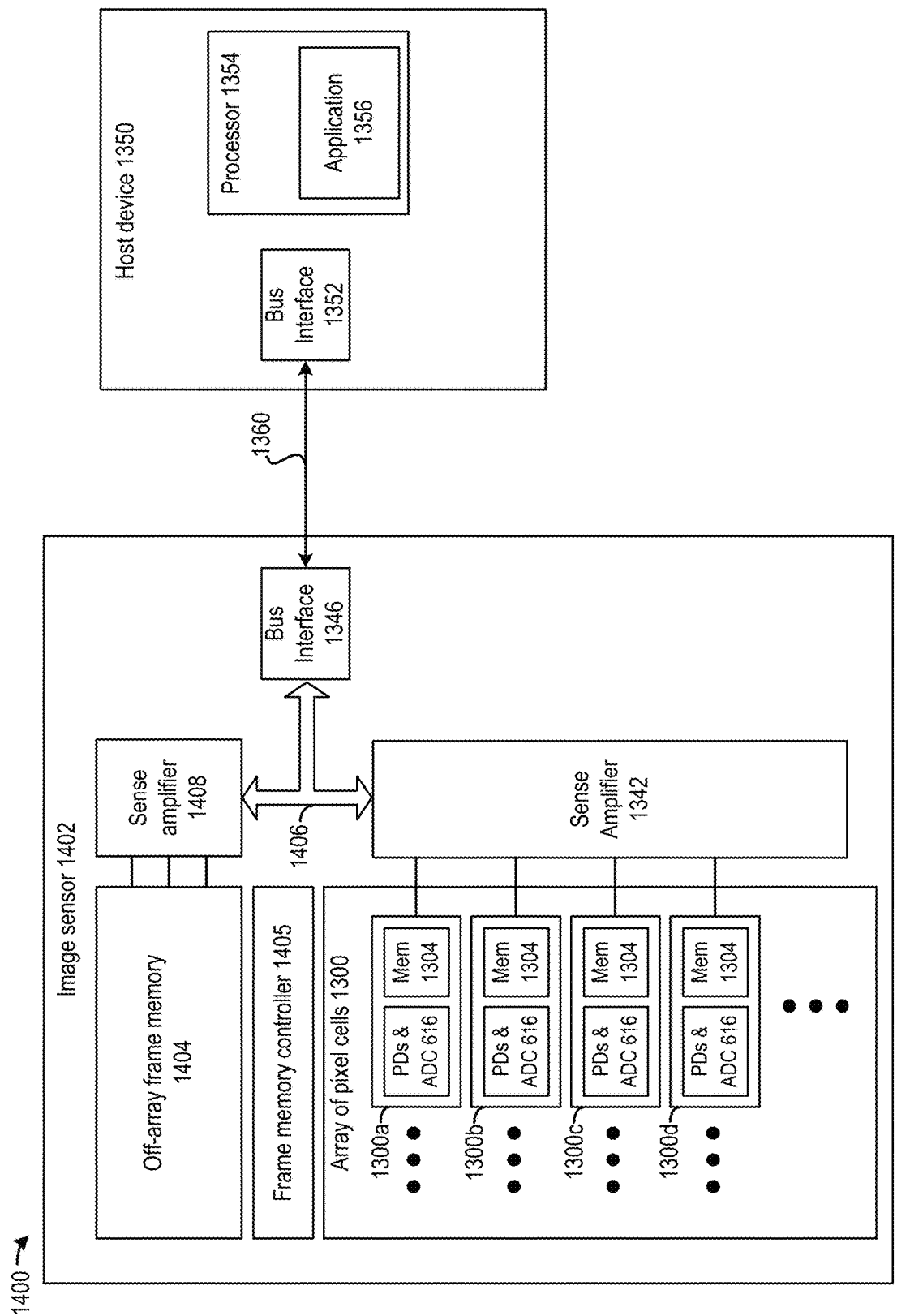
FIG. 14A and FIG. 14B illustrate examples of an imaging system having an off-array frame memory and their operations.

FIG. 14A illustrates an example of an imaging system 1400 that can address at least some of the issues described above. As shown in FIG. 14A, imaging system 1400 includes an image sensor 1402 and host device 1350 of FIG. 13D connected via physical bus 1360. Image sensor 1402 includes an array of pixel cells 1300 of FIG. 13B each having one or more photodiodes (e.g., PD0-3 of FIG. 13B), ADC 616, and an in-pixel memory 1304 having the capacity to store one digital output for one photodiode. Image sensor 1402 may further include sense amplifier 1342 and bus interface 1346 to provide connection between physical bus 1360 and array of pixel cells 1300.

In addition, image sensor 1402 further includes an off-array frame memory 1404 that is external to array of pixel cells 1300 but is housed within the same chip package as array of pixel cells 1300. Off-array frame memory 1404 can include various types of memory devices including, for example, SRAM, magneto-resistive random-access memory (MRAM), etc. Off-array frame memory 1404 have the capacity to store at least some of the pixel values generated by array of pixel cells 1300 for a frame. Off-array frame memory 1404 can be controlled by a frame memory controller 1405. Off-array frame memory 1404 can be connected to array of pixel cells 1300 via a set of parallel interconnects 1406. After the in-pixel memory of a pixel cell (e.g., pixel cell 1300a) stores a pixel value/digital output at in-pixel memory 1304 for a photodiode (e.g., PD0), the pixel cell can transfer the pixel value from in-pixel memory 1304 to off-array frame memory 1404 for storage via parallel interconnects 1406. After transferring the pixel value to off-array frame memory 1404, the pixel cell can overwrite the stored pixel value with a new pixel value from ADC 616 generated for the same photodiode, or for another photodiode (e.g., PD1).

Off-array frame memory 1404 is further connected to a sense amplifier 1408, through which off-array frame memory 1404 can transmit the pixel values over physical bus 1360 to host device 1350 as part of read out operations of the pixel values by host device 1350. The transmission of the pixel values from off-array frame memory 1404 can begin before or after off-array frame memory 1404 receives and stores all the pixel values of a frame. As shown in FIG. 14A, both sense amplifier 1408 of off-array frame memory 1404 and sense amplifier 1342 of array of pixel cells 1300 can have access to bus interface 1346, which allows host device 1350 to perform read out operations of the pixel values stored in off-array frame memory 1404, in-pixel memory 1304 of the array of pixel cells 1300, or both, to support application 1356.

Figure 14B:
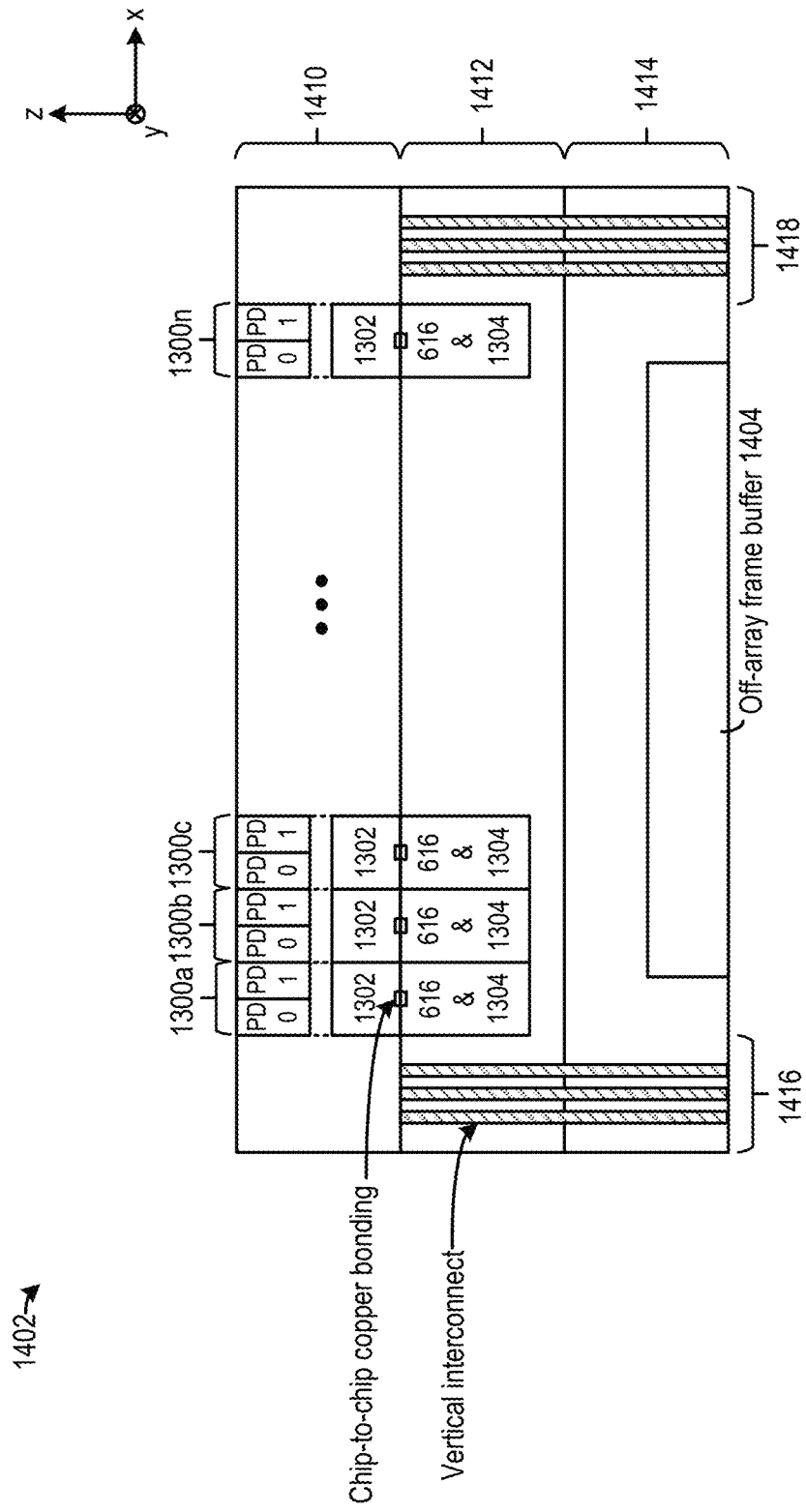

FIG. 14B illustrates an example physical arrangements of array of pixel cells 1300 and off-array frame memory 1404 in image sensor 1402. As shown in FIG. 14B, image sensor 1402 can be formed on multiple semiconductor substrates, including semiconductor substrates 1410, 1412, and 1414 forming a vertical stack (e.g., along a Z-axis). Specifically, the photodiodes (e.g., PD0-PD3) and charge sensing units 1302 of array of pixel cells 1300 (e.g., pixel cell 1300a, 1300b, 1300c, 1300n, etc.) can be formed on semiconductor substrate 1410. Moreover, ADC 616 and in-pixel memory 1304 can be formed on semiconductor substrate 1412. Pixel-level interconnect, such as copper-copper bonding, can be formed between charge sensing units 1302 and ADC 616 of each pixel cell 1300.

In addition, off-array frame memory 1404, which can include SRAM and/or MRAM devices, can be formed on semiconductor substrate 1414. Image sensor 1402 further includes a set of parallel vertical interconnects 1416 and 1418 to connect between in-pixel memory 1304 (in semiconductor substrate 1412) and off-array frame memory 1404 (in semiconductor substrate 1414). Vertical interconnects 1416 and 1418 may include, for example, through silicon vias (TSVs), micro-TSVs, Copper-Copper bump, etc. Compared with physical bus 1360 on which pixel data are transferred serially over a long distance, vertical interconnects 1416 and 1418 provide high bandwidth, short, and parallel connections to transfer the pixel data at a much higher rate. Such arrangements allow off-array frame memory 1404 to be operated as an extension of in-pixel memory 1304 of the pixel cells. Moreover, as the data transfer time $T_{external}$ transfer between in-pixel memory 1304 and off-array frame memory 1404 is reduced, the mismatches between exposure periods of different photodiodes, as well as frame period, can be reduced as well.

FIG. 15A-FIG. 15E illustrate examples of an image sensor 1500. Image sensor 1500 can include a multi-photodiode pixel cell 1502, which can be part of an array of pixel cells. Pixel cell 1502 can include photodiodes PD0-PD3 which share a single charge sensing unit 1302. Charge sensing unit 1302 can include an expandable charge storage unit including floating diffusion FD and auxiliary capacitor Cs, as well as a source follower (labelled "SF" in FIG. 15A). The charge storage unit can be expanded by asserting the DCG signal to connect floating diffusion FD and auxiliary capacitor Cs for FD ADC, and can be shrunk by de-asserting the DCG signal to disconnect floating diffusion FD from auxiliary capacitor CS for PD ADC. Each photodiode is coupled with a charge draining transistor (e.g., one of M0a, M0b, M0c, or M0d) and a charge transfer transistor (e.g., one of M1a, M1b, M1c, or M1d), both of which can perform similar functions as charge draining transistor M0 and charge transfer transistor M1 of pixel cell 602a of FIG. 9.

Figure 15A:
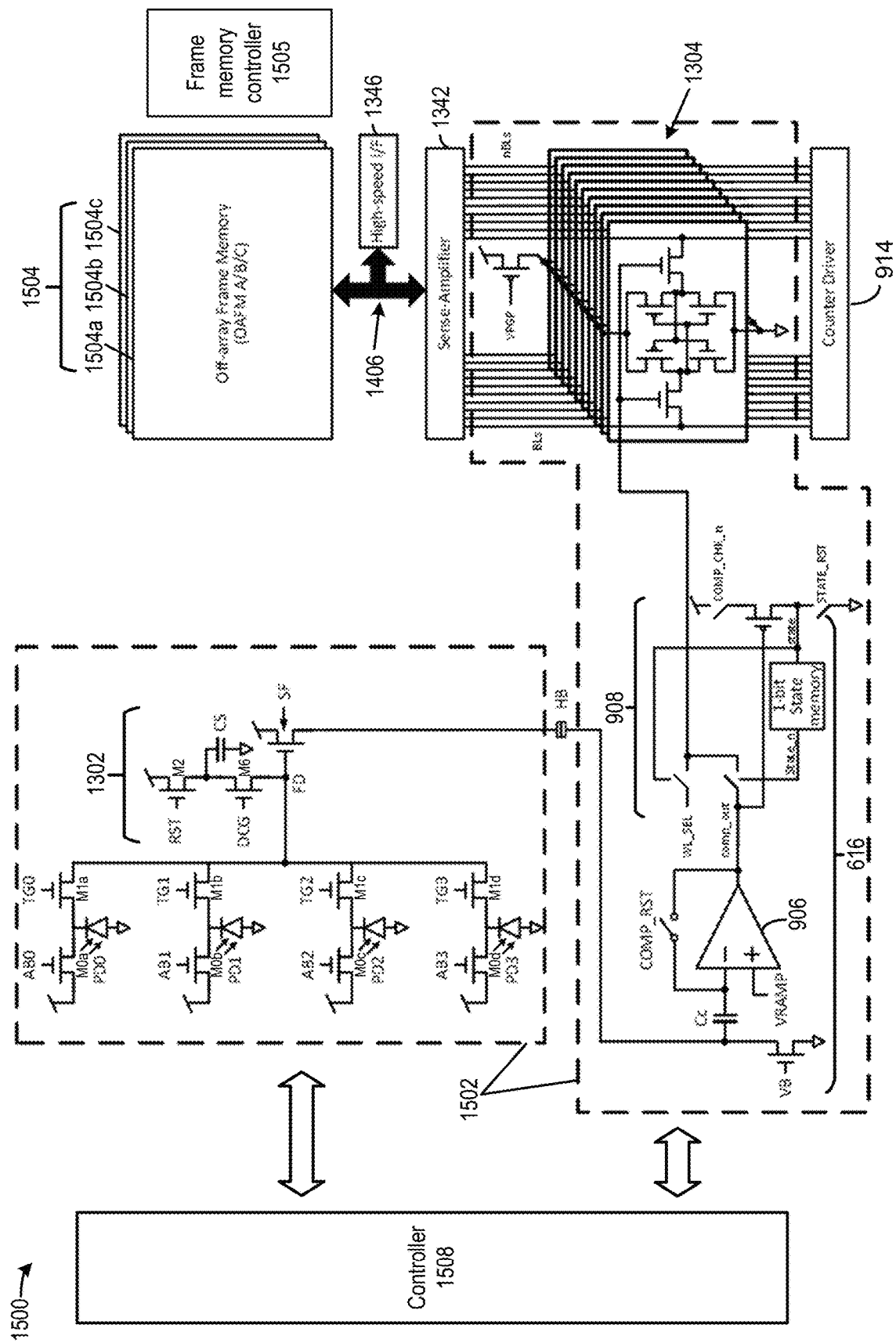
FIG. 15A, FIG. 15B, FIG. 15C, FIG. 15D, and FIG. 15E illustrate additional examples of an imaging system having an off-array frame memory and their operations.

Pixel cell 1502 further includes ADC 616, which includes comparator 906 and output logic circuits 908, and in-pixel memory 1304. In-pixel memory 1304 can include a bank of SRAM cells to store a pixel value/digital output for one of photodiodes PD0-PD3 at a time. The pixel value can be supplied as a counter value from counter 914 of FIG. 9, which can be external or internal to pixel cell 1502. ADC 616 can control which counter value to store into in-pixel memory 1304 as described above in FIG. 9-FIG. 12B. In the example of FIG. 15A, in-pixel memory 1304 can include eight SRAM cells to store an 8-bit pixel value. Pixel cell 1502 further includes a controller 1508 that can generate a sequence of control signals for charge draining transistors M0a-M0d, charge transfer transistors M1a-M1d, charge sensing unit 1302, ADC 616, and in-pixel memory 1304 to control their operations, similar to controller 1308 of FIG. 13A. As to be shown below, controller 1508 can start the exposure periods of the photodiodes PD0-PD3 at the same time or at different times. Controller 1508 can end the exposure period and start the quantization operation for photodiode PD0, followed by photodiodes PD1, PD2, and PD3.

In addition, image sensor 1500 further includes an off-array frame memory 1504 that is external to pixel cell 1502 but is housed within the same chip package as an array of pixel cells 1502. Off-array frame memory 1504 can be connected to pixel cell 1502 via high speed parallel interconnects 1406. Image sensor 1500 further includes a frame memory controller 1505 to control the operations of off-array frame memory 1504. As described above, each in-pixel memory 1304 only stores one pixel value from a quantization at a time. After storing the pixel value in in-pixel memory 1304, controller 1508 can quickly transfer the pixel value from in-pixel memory to off-array frame memory 1504, and then start a new quantization operation (or another light measurement operation) to overwrite the pixel value stored in in-pixel memory 1304. In the example of FIG. 15A, off-array frame memory 1504 can include a frame memory portion 1504a ("OFAM A"), a frame memory portion 1504b ("OFAM B"), and a frame memory portion 1504c ("OFAM C"). Each frame memory portion can accept pixel values generated for a particular photodiode from in-pixel memory 1304 of each pixel cell of the array of pixel cells (including pixel cell 1502). For example, frame memory portion 1504a can store the pixel values generated for photodiode PD0 of the array of pixel cells, frame memory portion 1504b can store the pixel values generated for photodiode PD1 of the array of pixel cells, whereas frame memory portion 1504c can store the pixel values generated for photodiode PD2 of the array of pixel cells, while in-pixel memory 1304 can store the pixel values generated for photodiode PD3. A host device (e.g., host device 1350) can perform read out of the pixel values generated from photodiodes PD0-PD3 from both off-array frame memory 1504 and in-pixel memory 1304 of the array of pixel cells including pixel cell 1502.

Figure 15B:
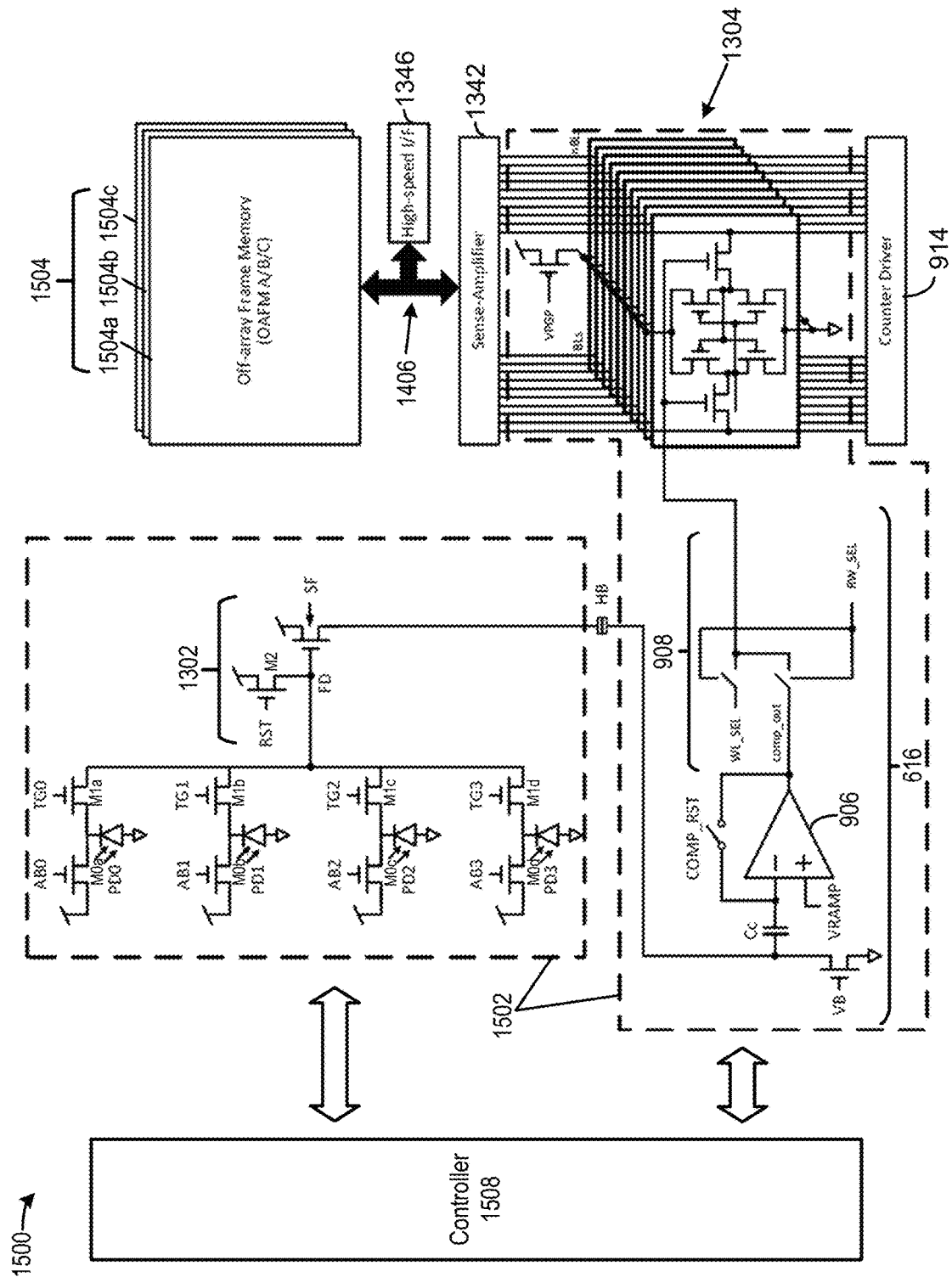

FIG. 15B illustrates another example of image sensor 1500. In the example of FIG. 15B, charge sensing unit 1302 does not include auxiliary capacitor CS to provide additional charge storage capacity. In FIG. 15B, controller 1508 can transfer the residual charge from each photodiode PD0-PD3 to the floating diffusion FD, and control ADC 616 to perform only PD ADC operation to quantize the residual charge. Such arrangements can reduce the total time for quantization operation, $T_{quantization}$, as well as the processing delay $T_{off}$. Such arrangements can reduce the resulting mismatches between exposure periods as well as the frame period.

Figure 15C:
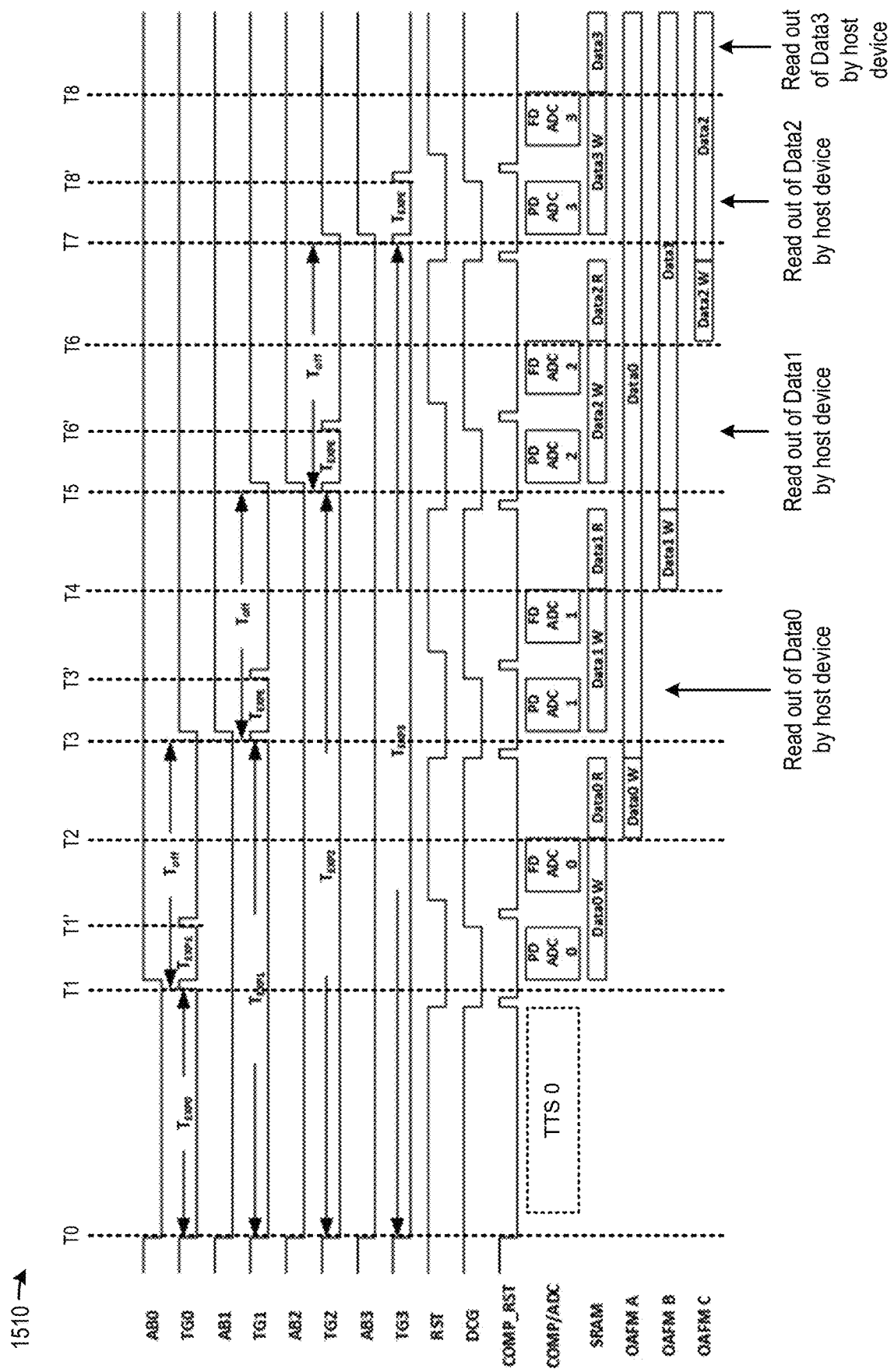

FIG. 15C illustrates a graph 1510 of an example sequence of control signals output by controller 1508, as well as the content of off-array frame memory 1504, with respect to time. Referring to FIG. 15C, controller 1508 can de-assert AB0, AB1, AB2, and AB3 at time T0 to start the exposure periods $T_{EXP0}$ for PD0, $T_{EXP1}$ for PD1, $T_{EXP2}$ for PD2, and $T_{EXP3}$ for PD3. In the example of FIG. 15C, within exposure period $T_{EXP0}$, the reset signal RST is asserted to reset floating diffusion FD and auxiliary capacitor CS, but it is understood that the reset signal can also be de-asserted after time T0 to enable ADC 616 to perform TTS operation for photodiode PD0. Controller 1508 also asserts COMP_RST to reset comparator 906.

The exposure period $T_{EXP0}$ for PD0 ends at time T1. In the example of FIG. 15C, between times T1 and T2, controller 1508 can perform a PD ADC operation followed by a FD ADC operation ("PD ADC 0" and "FD ADC 0" in FIG. 15C) to measure the charge (residual charge or overflow charge) generated by photodiode PD0 as shown in FIG. 12B. In some examples, controller 1508 can also perform FD ADC followed by PD ADC as shown in FIG. 12A. In such a case, controller 1508 can extend the exposure period $T_{EXP0}$ by an extra period $T_{EXPE}$ to time T1', during which the photodiode PD0 can continue sending overflow charge (if saturated by residual charge) to floating diffusion FD and capacitor CS. In a case where charge sensing unit 1302 does not include auxiliary capacitor CS as shown in FIG. 15B, only PD ADC operation is performed between times T1 and T2.

Between times T1 and T2, ADC 616 can generate and store a digital output Data0 based on the results of PD ADC and FD ADC into in-pixel memory 1304 ("SRAM" in FIG. 15C). Between times T2 and T3, frame memory controller 1505 can perform a read out of digital output Data0 from in-pixel memory 1304 and store Data0 to frame memory portion 1504a ("OFAM A" in FIG. 15C). At time T3 the Data0 stored in in-pixel memory 1304 is transferred to OFAM A and can be overwritten, which allows the next quantization operation for photodiode PD1. Therefore the exposure period $T_{EXP1}$ is extended by a processing delay $T_{off}$ between times T1 and T3, and the exposure period $T_{EXP1}$ for PD1 ends at time T3.

Between times T3 and T4, controller 1508 can perform a PD ADC operation followed by a FD ADC operation ("PD ADC 1" and "FD ADC 1" in FIG. 15C) to measure the charge generated by photodiode PD1 as shown in FIG. 12B. In some examples, controller 1508 can also perform FD ADC followed by PD ADC as shown in FIG. 12A. In such a case, controller 1508 can extend the exposure period $T_{EXP1}$ by an extra period $T_{EXPE}$ to time T3', during which the photodiode PD1 can continue sending overflow charge (if saturated by residual charge) to floating diffusion FD and capacitor CS. In a case where charge sensing unit 1302 does not include auxiliary capacitor CS as shown in FIG. 15B, only PD ADC operation is performed between times T3 and T4.

Between times T3 and T4, ADC 616 can generate and store a digital output Data1 into in-pixel memory 1304 to overwrite Data0. Between times T4 and T5, frame memory controller 1505 can perform a read out of digital output Data1 from in-pixel memory 1304 and store Data1 to frame memory portion 1504b ("OFAM B" in FIG. 15C). At time T5 the Data1 stored in in-pixel memory 1304 is transferred to OFAM B and can be overwritten, which allows the next quantization operation for photodiode PD2. Therefore the exposure period $T_{EXP2}$ is extended by a processing delay $T_{off}$ between times T3 and T5, and the exposure period $T_{EXP2}$ for PD2 ends at time T5. In some examples, the host device can also perform a read out of Data0 from OFAM A, so that the transfer of Data1 to host device can be performed in parallel with, for example, the generation and storage of Data1 by ADC 616, the transfer of Data1 to OFAM B, etc. Compared with an arrangement where Data1 is fetched to the host device at the end of the frame period after ADC 616 generates the digital outputs for all photodiodes, such arrangements can reduce the total amount of digital outputs/pixel data to be transferred after ADC 616 generates the digital outputs for all photodiodes, as well as the delay incurred by the transfer, which can reduce the frame period. Moreover, if OFAM A can become available before the quantization operations of other photodiodes, OFAM A can be used to store the digital outputs for other photodiodes, which can reduce the footprint and power of off-array frame memory 1504.

Between times T5 and T6, controller 1508 can perform a PD ADC operation followed by a FD ADC operation ("PD ADC 2" and "FD ADC 2" in FIG. 15C) to measure the charge generated by photodiode PD2 as shown in FIG. 12B. In some examples, controller 1508 can also perform FD ADC followed by PD ADC as shown in FIG. 12A. In such a case, controller 1508 can extend the exposure period $T_{EXP2}$ by an extra period $T_{EXPE}$ to time T6', during which the photodiode PD2 can continue sending overflow charge (if saturated by residual charge) to floating diffusion FD and capacitor CS. In a case where charge sensing unit 1302 does not include auxiliary capacitor CS as shown in FIG. 15B, only PD ADC operation is performed between times T5 and T6.

Between times T5 and T6, ADC 616 can generate and store a digital output Data2 into in-pixel memory 1304 to overwrite Data1. Between times T6 and T7, frame memory controller 1505 can perform a read out of digital output Data2 from in-pixel memory 1304 and store Data2 to frame memory portion 1504c ("OFAM C" in FIG. 15C). At time T7 the Data2 stored in in-pixel memory 1304 is transferred to OFAM B and can be overwritten, which allows the next quantization operation for photodiode PD3. Therefore the exposure period $T_{EXP3}$ is extended by a processing delay $T_{off}$ between times T5 and T7, and the exposure period $T_{EXP3}$ for PD3 ends at time T7. In addition, the host device can also perform a read out of Data1 from OFAM B to reduce the frame period as well as the required capacity of off-array frame memory 1504, as explained above.

Between times T7 and T8, controller 1508 can perform a PD ADC operation followed by a FD ADC operation ("PD ADC 3" and "FD ADC 3 in FIG. 15C) to measure the charge generated by photodiode PD1 as shown in FIG. 12B. In some examples, controller 1508 can also perform FD ADC followed by PD ADC as shown in FIG. 12A. In such a case, controller 1508 can extend the exposure period $T_{EXP3}$ by an extra period $T_{EXPE}$ to time T8', during which the photodiode PD3 can continue sending overflow charge (if saturated by residual charge) to floating diffusion FD and capacitor CS.

Between times T7 and T8', the host device can also perform a read out of Data2 from OFAM B to reduce the frame period as well as the required capacity of off-array frame memory 1504, as explained above. In addition, ADC 616 can generate and store a digital output Data3 into in-pixel memory 1304 to overwrite Data2. The host device can perform a read out of Data3 from in-pixel memory 1304 after time T8. After all pixel data generated for the current frame have been transferred to the host device from off-array frame memory 1504 and in-pixel memory 1304, a new frame period can start for image sensor 1500 to capture pixel data for a new frame.

Figure 15D:
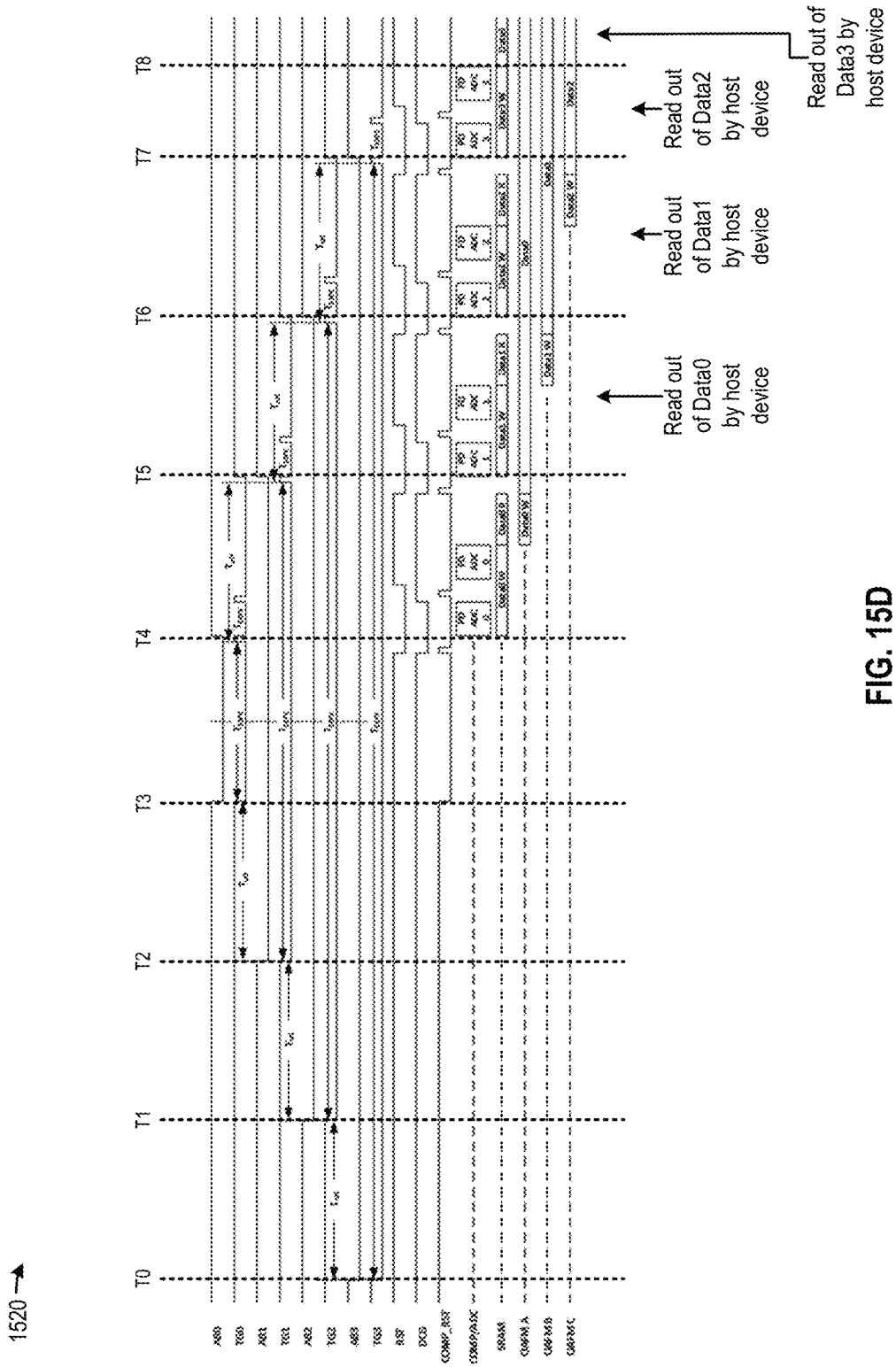

FIG. 15D illustrates a graph 1520 of another example sequence of control signals output by controller 1508, as well as the content of off-array frame memory 1504, with respect to time. In the example of FIG. 15D, controller 1508 can delay the start of exposure periods of $T_{EXP0}$, $T_{EXP1}$, and $T_{EXP2}$ with respect to $T_{EXP3}$, such that the centers of the exposure periods are aligned. Specifically, as shown in FIG. 15D, the end of exposure period $T_{EXP1}$ (time T5) is delayed from the end of exposure period $T_{EXP0}$ (time T4) by processing delay $T_{off}$ whereas the start of exposure period $T_{EXP1}$ (time T2) can be made earlier than the start of exposure period $T_{EXP0}$ (time T3) by the same processing delay $T_{off}$ such that exposure periods $T_{EXP0}$ and $T_{EXP1}$ become center-aligned. In addition, the end of exposure period $T_{EXP2}$ (time T6) is delayed from the end of exposure period $T_{EXP1}$ (time T5) by processing delay $T_{off}$ whereas the start of exposure period $T_{EXP2}$ (time T1) can be made earlier than the start of exposure period $T_{EXP1}$ (time T2) by the same processing delay $T_{off}$ such that exposure periods $T_{EXP1}$ and $T_{EXP2}$ become center-aligned. Further, the end of exposure period $T_{EXP3}$ (time T7) is delayed from the end of exposure period $T_{EXP2}$ (time T6) by processing delay $T_{off}$ whereas the start of exposure period $T_{EXP3}$ (time T0) can be made earlier than the start of exposure period $T_{EXP2}$ (time T1) by the same processing delay $T_{off}$ such that exposure periods $T_{EXP2}$ and $T_{EXP3}$ become center-aligned. Quantization operations (e.g., FD ADC and PD ADC, or only PD ADC) and transfer of pixel values from in-pixel memory 1304 to off-array frame memory 1504 can be performed within $T_{off}$ between times T4 and T5 for photodiode PD0, between times T5 and T6 for photodiode PD1, and between times T6 and T7 for photodiode PD2, followed by quantization operation(s) and storage of pixel data into in-pixel memory 1304 between times T7 and T8. The host device can perform a read out of Data3 from in-pixel memory 1304 after time T8

Aligning the centers of the exposure periods can reduce the motion artifacts. This is because the charge generated from an exposure period can represent an average intensity of light received by a photodiode within the exposure period. By aligning the centers of the exposure periods, it becomes more likely that the digital outputs represent the intensities of light captured by the photodiodes at the same time that corresponds to the centers of the exposure periods, rather than the intensities of light captured at different times. As a result, the motion artifacts caused by the different durations of exposure periods can be reduced or at least mitigated.

Figure 15E:
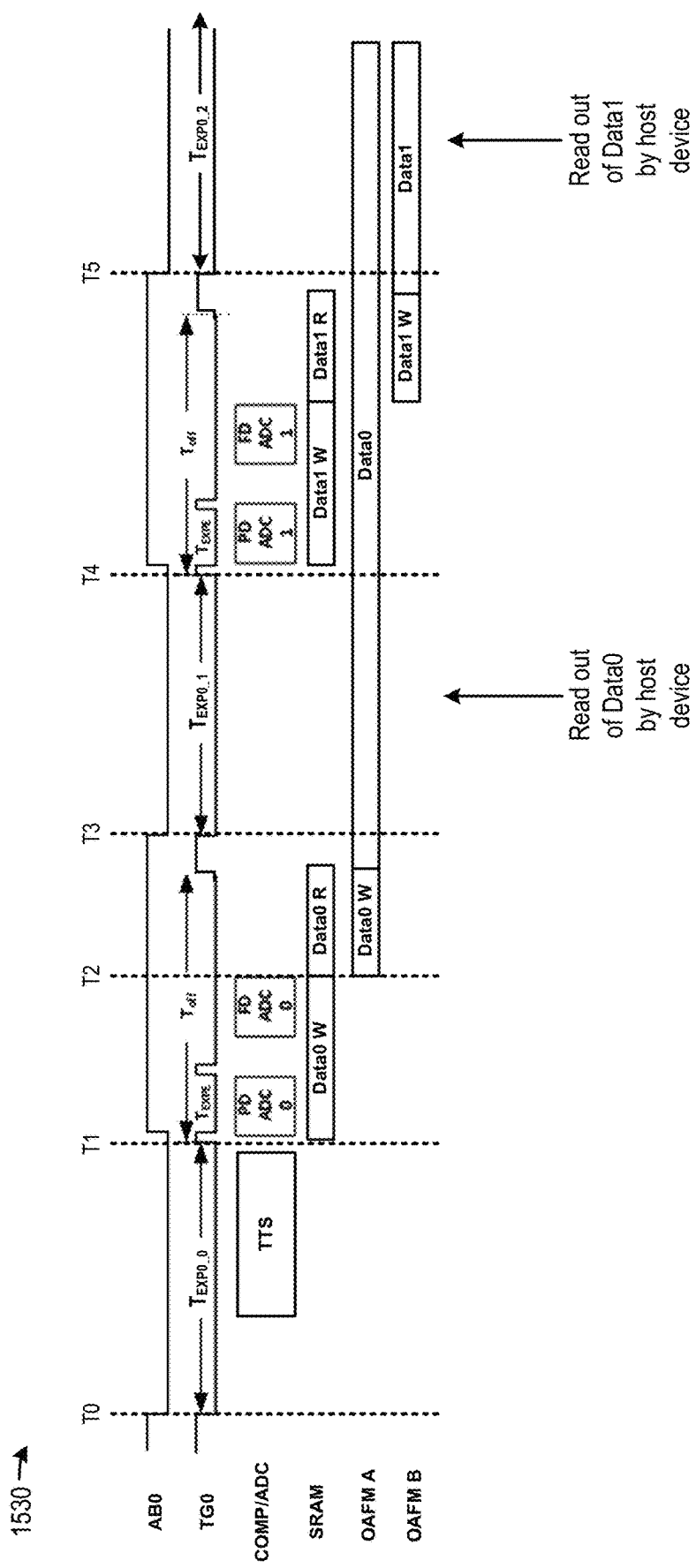

FIG. 15E illustrates a graph 1530 of another example sequence of control signals output by controller 1508, as well as the content of off-array frame memory 1504, in a case off-array frame memory 1504 is used to support multiple light measurement operations by a photodiode (e.g., PD0) within a frame period. In FIG. 15E, only some of the control signals of pixel cell 1502 are shown in graph 1530. A first exposure period $T_{EXP0\_0}$ can start at time T0 and ends at time T1 for a first light measurement operation by photodiode PD0. A TTS operation (labelled "TTS 0") can be performed within first exposure period $T_{EXP0\_0}$. Between times T1 and T2, quantization operations (e.g., PD ADC and FD ADC, or only PD ADC) can be performed to measure the charge generated in the first exposure period $T_{EXP0\_0}$. A first digital output Data0 can be generated based on the TTS, PD ADC, and FD ADC operations. Between T2 and T3, frame memory controller 1505 can perform a read out of digital output Data0 from in-pixel memory 1304 and store Data0 to frame memory portion 1504a ("OFAM A" in FIG. 15E).

Between times T3 and T4 is a second exposure period $T_{EXP0\_1}$ for a second light measurement operation by photodiode PD1. A TTS operation (labelled "TTS 0") can be performed within second exposure period $T_{EXP0\_1}$. The host device can also initiate the transfer of Data0 from frame memory portion 1504a. Between times T4 and T5, quantization operations (e.g., PD ADC and FD ADC, or only PD ADC) can be performed to measure the charge generated in the second exposure period $T_{EXP0\_1}$. A second digital output Data1 can be generated based on the TTS, PD ADC, and FD ADC operations. Between T4 and T5, frame memory controller 1505 can perform a read out of digital output Data1 from in-pixel memory 1304 and store Data1 to frame memory portion 1504b ("OFAM B" in FIG. 15E).

After time T5, additional light measurement operations can be performed by photodiode PD0 in other exposure periods, such as third exposure period $T_{EXP0\_2}$. The host device can also initiate a read out of Data1 from frame memory portion 1504b after time T5. After the host device receives all the digital outputs generated for photodiode PD0 for a current frame period, the current frame period can end and a new frame period can start.

Besides reducing impact of transfer delay of pixel data on frame period and exposure periods mismatches, off-array frame memory 1504 can support various post-processing operations, such as a digital correlated double sampling (CDS) operation. The digital CDS operation can be performed on top of the analog noise charge compensation operations performed using the CC capacitor as described above in FIG. 12A and FIG. 12B to remove fixed pattern noise (FPN) introduced to the charge storage device, such as floating diffusion (FD) and/or auxiliary capacitor CS that are used to store the charge generated by the photodiode. The FPN can be introduced due to, for example, the resetting of the charge storage device, and is typically temporally constant but can vary between pixels. The FPN charge can be added to the photo charge generated by the photodiode and become a noise component. The noise component can degrade the signal-to-noise ratio (SNR) of the image sensor and reduce the sensitivity of the image sensor in measuring low intensity light.

Figure 16:
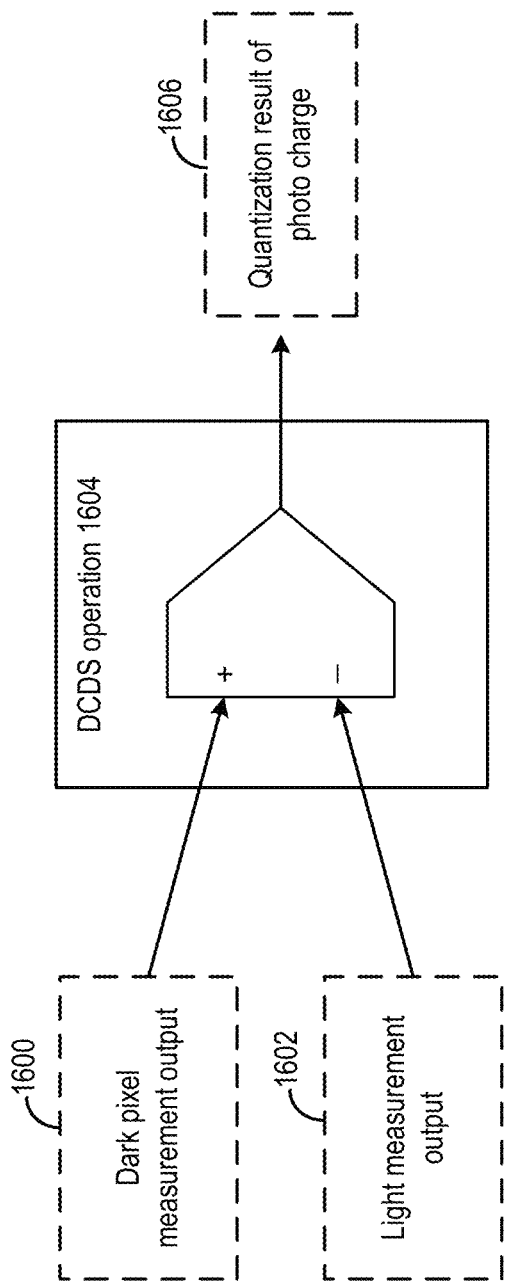
FIG. 16 illustrates an example post-processing operation.

To reduce the effect of FPN charge, a digital CDS operation can be performed. FIG. 16 illustrates an example of a digital CDS operation. As shown in FIG. 16, two quantization results can be obtained. A dark pixel measurement output 1600 can be generated by quantizing a reset voltage of the charge storage device (e.g., floating diffusion FD, auxiliary capacitor CS) after the charge storage device is reset, but prior to the charge storage device receiving photo charge. The reset voltage can represent a quantity of the FPN charge ($Q_{reset}$) in the charge storage device. After the charge storage device accumulates photo charge from the photodiode to generate a second voltage, a light measurement output 1602 can be generated by quantizing the second voltage. The second voltage can represent a sum of the photo charge and the reset noise charge ($Q_{reset}+Q_{photo}$).

A digital CDS operation 1604 can then be performed by obtaining a difference 1606 between dark pixel measurement output 1600 and light measurement output 1602. By taking the difference, and due to the fact that the same reset noise charge $Q_{reset}$ is represented in both dark pixel measurement output 1600 and light measurement output 1602, the FPN charge can be removed from light measurement output 1602, such that difference 1606 includes only the photo charge component $Q_{photo}$ of light measurement output 1602. As a result, the SNR of the image sensor, as well as the sensitivity of the image sensor in measuring low intensity light, can be improved as a result.

Figure 17A:
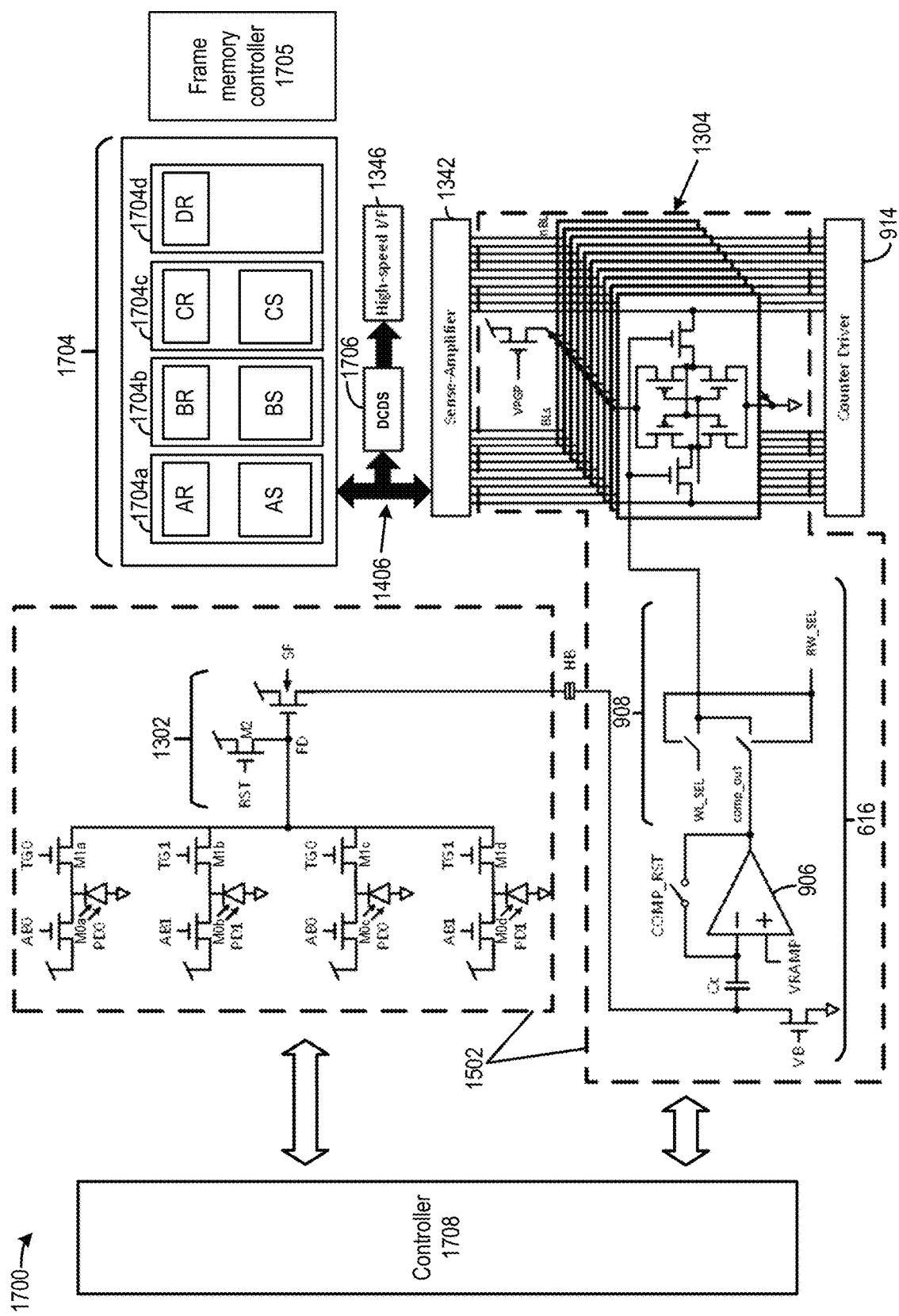
FIG. 17A, FIG. 17B, FIG. 17C, FIG. 17D, and FIG. 17E illustrate examples of an imaging system having an off-array frame memory to support the post-processing operation of FIG. 16.

FIG. 17A-FIG. 17E illustrate examples of an image sensor 1700 that can perform digital CDS operation. Referring to FIG. 17A, image sensor 1700 can include multi-photodiode pixel cell 1502, ADC 616, and in-pixel memory 1304 of FIG. 15B. Pixel cell 1502 can include charge sensing unit 1302 of FIG. 15B having a floating diffusion (FD) but not auxiliary capacitor (CS) to support only PD ADC quantization operation. To support a digital CDS (DCDS) operation, ADC 616 can perform two quantization operations. A first quantization operation can be performed for each photodiode to quantize the reset voltage at the FD before the FD receives charge from each photodiode to generate reset noise measurement outputs for photodiode PD0 (labelled "AR" in FIG. 17A-FIG. 17E), for photodiode PD1 (labelled "BR" in FIG. 17A-FIG. 17E), for photodiode PD2 (labelled "CR" in FIG. 17A-FIG. 17E), and for photodiode PD3 (labelled "DR" in FIG. 17A-FIG. 17E). A second quantization operation can be performed at the FD after the FD receives charge from one of the photodiodes to generate light measurement outputs for photodiode PD0 (labelled "AS" in FIG. 17A-FIG. 17E), for photodiode PD1 (labelled "BS" in FIG. 17A-FIG. 17E), for photodiode PD2 (labelled "CS" in FIG. 17A-FIG. 17E), and for photodiode PD3 (labelled "DS" in FIG. 17B-FIG. 17E).

In addition, image sensor 1700 includes an off-array frame memory 1704 that is external to pixel cell 1502 but is housed within the same chip package as array of pixel cells 1502. Off-array frame memory 1704 can be connected to pixel cell 1502 via high speed parallel interconnects 1406. Image sensor 1700 further includes a frame memory controller 1705 to control the operations of off-array frame memory 1704. The reset noise measurement outputs and light measurement outputs can be first stored in in-pixel memory 1304 and then transferred to off-array frame memory 1704. Off-array frame memory 1704 can include frame memory portions 1704a, 1704b, 1704c, and 1704d. Frame memory portion 1704a can include a dark pixel measurement sub-portion (AR) and a light measurement sub-portion (AS) for photodiode PD0. Frame memory portion 1704b can include a dark pixel measurement sub-portion (BR) and a light measurement sub-portion (BS) for photodiode PD1. Frame memory portion 1704c can include a dark pixel measurement sub-portion (CR) and a light measurement sub-portion (CS) for photodiode PD2. Frame memory portion 1704d can include a dark pixel measurement sub-portion (DR) for photodiode PD3, while in-pixel memory 1304 can store the light measurement output for photodiode PD3.

Furthermore, in some examples, image sensor 1700 may include a digital CDS circuit 1706 to perform the digital CDS operation described in FIG. 16 for each photodiode. In some examples, digital CDS circuit 1706 can be part of frame memory controller 1705. Specifically, digital CDS circuit 1706 can obtain dark pixel measurement output and light measurement output from frame memory portion 1704a, and compute a difference as the digital output Data0 for photodiode PD0. In addition, digital CDS circuit 1706 can obtain dark pixel measurement output and light measurement output from frame memory portion 1704b, and compute a difference as the digital output Data1 for photodiode PD1. Further, digital CDS circuit 1706 can obtain dark pixel measurement output and light measurement output from frame memory portion 1704c, and compute a difference as the digital output Data2 for photodiode PD2. Lastly, digital CDS circuit 1706 can obtain dark pixel measurement output from frame memory portion 1704a and light measurement output from in-pixel memory 1304, and compute a difference as the digital output Data3 for photodiode PD3. Image sensor 1700 can transmit digital outputs Data0, Data1, Data2, and Data3 over to the host device via bus interface 1346. Pixel cell 1502 further includes a controller 1708 to generate a sequence of control signals for charge draining transistors M0a-M0d, charge transfer transistors M1a-M1d, charge sensing unit 1302, ADC 616, in-pixel memory 1304, off-array frame memory 1704, and digital CDS circuit 1706, to control their operations. Controller 1708 can start the quantization operations for photodiode PD0, followed by photodiodes PD1, PD2, and PD3.

Figure 17B:
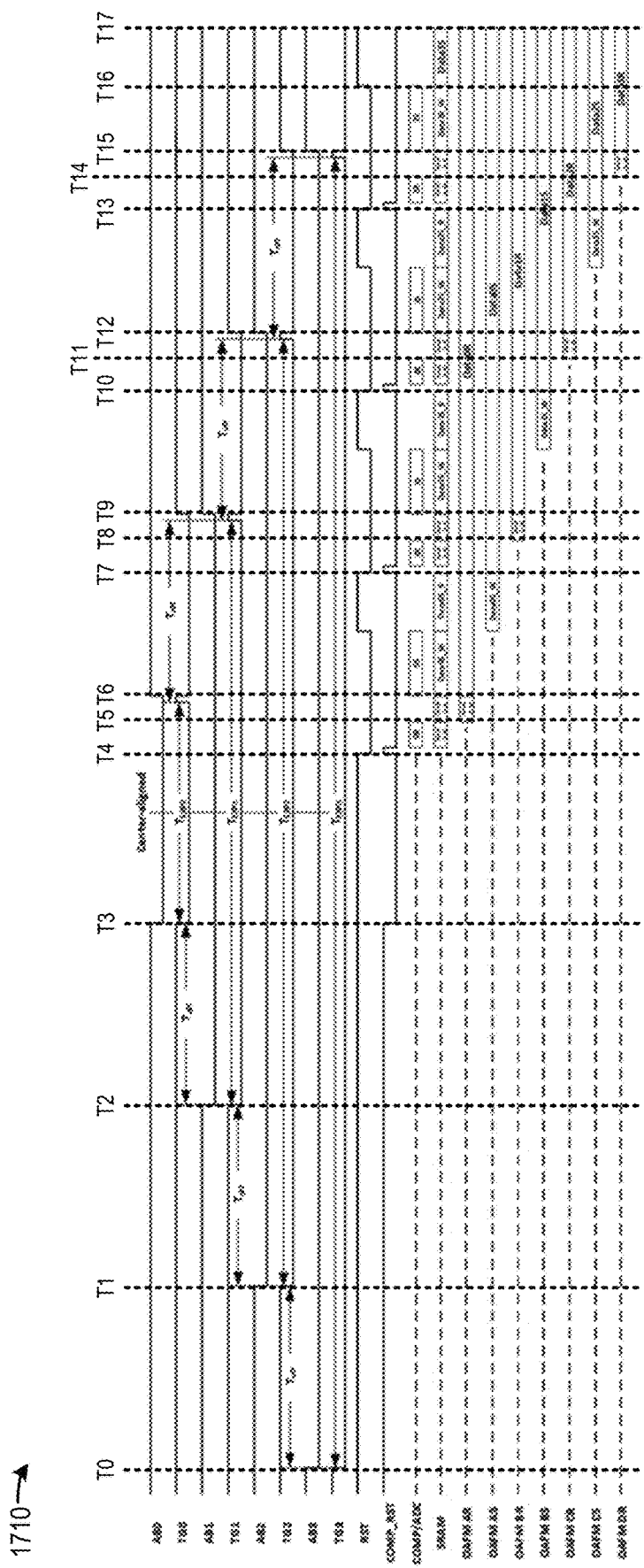
Figure 17C:
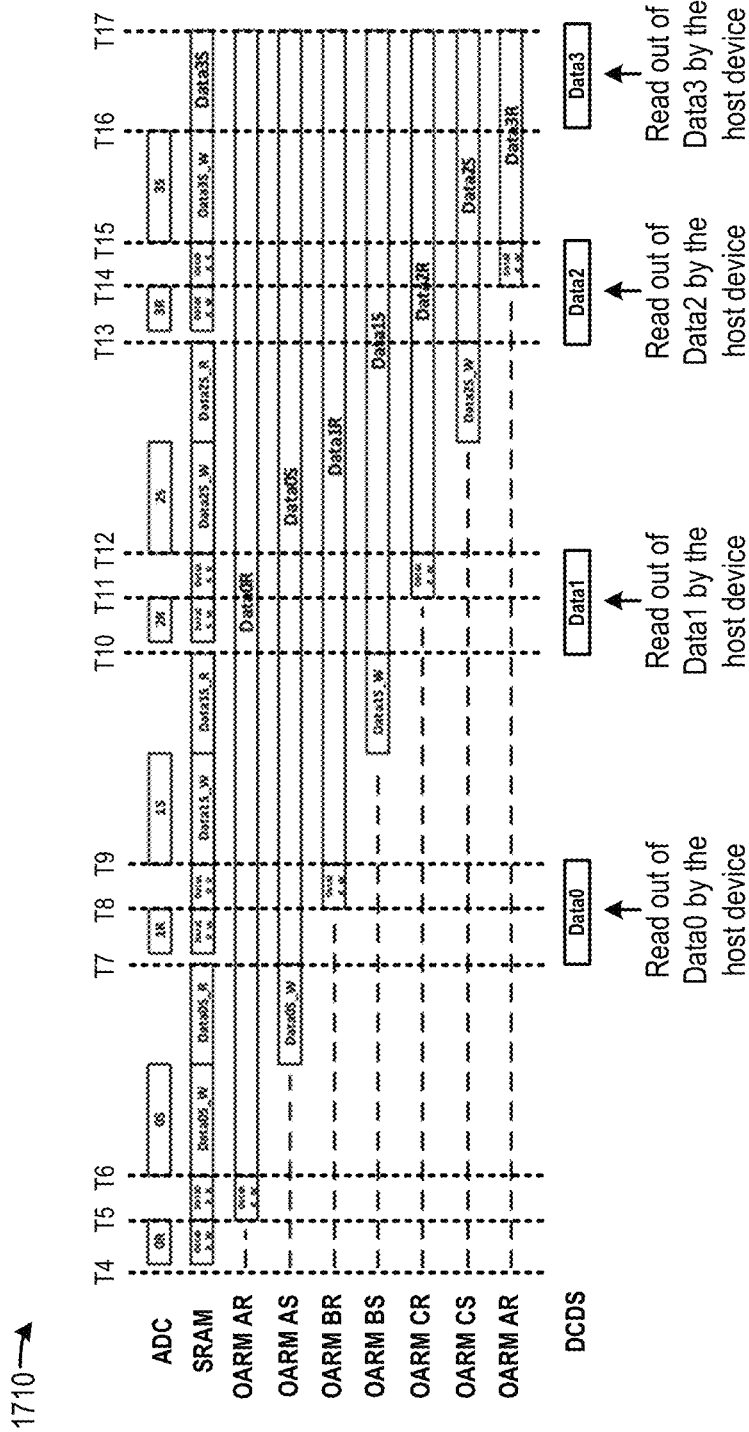

FIG. 17B and FIG. 17C illustrate a graph 1710 of an example sequence of control signals output by controller 1708, as well as the content of off-array frame memory 1704, with respect to time. FIG. 17C illustrates a focused view of graph 1710. In the example of FIG. 17B and FIG. 17C, controller 1708 can delay the start of exposure periods of $T_{EXP0}$, $T_{EXP1}$, and $T_{EXP2}$ with respect to $T_{EXP3}$, such that the centers of the exposure periods are aligned, in a similar fashion as in FIG. 15D. For example, the end of exposure period $T_{EXP1}$ (time T9) is delayed from the end of exposure period $T_{EXP0}$ (time T6) by processing delay $T_{off}$, whereas the start of exposure period $T_{EXP1}$ (time T2) can be made earlier than the start of exposure period $T_{EXP0}$ (time T3) by the same processing delay $T_{off}$ such that exposure periods $T_{EXP0}$ and $T_{EXP1}$ become center-aligned. In addition, the end of exposure period $T_{EXP2}$ (time T12) is delayed from the end of exposure period $T_{EXP1}$ (time T9) by processing delay $T_{off}$, whereas the start of exposure period $T_{EXP2}$ (time T1) can be made earlier than the start of exposure period $T_{EXP1}$ (time T2) by the same processing delay $T_{off}$, such that exposure periods $T_{EXP1}$ and $T_{EXP2}$ become center-aligned. Further, the end of exposure period $T_{EXP3}$ (time T15) is delayed from the end of exposure period $T_{EXP2}$ (time T12) by processing delay $T_{off}$, whereas the start of exposure period $T_{EXP3}$ (time T0) can be made earlier than the start of exposure period $T_{EXP2}$ (time T1) by the same processing delay $T_{off}$ such that exposure periods $T_{EXP2}$ and $T_{EXP3}$ become center-aligned.

In addition, controller 1708 can control ADC 616 to release the reset of the floating diffusion FD and perform a first quantization to quantize the reset voltage at FD before the exposure period ends to generate a reset noise measurement output. Moreover, after the exposure period ends and the charge is transferred from the photodiode to the floating diffusion FD to develop a new voltage, controller 1708 can control ADC 616 to perform a second quantization to quantize the new voltage at FD to generate a light measurement output.

Specifically, between times T4 and T5 and before the exposure period $T_{EXP0}$ ends at time T6, ADC 616 can generate a dark pixel measurement output for photodiode PD0 (labelled "Data0R"), and store Data0R in in-pixel memory 1304, and then frame memory controller 1705 can transfer Data0R from in-pixel memory 1304 to dark pixel measurement sub-portion of frame memory portion 1704*a* (AR) between times T5 and T6. Moreover, between times T6 and T7, after the exposure period $T_{EXP0}$ ends at time T6, ADC 616 can generate a light measurement output (labelled "Data0S") for photodiode PD0 and store Data0S in in-pixel memory 1304, and then frame memory controller 1705 can transfer Data0S from in-pixel memory 1304 to light measurement sub-portion of frame memory portion 1704*a* (AS).

Moreover, between times T7 and T8 and before the exposure period $T_{EXP1}$ ends at time T9, ADC 616 can generate a dark pixel measurement output for photodiode PD1 (labelled "Data1R"), and store Data1R in in-pixel memory 1304, and then frame memory controller 1705 can transfer Data1R from in-pixel memory 1304 to dark pixel measurement sub-portion of frame memory portion 1704*b* (BR) between times T8 and T9. Moreover, between times T9 and T10, after the exposure period $T_{EXP1}$ ends at time T9, ADC 616 can generate a light measurement output for photodiode PD1 (labelled "Data1S") and store Data1S in in-pixel memory 1304, and then frame memory controller 1705 can transfer Data1S from in-pixel memory 1304 to light measurement sub-portion of frame memory portion 1704*b* (BS). Meanwhile, between times T7 and T9, both Data0S and Data0R are stored in off-array frame memory 1704*a*, and digital CDS circuit 1706 can obtain Data0S and Data0R from frame memory portion 1704*a* and compute a noise-compensated pixel value Data0, and transmit Data0 to the host device. In some examples, the host device can also initiate transfer of Data0S and Data0R between times T7 and T9 and perform digital CDS to generate a pixel value Data0.

In addition, between times T10 and T11 and before the exposure period $T_{EXP2}$ ends at time T12, ADC 616 can generate a dark pixel measurement output for photodiode PD2 (labelled "Data2R"), and store Data2R in in-pixel memory 1304, and then frame memory controller 1705 can transfer Data2R from in-pixel memory 1304 to dark pixel measurement sub-portion of frame memory portion 1704*c* (CR) between times T11 and T12. Moreover, between times T12 and T13, after the exposure period $T_{EXP1}$ ends at time T12, ADC 616 can generate a light measurement output for photodiode PD2 (labelled "Data2S") and store Data2S in in-pixel memory 1304, and then frame memory controller 1705 can transfer Data2S from in-pixel memory 1304 to light measurement sub-portion of frame memory portion 1704*c* (CS). Meanwhile, between times T10 and T12, both Data1S and Data1R are stored in off-array frame memory 1704*b*, and digital CDS circuit 1706 can obtain Data1S and Data1R from frame memory portion 1704*b* and compute a noise-compensated pixel value Data1, and transmit Data1 to the host device. In some examples, the host device can also initiate transfer of Data1S and Data1R between times T10 and T12 and perform digital CDS to generate a pixel value Data1.

Further, between times T13 and T14 and before the exposure period $T_{EXP3}$ ends at time T14, ADC 616 can generate a dark pixel measurement output for photodiode PD3 (labelled "Data3R"), and store Data3R in in-pixel memory 1304, and then frame memory controller 1705 can transfer Data3R from in-pixel memory 1304 to dark pixel measurement sub-portion of frame memory portion 1704*d* (DR) between times T14 and T15. Meanwhile, between times T13 and T14, both Data2S and Data2R are stored in off-array frame memory 1704*c*, and digital CDS circuit 1706 can obtain Data2S and Data2R from frame memory portion 1704*c* and compute a noise-compensated pixel value Data2, and transmit Data2 to the host device. In some examples, the host device can also initiate transfer of Data2S and Data2R between times T13 and T14 and perform digital CDS to generate a pixel value Data2.

Between times T15 and T16, after the exposure period $T_{EXP3}$ ends at time T15, ADC 616 can generate a light measurement output for photodiode PD3 (labelled "Data3S") and store Data3S in in-pixel memory 1304. In some examples, between times T16 and T17, digital CDS circuit 1706 can obtain Data3S from in-pixel memory 1304 and Data3R from frame memory portion 1704*d* to compute a noise-compensated pixel value Data3, and transmit Data3 to the host device. In some examples, the host device can also initiate transfer of Data3S and Data3R between times T16 and T17 and perform digital CDS to generate a pixel value Data3.

In the examples shown in FIG. 17B and FIG. 17C, ADC 616 can perform a quantization operation to generate a dark pixel measurement output for each of photodiodes PD0, PD1, PD2, and PD3. As the dark pixel measurement reflects the FPN component that will be present in the subsequent light measurement output, the subsequent digital CDS operation can remove that FPN component from the subsequent light measurement output, which can avoid (or at least reduce) the removal of the photo charge component from the subsequent light measurement output. But additional capacity is needed at the off-array frame memory to store the reset noise measurement outputs for each of photodiodes PD0, PD1, PD2, and PD3. Moreover, additional quantization operations need to be performed to generate a dark pixel measurement output for each of photodiodes PD0, PD1, PD2, and PD3, which can increase power consumption.

In some examples, to reduce the capacity is needed at the off-array frame memory as well as the quantization operations, controller 1708 can control ADC 616 to perform one quantization operation to generate a dark pixel measurement output, and use that dark pixel measurement output for the digital CDS operation for each of photodiodes PD0, PD1, PD2, and PD3. Such arrangements can effectively reduce the FPN component in the light measurement outputs if FPN behavior is the same for all four photodiodes, especially in cases where that photodiodes share the same charge sensing unit 1302 and ADC 616.

Figure 17D:
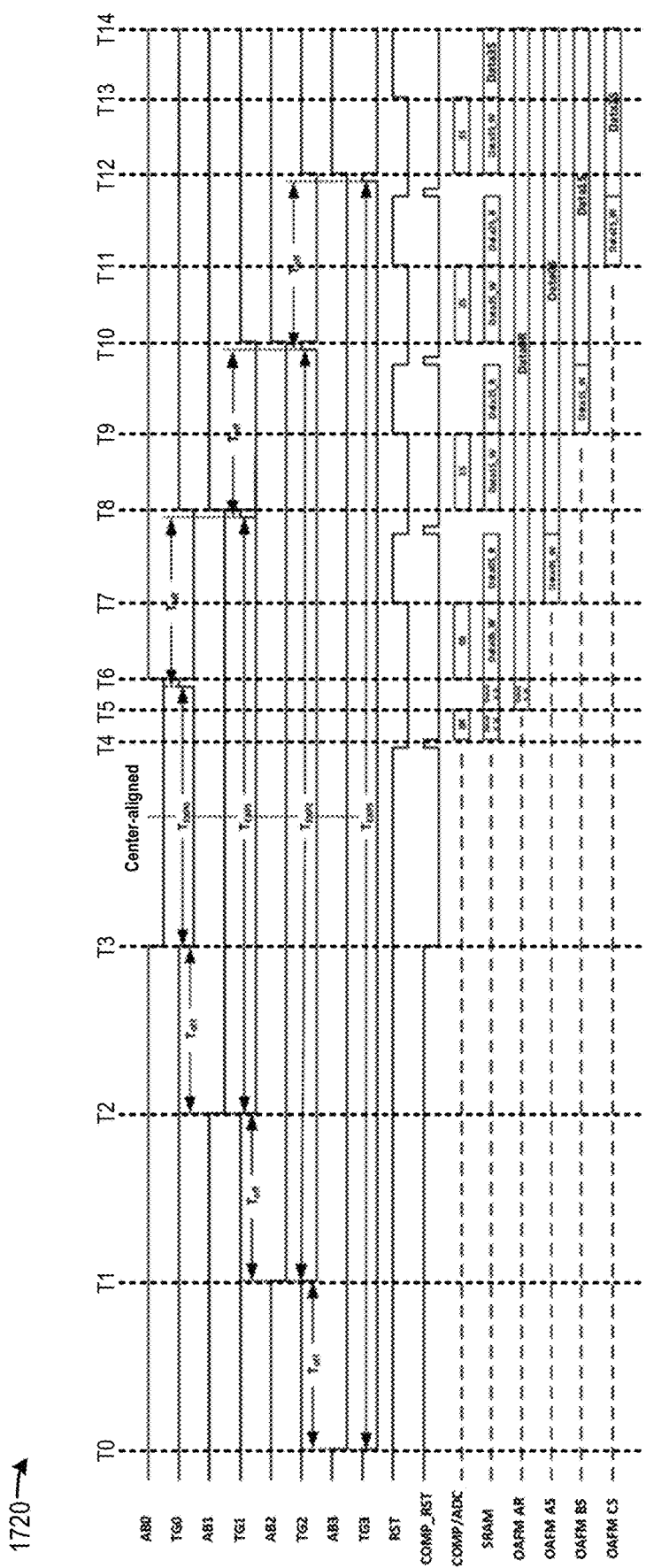
Figure 17E:
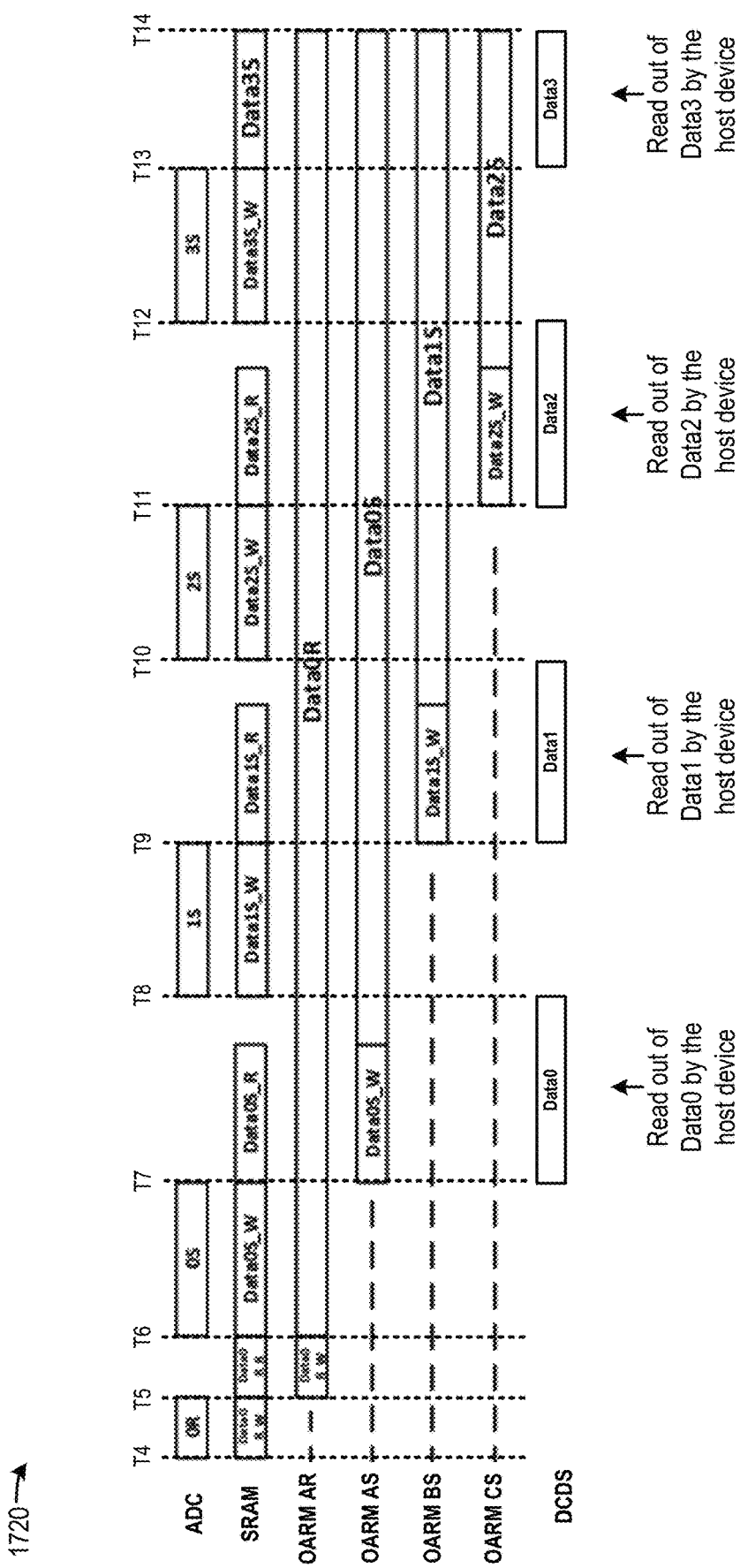

FIG. 17D and FIG. 17E illustrate a graph 1720 of an example sequence of control signals output by controller 1708, as well as the content of off-array frame memory 1704, with respect to time. FIG. 17E illustrates a focused view of graph 1720. As shown in FIG. 17D and FIG. 17E, off-array frame memory 1704 includes a dark pixel measurement sub-portion for photodiode PD0 (AR), but not the dark pixel measurement sub-portion for other photodiodes PD1-PD3 (BR, CR, and DR). In addition, off-array frame memory 1704 further includes light measurement sub-portions for photodiodes PD0-PD2 (AS, BS, and CS).

The example sequence of control signals in graph 1720 is similar to those of graph 1710, such that the exposure periods $T_{EXP0}$, $T_{EXP1}$, $T_{EXP2}$, and $T_{EXP3}$ are center-aligned. Specifically, exposure period $T_{EXP0}$ is between times T3 and T6, exposure period $T_{EXP1}$ is between times T2 and T8, exposure period $T_{EXP2}$ is between times T1 and T10, whereas exposure period $T_{EXP3}$ is between times T0 and T12. After releasing the reset signal at time T4, controller 1708 can control ADC 616 to quantize the reset voltage of floating diffusion FD to generate Data0R between times T4 and T5, and then frame memory controller 1705 can transfer Data0R to dark pixel measurement sub-portion for photodiode PD0 (AR). This is followed by quantization operations to generate light measurement output Data0S for photodiode PD0 between times T6 and T7 and the transfer of Data0S to light measurement sub-portion for photodiode PD0 (AS), quantization operations to generate light measurement output Data1S for photodiode PD1 between times T8 and T9 and the transfer of Data1S to light measurement sub-portion for photodiode PD1 (BS), quantization operations to generate light measurement output Data2S for photodiode PD2 between times T10 and T11 and the transfer of Data2S to light measurement sub-portion for photodiode PD2 (CS), and the quantization operations to generate light measurement output Data3S for photodiode PD3 between times T12 and T13.

In addition, digital CDS circuit 1706 can perform a readout of Data0R and Data0S to compute Data0 and transfer Data0 to the host device between times T7 and T8. Digital CDS circuit 1706 can perform a readout of Data1R and Data1S to compute Data1 and transfer Data1 to the host device between times T9 and T10. Digital CDS circuit 1706 can also perform a readout of Data2R and Data2S to compute Data2 and transfer Data2 to the host device between times T10 and T11. Further, digital CDS circuit 1706 can also perform a readout of Data3R and Data3S to compute Data3 and transfer Data3 to the host device between times T13 and T14.

Figure 18A:
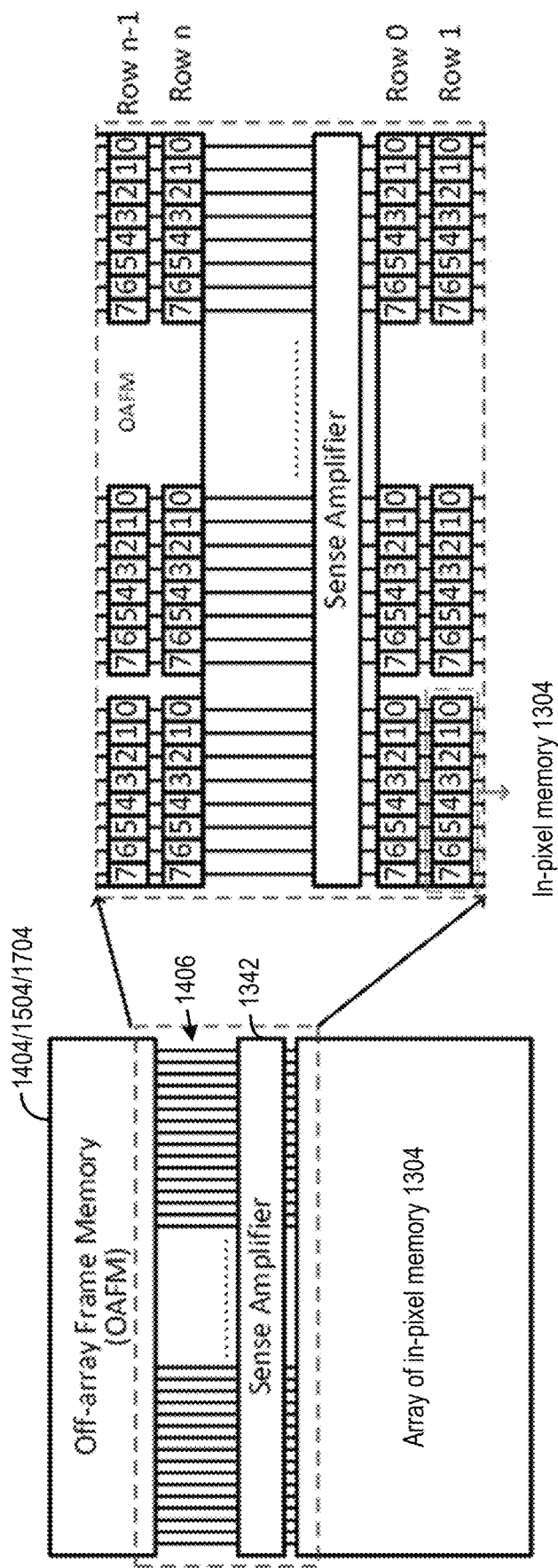
FIG. 18A and FIG. 18B illustrate examples of arrangements of connections between an array of in-pixel memory and an off-array frame memory.
Figure 18B:
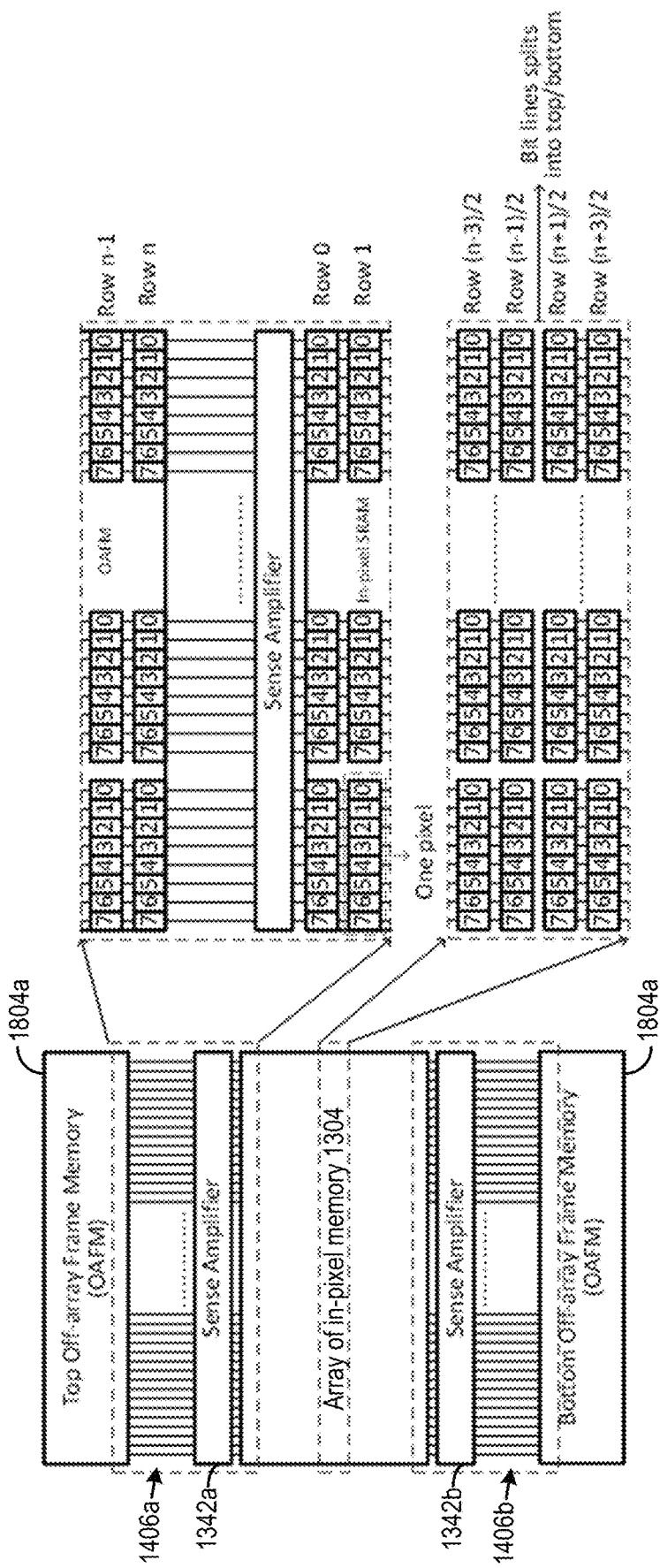

FIG. 18A and FIG. 18B illustrate example arrangements of connections between an array of in-pixel memory 1304 (of an array of pixel cells 1300/1502) and an off-array frame memory (e.g., off-array frame memory 1404, 1504, 1704). As shown in FIG. 18A, sense amplifier 1342 can be connected to the in-pixel memory of one row (or column) of pixel cells at a time, with each in-pixel memory 1304 configured to store an 8-bit value for a pixel. Sense amplifier 1342 can also be connected to the off-array frame memory via parallel interconnects 1406. One row (or column) of memory cells of off-array frame memory, each to store an 8-bit value, can also be connected to parallel interconnects 1406 at a time. To perform transfer of data from the array of in-pixel memory 1304 to the off-array frame memory, a frame memory controller (e.g., frame memory controller 1405, 1505, 1705) can connect the in-pixel memory 1304 of one row of pixel cells to one row of memory cells of off-array frame memory via sense amplifier 1342 at a time, to transfer one row of pixel data at a time. For example, the frame memory controller can transfer pixel data from row 0 of the array of pixel cells to row 0 of the off-array frame memory, followed by row 1, row 2, etc. When the transfer of pixel data from all rows completes, the frame memory controller can transmit a signal to the controller of the pixel cells to start a subsequent quantization operation to overwrite the in-pixel memory 1304 of each pixel cell.

FIG. 18B illustrates another example arrangements of connections between an array of in-pixel memory 1304 (of an array of pixel cells 1300/1502) and an off-array frame memory (e.g., off-array frame memory 1404, 1504, 1704). As shown in FIG. 18B, the off-array frame memory can include a top frame memory portion 1804a and a bottom frame memory portion 1804b. The image sensor further includes sense amplifier 1342a and sense amplifier 1342b. Sense amplifier 1342a can be connected to top frame memory portion 1804a via top parallel interconnects 1406a, whereas sense amplifier 1342b can be connected to bottom frame memory portion 1804b via bottom parallel interconnects 1406b. A top half of array of in-pixel memory 1304 can transfer pixel data via sense amplifier 1342a to top frame memory portion 1804a, whereas a bottom half of array of in-pixel memory 1304 can transfer pixel data via sense amplifier 1342b to bottom frame memory portion 1804b. With the arrangements of FIG. 18B, at any one time, two rows of pixel data can be transferred from array of in-pixel memory 1304 to, respectively, top frame memory portion 1804a and bottom frame memory portion 1804b, which can increase (e.g., double) the rate of pixel data transfer and reduce the total time required to transfer the pixel data from the in-pixel memory to the off-array frame memory.

Figure 19A:
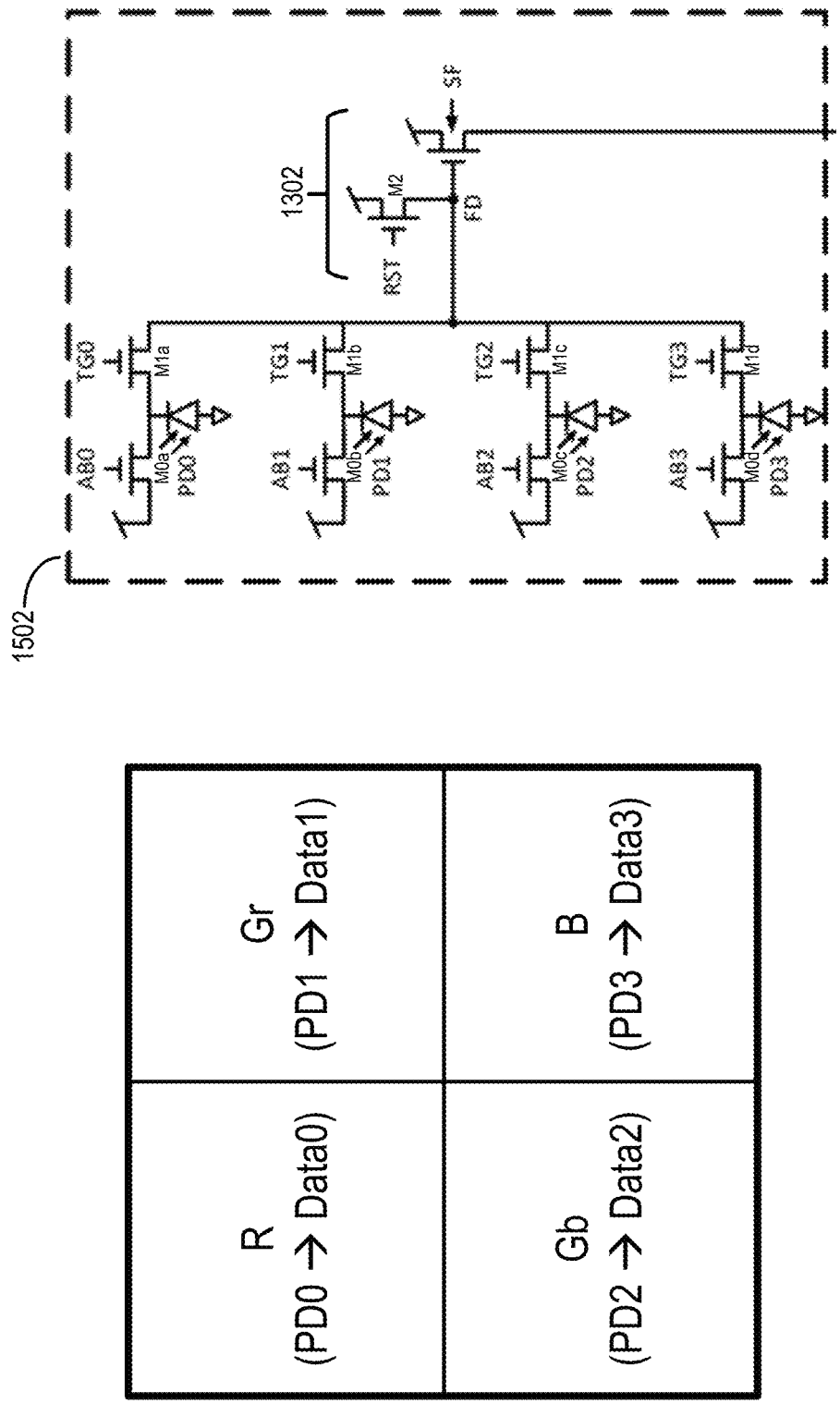
FIG. 19A, FIG. 19B, FIG. 19C, FIG. 19D, FIG. 19E, FIG. 19F, and FIG. 19G illustrate examples of arrangements of connections between off-array frame memory and bus interfaces.

FIG. 19A-FIG. 19G illustrate example connection arrangements between the off-array frame memory (e.g., off-array frame memorys 1404, 1504, 1704) and bus interfaces 1346. The connection arrangements can also be based on mapping between the photodiodes and the wavelength channels. FIG. 19A illustrates an example of the mapping. As shown in FIG. 19A, the photodiode PD0-PD3 of pixel cell 1502 can be assigned based on a Bayer pattern. Photodiode PD0 can be assigned to measure the intensity of red light, and the quantization output Data0 can represent the intensity of red light received by photodiode PD0. Moreover, photodiode PD1 can be assigned to measure the intensity of green (Gr) light, and the quantization output Data1 represents the intensity of green light received by photodiode PD1. Further, photodiode PD2 can be assigned to measure the intensity of green (Gb) light, and the quantization output Data2 represents the intensity of green light received by photodiode PD2. Lastly, photodiode PD3 can be assigned to measure the intensity of blue (B) light, and the quantization output Data3 represents the intensity of blue light received by photodiode PD3. In some other examples, one or more of photodiodes PD0-PD3 can be assigned to measure infrared light, to provide collated 2D/3D sensing.

Figure 19B:
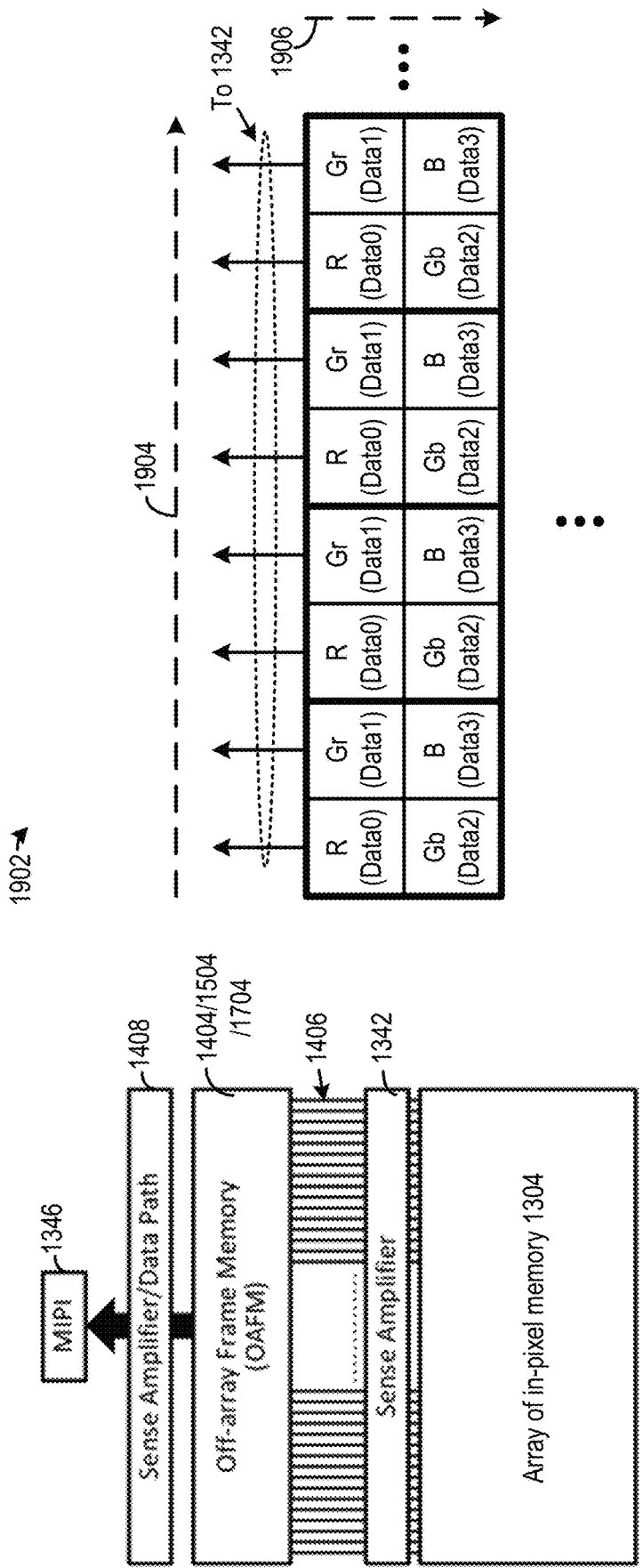

FIG. 19B illustrates an example connection arrangement between the off-array frame memory and bus interface 1346, which can be a MIPI interface. In FIG. 19B, the off-array frame memory can be connected to a single bus interface 1346 via sense amplifier 1408. The right side of FIG. 19B illustrates an example of connection arrangement 1902 between off-array frame memory and bus interface 1346. In connection arrangement 1902, each memory cell of the off-array frame memory can be connected to bus interface

1346 at a time. To perform transfer of the pixel data from the off-array frame memory to the host via bus interface 1346, the frame memory controller can perform read out of one memory cell at a time along one row of the off-array frame memory to read out repeated patterns of Data0 for red light and Data 1 for green light, following dotted line 1904 representing a read out order along a row. After a row is read out, another row of the off-array frame memory can be read out repeated patterns of Data2 for green light and Data3 for blue light, following dotted line 1906 representing a read out order between rows. Each memory cell can send the pixel data to sense amplifier 1408, which can amplify the electrical signals representing the pixel data and send the amplified signals to bus interface 1346, which in turn can transmit the amplified signals as serial signals over physical bus 1360 to the host device.

Figure 19C:
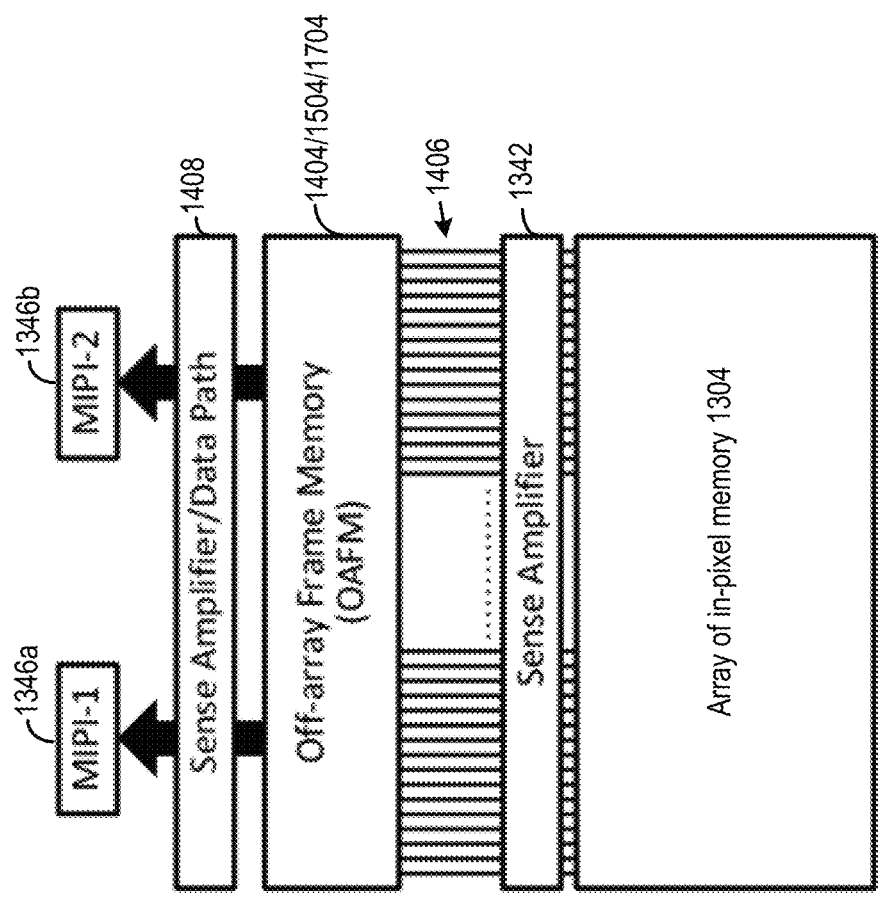

FIG. 19C illustrates another example connection arrangement between the off-array frame memory and bus interface 1346. In FIG. 19C, the off-array frame memory can be connected to two bus interface 1346a and 1346b via sense amplifier 1408. Each bus interface is connected to a physical bus, such that serial signals of two pixel data can be transmitted in parallel to the host device to increase the transfer rate.

Figure 19D:
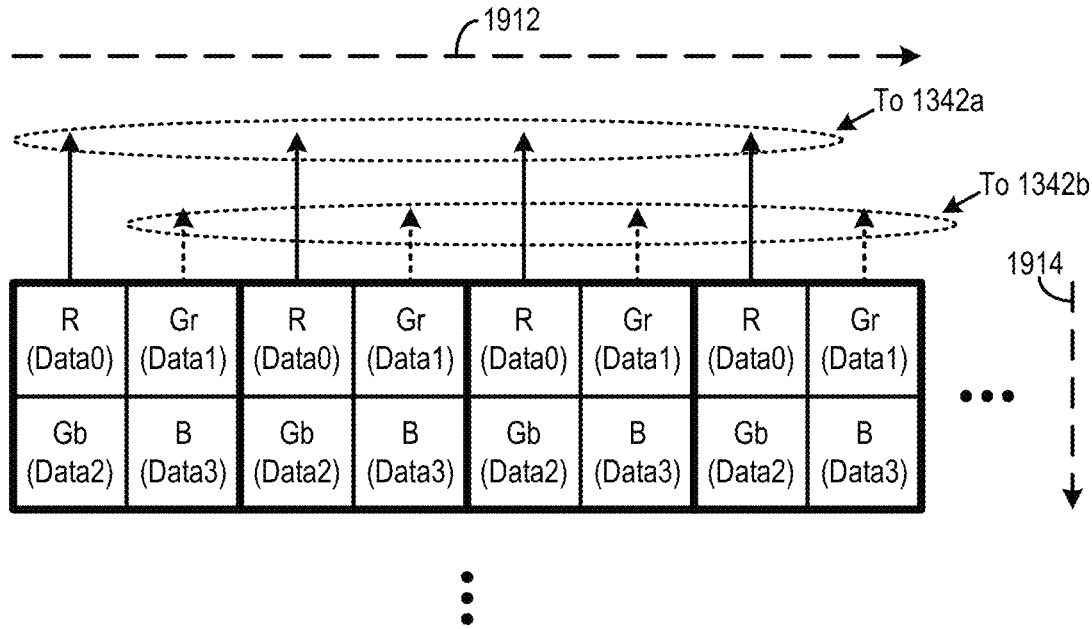
Figure 19D:
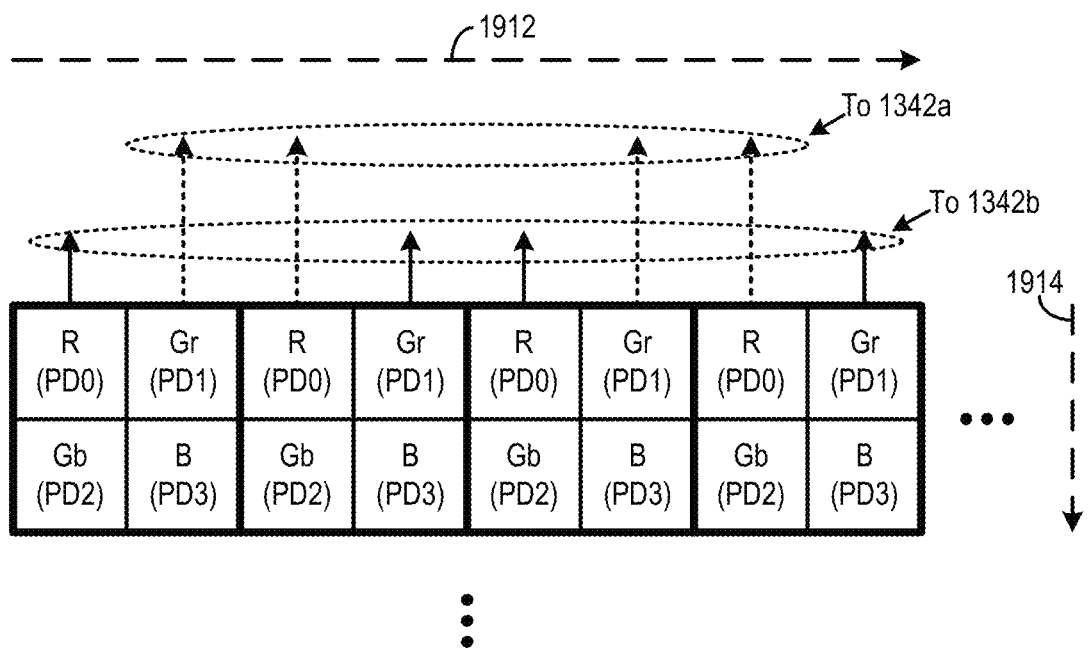

FIG. 19D illustrates examples of connection arrangements between the off-array frame memory and bus interfaces 1346a and 1346b in FIG. 19C. As shown in connection arrangement 1910 of FIG. 19D, two memory cells of a row of the off-array frame memory can be connected to one of bus interfaces 1346a or 1346b in an alternating fashion, such that bus interface 1346a can transmit pixel data of a particular wavelength channel within a row (e.g., red or green), whereas bus interface 1346b can transmit pixel data of another wavelength channel within the row (e.g., green or blue). To perform transfer of the pixel data from the off-array frame memory to the host, the frame memory controller can perform read out of two memory cells at a time along one row of the off-array frame memory, with Data0 (for red light) transmitted via interface 1346a and Data1 (for green light) transmitted via interface 1346b, following dotted line 1912 representing a read out order within a row. After a row is read out, another row of the off-array frame memory can be read out, with Data2 (for green light) transmitted via interface 1346a and Data3 (for blue light) transmitted via interface 1346b, following dotted line 1906 representing a read out order between rows. Two memory cells can send two pixel data to sense amplifier 1408, which can amplify the electrical signals representing the two pixel data and send the amplified signals to bus interfaces 1346a and 1346b, which in turn can transmit the amplified signals as serial signals over two physical buses 1360a and 1360b to the host device.

In some examples, as shown in connection arrangement 1920 of FIG. 19D, the connection between memory cells the off-array frame memory and the bus interfaces 1346a or 1346b can swap between neighboring pairs of memory cells within a row, such that each bus interface can transmit pixel values of alternating wavelength channels within a row between successive read out operations. For example, to perform transfer of the pixel data from the off-array frame memory to the host, the frame memory controller can first perform read out of two memory cells at a time along one row of the off-array frame memory, with Data0 (for red light) transmitted via interface 1346a and Data1 (for green light) transmitted via interface 1346b. The frame memory controller can then perform read out of Data0 (for red light) via interface 1346b and Data1 (for green light) via interface 1346a, following dotted line 1912 representing a read out order within a row. After a row is read out, another row of the off-array frame memory can be read out, with Data2 (for green light) transmitted via interface 1346a and Data3 (for blue light) transmitted via interface 1346b, followed by Data2 (for green light) being transmitted via interface 1346b and Data3 (for blue light) transmitted via interface 1346a following dotted line 1906 representing a read out order between rows.

Connection arrangement 1920 of FIG. 19D can speed up a sub-sampling operation in which pixel data are of a particular wavelength channel are sent to the host device whereas pixel data of other wavelength channels are withheld. Specifically, with connection arrangement 1920 of FIG. 19D, pixel data of the same wavelength channel (e.g., red, green, blue) can be sent in parallel via two interfaces 1346a and 1346b. Such arrangements can speed up the transfer of the pixel data to the host device during the sub-sampling operation.

Figure 19E:
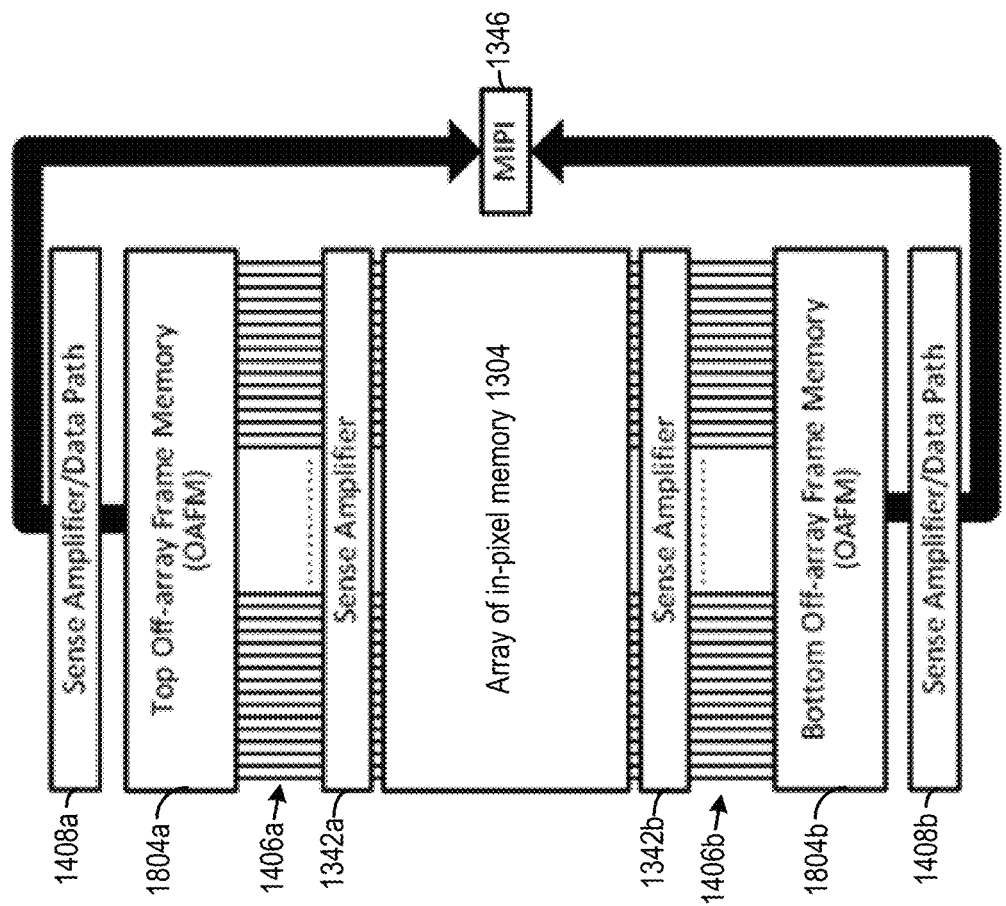

FIG. 19E illustrates another example connection arrangements between the off-array frame memory and bus interface 1346. As shown in FIG. 19E, the off-array frame memory can include top frame memory portion 1804a and bottom frame memory portion 1804b of FIG. 18B. Top frame memory portion 1804a is connected to sense amplifier 1342a via top parallel interconnects 1406a, whereas bottom frame memory portion 1804b is connected to sense amplifier 1342b via bottom parallel interconnects 1406b, as described in FIG. 18B. Both of top frame memory portion 1804a and bottom frame memory portion 1804b are connected to a single bus interface 1346 via, respectively sense amplifier 1408a and sense amplifier 1408b. One memory cell can be selected from one of top frame memory portion 1804a or bottom frame memory portion 1804b to perform the read out operation via bus interface 1346. In some examples, a row of memory cells can be selected alternately from top frame memory portion 1804a and then bottom frame memory portion 1804b to perform the read out.

Figure 19F:
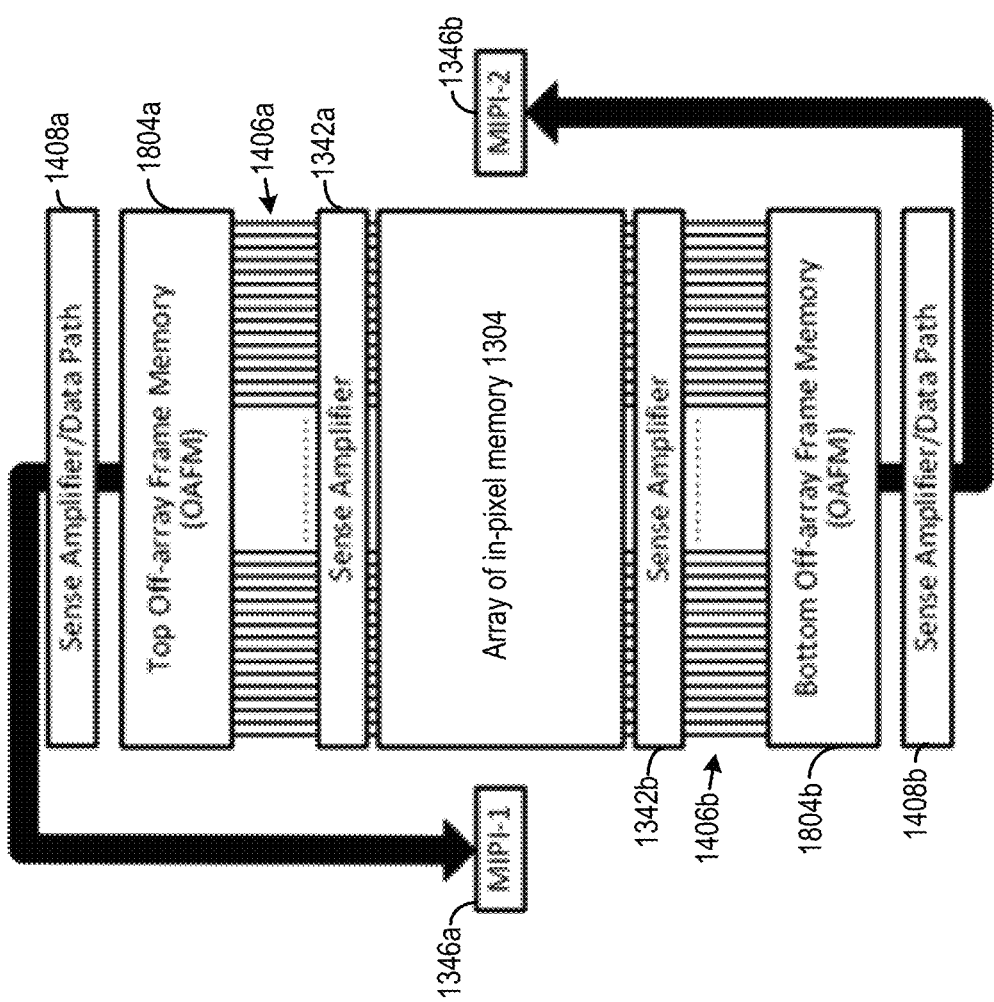

FIG. 19F illustrates another example connection arrangements between the off-array frame memory and bus interface 1346. As shown in FIG. 19F, the off-array frame memory can be connected to two bus interface 1346a and 1346b, with each bus interface connected to a physical bus, such that serial signals of two pixel data can be transmitted in parallel to the host device to increase the transfer rate. Top frame memory portion 1804a is connected to bus interface 1346a via sense amplifier 1408a, whereas bottom frame memory portion 1804b is connected to bus interface 1346b via sense amplifier 1408b. With the arrangements of FIG. 19F, each of top frame memory portion 1804a and bottom frame memory portion 1804b can transmit pixel data in parallel to the host device. The read out order of each of top frame memory portion 1804a and bottom frame memory portion 1804b can follow, for example, the example in FIG. 19B.

Figure 19G:
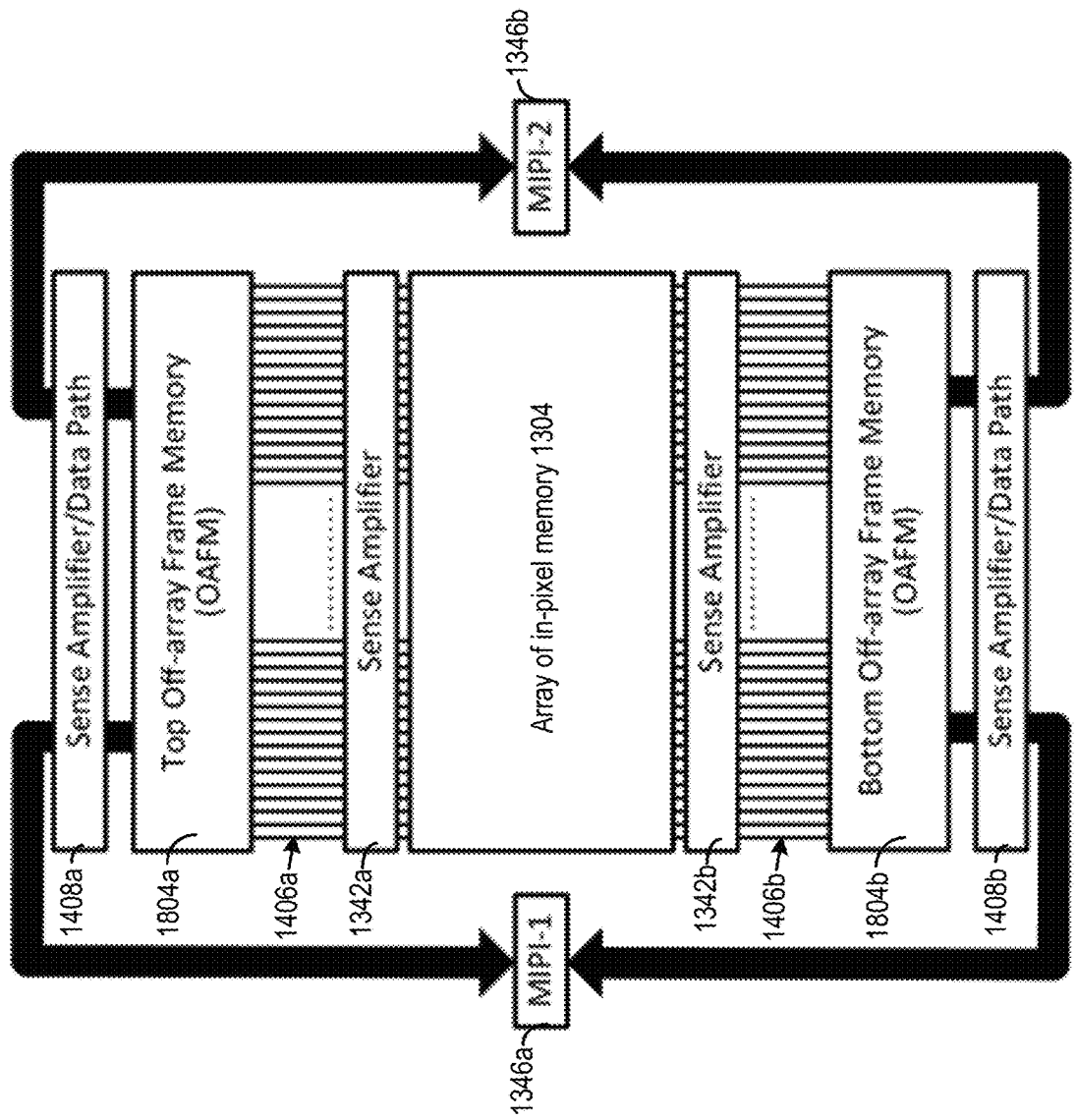

FIG. 19G illustrates another example connection arrangements between the off-array frame memory and bus interface 1346. As shown in FIG. 19G, top frame memory portion 1804a is connected to bus interface 1346a and bus interface 1346b via sense amplifier 1408a, whereas bottom frame memory portion 1804b is connected to bus interface 1346a and bus interface 1346b via sense amplifier 1408b. Such arrangements allow two memory cells to send pixel data in parallel via bus interface 1346a and bus interface 1346b. The connection between the memory cells and bus interface 1346a and bus interface 1346b can be based on the example arrangements shown in FIG. 19D. In some examples, two memory cells can be selected from one of top frame memory portion 1804a or bottom frame memory portion 1804b to perform the read out operation via bus interfaces 1346a and 1346b. A row of memory cells can be selected alternately from top frame memory portion 1804a and then bottom frame memory portion 1804b to perform the read out.

Figure 20:
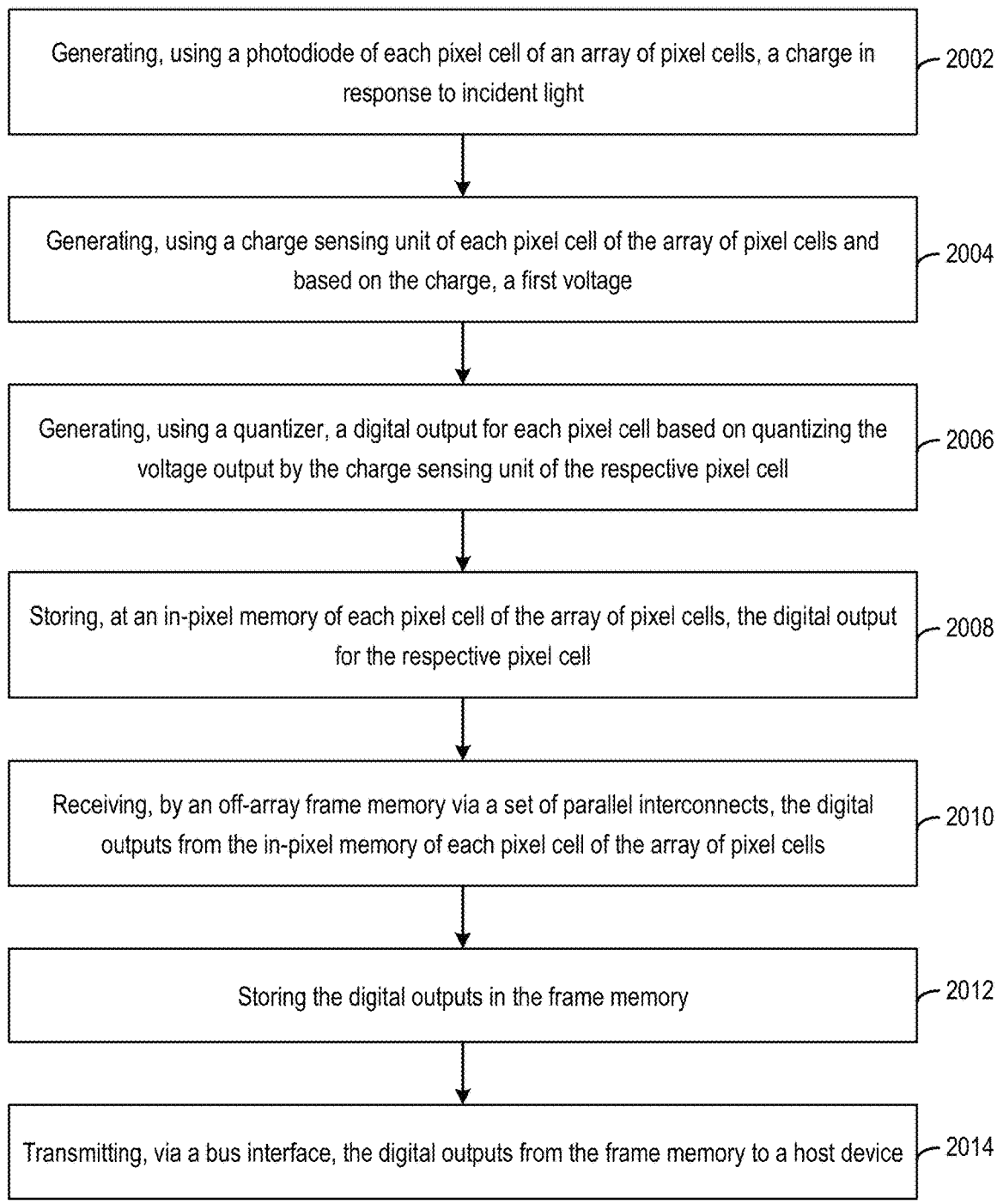
FIG. 20 illustrates a flowchart of an example process for performing an imaging operation.

FIG. 20 illustrates a flowchart of an example method 2000 of performing an imaging operation. Method 2000 can be performed by, for example, image sensor 1402 of imaging system 1400. Referring back to FIG. 14A, imaging system 1400 includes image sensor 1402 and a host device (e.g., host device 1350 of FIG. 13D) connected via physical bus 1360. Image sensor 1402 includes an array of pixel cells 1300 of FIG. 13B each having one or more photodiodes (e.g., PD0-3 of FIG. 13B), ADC 616, and an in-pixel memory 1304 having the capacity to store one digital output for one photodiode. Image sensor 1402 may further include sense amplifier 1342 and bus interface 1346 to provide connection between physical bus 1360 and array of pixel cells 1300.

In addition, the image sensor further includes an off-array frame memory (e.g., off-array frame memory 1404, 1504, 1704, etc.) that is external to array of pixel cells 1300 but is housed within the same chip package as array of pixel cells 1300. Off-array frame memory 1404 have the capacity to store at least some of the pixel values generated by array of pixel cells 1300 for a frame. The off-array frame memory can be connected to array of pixel cells 1300 via a set of parallel interconnects 1406

Referring to FIG. 20, in step 1202, array of pixel cells 1300 can generate charge in response to incident light using a photodiode of each pixel cell in the array of pixel cells.

Specifically, in some examples, a pixel cell, such as pixel cell 602a of FIG. 9, can include a single photodiode configured to perform multiple light measurement operations to generate multiple pixel values for a single frame. In some examples, a pixel cell, such as the examples shown in FIG. 13A and FIG. 13B, can include multiple photodiodes each configured to generate a charge for light of a particular wavelength channel (e.g., visible red, blue, and green lights, and infrared light). Referring to FIG. 15C and FIG. 15D, in a case where the pixel cell includes multiple photodiodes, the exposure periods of the multiple photodiodes can start at the same time, or the start times of the exposure periods can be offset with each other so that the exposure periods can be center-aligned. The photodiode can accumulate a part of the charge as residual charge until the photodiode saturates, and the photodiode can output the remaining charge as overflow charge to a charge sensing unit (e.g., 1302 of FIG. 13A, FIG. 13B, and FIG. 15A).

In step 2004, the charge sensing unit of each pixel cell (e.g., 1302 of FIG. 13A, FIG. 13B, and FIG. 15A) can convert the charge into a first voltage. The charge sensing unit can include a charge storage device (e.g., a floating diffusion, an auxiliary capacitor, etc.) to store the charge from the photodiode to generate the first voltage. The pixel cell can include multiple charge sensing units to generate voltages for multiple photodiodes simultaneously, a charge sensing units for multiple photodiodes sequentially, or a single charge sensing unit to generate a voltage for a single photodiode.

In step 2006, a quantizer of each pixel cell (e.g., ADC 616) can quantize the voltage into a digital output, such as Data0, Data1, Data2, and Data3 of FIG. 15C-FIG. 15E. The quantization can include a time-to-saturation (TTS) operation within the exposure period to measure a TTS indicating when the overflow charge saturates the charge sensing unit, a FD ADC operation to measure a quantity of the overflow charge generated within the exposure period if the overflow charge does not saturate the charge sensing unit, or a PD ADC operation to measure a quantity of the residual charge generated within the exposure period, after the residual charge is transferred from the photodiode to the charge sensing unit. The FD ADC and PD ADC operation can be performed after the exposure period ends.

In some examples, in a case where a pixel cell includes multiple photodiodes, the quantizer can sequentially quantize the voltages generated by the charge sensing units for each photodiode. For example, referring to FIG. 15C-FIG. 15E, the quantizer can perform PD ADC and FD ADC operation for a first photodiode first, followed by a second photodiode, a third photodiode, etc. The end of the exposure period of the second photodiode can be extended while waiting for the PD ADC and FD ADC operation of the first photodiode to finish to store the digital value at the in-pixel memory, and to wait for the digital value to be transferred from the in-pixel memory to the off-array frame memory.

In some examples, referring to FIG. 16 and FIG. 17A-FIG. 17E, the quantizer can also generate digital reset values based on quantizing the charge sensing unit after the charge sensing unit is reset, to support a digital correlated double sampling operation. After the charge sensing unit is reset and a reset voltage is generated at the charge storage device representing reset noise charge, the quantizer can perform a quantization operation (e.g., by comparing the reset voltage against a voltage ramp as in PD ADC and FD ADC) to quantize the reset voltage to generate the digital output (e.g., Data0R, Data1R, Data2R, Data3R, etc. of FIG. 17A-FIG. 17E).

In step 2008, the in-pixel memory of each pixel cell of the array of pixel cells can store the digital output generated by the quantizer of the pixel cell. In some examples, the in-pixel memory of each pixel cell only have sufficient capacity to store the digital output of one photodiode, in a case where the pixel cell includes multiple photodiodes, or to store the digital output of one measurement, in a case where the pixel cell includes a single photodiode configured to perform multiple measurements for a frame.

In step 2010, an off-array frame memory (e.g., off-array frame memory 1404, 1504, 1704, etc.) can receive the digital outputs from the in-pixel memory of each pixel cell of the array of pixel cells via the set of parallel interconnects, and then store the digital outputs in step 2012. Specifically, referring back to FIG. 15A-FIG. 15E and FIG. 17A-FIG. 17E, the digital outputs can be fetched from the in-pixel memory of each pixel cell to the off-array frame memory so that the in-pixel memory at the pixel cell can be made available to store the digital output of a subsequent quantization operation. The subsequent quantization operation can be performed for a second photodiode, to quantize the charge converted from light by the same photodiode to generate a digital output, such as Data0S, Data1S, Data2S, Data3S, etc. of FIG. 17A-FIG. 17E, which can be stored in the in-pixel memory after the digital output stored at the in-pixel memory is transferred to the off-array frame memory. In some examples, steps 2010 and 2012 can be performed by a frame memory controller, such as frame memory controller 1405.

In step 2014, the digital outputs can be transmitted, via a bus interface (e.g., a MIPI bus interface), from the frame memory to a host device (e.g., host device 1350). In some examples, the transmission can be performed right after the digital outputs are stored at off-array frame memory, as shown in FIG. 15A-FIG. 15E and FIG. 17A-FIG. 17E. In some examples, the transmission can also be performed towards the end of a frame period. The host device can also receive digital outputs from the in-pixel memory of each pixel cell, including those that are not stored at the off-array frame memory. In some examples, referring to FIG. 19D, multiple bus interfaces may be provided to transmit the digital outputs, and the multiple bus interfaces can transmit digital outputs of the same wavelength channel or different wavelength channels to support a sub-sampling operation. In some examples, step 2014 can also be performed by the frame memory controller.

Steps, operations, or processes described may be performed or implemented with one or more hardware or software modules, alone or in combination with other devices. In some examples, a software module is implemented with a computer program product comprising a computer-readable medium containing computer program code, which can be executed by a computer processor for performing any or all of the steps, operations, or processes described.

Examples of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples of the disclosure may also relate to a product that is produced by a computing process described herein. Such a product may comprise information resulting from a computing process, where the information is stored on a non-transitory, tangible computer readable storage medium and may include any example of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the examples is intended to be illustrative, but not limiting, of the scope of the disclosure, which is set forth in the following claims.

What is claimed is:

1. An apparatus comprising:
    an array of pixel cells, each pixel cell including:
        a photodiode to generate a charge in response to incident light,
        a charge sensing unit configured to generate a voltage based on the charge, and
        an in-pixel memory configured to store a digital output generated by a quantizer based on quantizing the voltage;
    a bus interface;
    an off-array frame memory connected to the bus interface and the array of pixel cells, the in-pixel memory of the array of pixel cells being connected to the frame memory via a set of parallel interconnects; and
    a frame memory controller configured to:
        control the frame memory to receive, via the set of parallel interconnects, the digital outputs from the in-pixel memory of each pixel cell of the array of pixel cells;
        store the digital outputs in the frame memory;
        fetch the digital outputs from the frame memory; and
        transmit the digital outputs to a host device via the bus interface.

2. The apparatus of claim 1, wherein the frame memory is housed within a same chip package as the array of pixel cells.

3. The apparatus of claim 2, wherein the in-pixel memory of the array of pixel cells is formed in a first semiconductor substrate;
    wherein the frame memory is formed in a second semiconductor substrate, the first semiconductor substrate and the second semiconductor forming a vertical stack; and
    wherein the in-pixel memory of the array of pixel cells and the frame memory are connected via a set of parallel vertical interconnects.

4. The apparatus of claim 3, wherein the set of parallel vertical interconnects comprise at least one of: through silicon vias (TSVs), micro-TSVs, or Copper-Copper bumps.

5. The apparatus of claim 1, wherein:
    the photodiode is a first photodiode;
    the charge is a first charge;
    the digital output is a first digital output;
    the voltage is a first voltage;
    each pixel cell of the array of pixel cells further comprises a second photodiode configured to generate a second charge in response to incident light;
    the charge sensing unit of the pixel cell is configured to, after outputting the first voltage, output a second voltage based on the second charge;
    the pixel cell is configured to, after the first digital output is transferred from the in-pixel memory to the frame memory, use the quantizer to quantize the second voltage to generate a second digital output; and
    the in-pixel memory is configured to overwrite the first digital output with the second digital output.

6. The apparatus of claim 5, wherein the in-pixel memory has sufficient capacity to store the first digital output or the second digital output.

7. The apparatus of claim 5, wherein the in-pixel memory of the array of pixel cells is connected to the bus interface; and
    wherein the in-pixel memory of the array of pixel cells is configured to transmit the second digital outputs to the host device via the bus interface.

8. The apparatus of claim 5, wherein the first photodiode is configured to generate the first charge within a first exposure period between a first time and a second time;
    wherein the second photodiode is configured to generate the second charge within a second exposure period between a third time and a fourth time; and
    wherein the fourth time is delayed from the third time by a processing delay, the processing delay including a quantization time by the quantizer to generate the first digital output, an in-pixel memory access time to store the first digital output into the in-pixel memory, and a transfer time of the first digital outputs from the in-pixel memory of the array of pixel cells to the frame memory.

9. The apparatus of claim 8, wherein the first time is also delayed from the third time by the processing delay.

10. The apparatus of claim 1, wherein the digital output is a first digital output;
  wherein the photodiode is configured to:
    store a first portion of the charge as residual charge; and
    after being saturated by the residual charge, output a second portion of the charge as overflow charge to the charge sensing unit; and
  wherein each pixel cell of the array of pixel cells is configured to:
    use the quantizer to quantize the overflow charge stored in the charge sensing unit to generate the first digital output;
    transfer the residual charge to the charge sensing unit;
    use the quantizer to quantize the residual charge stored in the charge sensing unit to generate a second digital output; and
    store the first digital output in the in-pixel memory based on the photodiode being saturated by the residual charge.

11. The apparatus of claim 10, wherein the charge sensing unit includes a capacitor having a configurable capacity;
  wherein the capacitor is configured to have a first capacity to store the overflow charge; and
  wherein the capacitor is configured to have a second capacity lower than the first capacity to store the residual charge.

12. The apparatus of claim 1, wherein the photodiode is configured to store the charge; and
  wherein each pixel cell of the array of pixel cells is configured to transfer the charge from the photodiode to the charge sensing unit to generate the voltage.

13. The apparatus of claim 1,
  wherein the digital outputs are stored as light measurement values in the frame memory;
  wherein each pixel cell of the array of pixel cells is configured to:
    reset the charge sensing unit to cause the charge sensing unit to output a reset voltage;
    use the quantizer to output a dark pixel value based on quantizing the reset voltage; and
    store the dark pixel value in the in-pixel memory; and
  wherein the apparatus further comprises a digital correlated double sampling (CDS) circuit configured to:
    for each pixel cell, fetch the dark pixel value and the light measurement value from the frame memory;
    compute a difference between the dark pixel value and light measurement value; and
    transmit the difference as a noise-corrected pixel value to the host device via the bus interface.

14. The apparatus of claim 1, wherein the frame memory controller is configured to:
  within a first time, when the in-pixel memory of a first row of pixel cells of the array of pixel cells is connected to a first row of memory cells of the frame memory:
    receive a first subset of the digital outputs from the in-pixel memory of the first row of pixel cells of the array of pixel cells; and
    store the first subset of the digital outputs at the first row of memory cells of the frame memory; and
  within a second time after the first time, when the in-pixel memory of a second row of pixel cells of the array of pixel cells is connected to a second row of memory cells of the frame memory:
    receive a second subset of the digital outputs from the in-pixel memory of the second row of pixel cells of the array of pixel cells; and
    store the second subset of the digital outputs at the second row of memory cells of the frame memory.

15. The apparatus of claim 1, wherein the frame memory controller is configured to:
  within a first time, when the in-pixel memory of a first row and a second row of pixel cells of the array of pixel cells is connected to, respectively and simultaneously, a first row and a second row of memory cells of the frame memory:
    receive a first subset of the digital outputs from the in-pixel memory of the first row of pixel cells;
    receive a second subset of the digital outputs from the in-pixel memory of the second row of pixel cells;
    store the first subset of the digital outputs at the second row of memory cells of the frame memory; and
    store the first subset of the digital outputs at the second row of memory cells of the frame memory; and
  within a second time, when the in-pixel memory of a third row and a fourth row of pixel cells of the array of pixel cells is connected to, respectively and simultaneously, a third row and a fourth row of memory cells of the frame memory:
    receive a third subset of the digital outputs from the in-pixel memory of the third row of pixel cells;
    receive a fourth subset of the digital outputs from the in-pixel memory of the fourth row of pixel cells;
    store the third subset of the digital outputs at the third row of memory cells of the frame memory; and
    store the fourth subset of the digital outputs at the fourth row of memory cells of the frame memory.

16. The apparatus of claim 1, wherein the bus interface is a first bus interface;
  wherein the apparatus further comprises a second bus interface;
  wherein the frame memory controller is configured to:
    at a first time, select a first memory cell and a second memory cell of the frame memory;
    transmit, via the first bus interface, a first digital output from the first memory cell to the host device;
    transmit, via the second bus interface, a second digital output from the second memory cell to the host device;
    at a second time, select a third memory cell and a fourth memory cell of the frame memory;
    transmit, via the first bus interface, a third digital output from the third memory cell to the host device; and
    transmit, via the second bus interface, a fourth digital output from the fourth memory cell to the host device.

17. The apparatus of claim 16, wherein the photodiode is a first photodiode associated with a first wavelength channel;
  wherein each pixel cell of the array of pixel cells further comprises a second photodiode associated with second wavelength channel;
  wherein the first digital output and the second digital output are generated for the first photodiode and the second photodiode of a first pixel cell of the array of pixel cells; and
  wherein the third digital output and the fourth digital output are generated for the first photodiode and the second photodiode of a second pixel cell of the array of pixel cells.

18. The apparatus of claim 17, wherein:
  the first digital output and the third digital output are generated by the first photodiode of, respectively, the first pixel cell and the second pixel cell; and the second digital output and the fourth digital output are generated by the second photodiode of, respectively, the first pixel cell and the second pixel cell.

19. The apparatus of claim 17, wherein:

the first digital output and the third digital output are generated by, respectively, the first photodiode of the first pixel cell and the second photodiode of the second pixel cell; and the second digital output and the fourth digital output are generated by, respectively, the second photodiode of the first pixel cell and the first photodiode of the second pixel cell.

20. A method comprising:

generating, using a photodiode of each pixel cell of an array of pixel cells, a charge in response to incident light;

generating, using a charge sensing unit of each pixel cell of the array of pixel cells and based on the charge, a voltage;

generating, using a quantizer, a digital output for each pixel cell based on quantizing the voltage output by the charge sensing unit of the pixel cell;

storing, at an in-pixel memory of each pixel cell of the array of pixel cells, the digital output for the respective pixel cell;

receiving, by an off-array frame memory via a set of parallel interconnects, the digital outputs from the in-pixel memory of each pixel cell of the array of pixel cells;

storing the digital outputs in the frame memory; and transmitting, via a bus interface, the digital outputs from the frame memory to a host device.

* * * * *